(12) United States Patent
Chavan et al.

(10) Patent No.: US 12,465,353 B2
(45) Date of Patent: Nov. 11, 2025

(54) KNOTLESS ORTHOPEDIC STABILIZATION SYSTEM AND RELATED METHODS

(71) Applicant: Dunamis Medical Technologies, LLC, Greenville, AL (US)

(72) Inventors: Prithviraj Chavan, Greenville, AL (US); Forrest Samuel, Carlsbad, CA (US)

(73) Assignee: Dunamis Medical Technologies, LLC, Greenville, AL (US)

( * ) Notice: Subject to any disclaimer, the term of this patent is extended or adjusted under 35 U.S.C. 154(b) by 485 days.

(21) Appl. No.: 17/827,687

(22) Filed: May 28, 2022

(65) Prior Publication Data

US 2022/0378412 A1 Dec. 1, 2022

Related U.S. Application Data

(60) Provisional application No. 63/293,738, filed on Dec. 24, 2021, provisional application No. 63/254,136, (Continued)

(51) Int. Cl.
*A61B 17/04* (2006.01)

(52) U.S. Cl.
CPC .. *A61B 17/0487* (2013.01); *A61B 2017/0414* (2013.01); *A61B 2017/044* (2013.01);
(Continued)

(58) Field of Classification Search
CPC ............ A61B 17/0487; A61B 17/0401; A61B 2017/0414; A61B 2017/044;
(Continued)

(56) References Cited

U.S. PATENT DOCUMENTS

2004/0254593 A1 12/2004 Fallin et al.
2007/0162125 A1 7/2007 Lebeau et al.
(Continued)

OTHER PUBLICATIONS

Extended European Search Report 22812319.6 dated Feb. 26, 2025.
(Continued)

*Primary Examiner* — Brigid K Byrd
(74) *Attorney, Agent, or Firm* — Jay B. Bell, Esq.

(57) ABSTRACT

An orthopedic button assembly providing the ability to perform a soft tissue repair or bone repair using a method for securing sutures or fixation members in a knotless manner is described. The orthopedic button assembly of the present disclosure is designed in a manner to as to not rely on an additional component to perform the locking. The orthopedic button assembly of the present disclosure includes the ability to optimally tension the repair by pulling the tensionable fixation members (e.g. sutures) in the tensioning direction and prevent slippage of the tensionable fixation members in the opposite direction by capturing the tensionable fixation members in a manner such that pulling on the tensionable fixation members in the direction opposite of the tensioning direction (e.g., if connected tissue or bone were to attempt to "pull away" from the button assembly under tension) actually increases the tension, resulting in a tighter locking interface to increase the security of the repair.

20 Claims, 41 Drawing Sheets

Related U.S. Application Data filed on Oct. 10, 2021, provisional application No. 63/194,436, filed on May 28, 2021.

(52) U.S. Cl.
CPC ............... *A61B 2017/0445* (2013.01); *A61B 2017/0496* (2013.01)

(58) Field of Classification Search
CPC .... A61B 2017/0445; A61B 2017/0496; A61B 2017/0404; A61B 2017/0406; A61B 2017/0409; A61B 2017/0417; A61B 2017/0459; A61B 2017/045; A61B 2017/0451; A61F 2/0811; A61F 2002/0852
See application file for complete search history.

(56) References Cited

U.S. PATENT DOCUMENTS

| | | |
|---|---|---|
| 2011/0106155 A1 | 5/2011 | Theobald et al. |
| 2012/0065731 A1 | 3/2012 | Justin |
| 2012/0150297 A1 | 6/2012 | Denham et al. |
| 2012/0203249 A1 | 8/2012 | Schmidt, II et al. |
| 2013/0035720 A1* | 2/2013 | Perriello ............. A61F 2/0811 606/232 |
| 2013/0158600 A1 | 6/2013 | Conklin et al. |
| 2013/0172944 A1 | 7/2013 | Fritzinger et al. |
| 2013/0268073 A1 | 10/2013 | Albertorio et al. |
| 2015/0039026 A1 | 2/2015 | Pasquali et al. |
| 2016/0089131 A1 | 3/2016 | Wade |
| 2016/0220347 A1 | 8/2016 | Hoover et al. |
| 2018/0249998 A1* | 9/2018 | Chavan ............. A61B 17/0487 |
| 2020/0289109 A1 | 9/2020 | Chavan |
| 2021/0068809 A1 | 3/2021 | Federspiel et al. |
| 2021/0068810 A1 | 3/2021 | Federspiel et al. |
| 2023/0165668 A1* | 6/2023 | Einarsson ............. A61F 2/0045 600/30 |

OTHER PUBLICATIONS

PCT International Search Report and Written Opinion of the International Searching Authority, PCT/US22/31479 dated Aug. 19, 2022.

\* cited by examiner

KNOTLESS ORTHOPEDIC STABILIZATION SYSTEM AND RELATED METHODS

CROSS-REFERENCES TO RELATED APPLICATIONS

The present application is a nonprovisional patent application claiming the benefit of priority to U.S. Provisional Patent Application Ser. No. 63/194,436, filed on 28 May 2021 and entitled "Knotless, Self-locking Suture Button and Related Methods for Tissue Repair," U.S. Provisional Patent Application Ser. No. 63/254,136, filed on 10 Oct. 2021 and entitled "Knotless Orthopedic Stabilization System and Related Methods," and U.S. Provisional Patent Application Ser. No. 63/293,738, filed 24 Dec. 2021 and entitled "Knotless Orthopedic Stabilization System and Related Methods," the complete disclosures of which are hereby expressly incorporated by reference into this disclosure as if set forth fully herein.

FIELD

The present disclosure relates generally to surgical repair of bone or soft tissue, and more particularly to knotless repair of bone or soft tissue using a suture and button assembly.

BACKGROUND

Bone suspension devices, such as button-suture assemblies, that stabilize bone and tissue are known in the art. The current devices secure the bone and soft tissue by locking the suture in place via a secondary fixation element, such as a knot, screw, pin, hook, or staple, etc. In these procedures, after a hole is drilled through the bone, sutures are passed through the hole and fixed on the distal side of the hole. The bones and/or tissue are then pulled closer together and a secondary fixation element (e.g., knot) is applied on the proximal side of the assembly to hold the tension. For example, tying a knot to hold the suture tight is relatively difficult and can result in some of the tension being lost as the knot is completed and the tying mechanisms (whether tool or fingers) release their grip on the suture. As a result, the loop of the knot may spring back or relax one or more millimeters before the assembly is secured, and then resulting tension is significantly less than the tension initially intended.

Typically, similar repairs involve a device that requires a secondary fixation element such as a knot and/or fixation hardware (e.g., screw, hook, pin, staple etc.) to hold the repair in place after tensioning of the tensionable fixation member. These devices do not have a self-locking mechanism to accomplish the repair. While these techniques can be effective for repair, some devices may experience failure do to reasons including but not limited to: (a) failure of the secondary fixation element, (b), failure of the soft tissue junction where the knot is tied, (c) implant back-out causing delayed onset of symptoms that may require a second surgery to fix, and (d) a complicated suturing technique close to blood vessels and nerve that can cause short term or long term complications if injured at the time of fixation.

Knotless systems also exist that employ various mechanisms for length adjustment and locking. In most of these, either the strength of the construct (measured by tension to failure) or its stability (by way of loss of tension) are sacrificed in favor of attaining better ease of use.

SUMMARY

The present disclosure describes a knotless stabilization system having a base member (e.g., button, plate, etc.) and locking element associated with a tensionable fixation member (e.g., a surgical suture, tape, and the like) that can be used for surgical repair of bone or soft tissue. The knotless stabilization system of the present disclosure can be used to stabilize, fix, and/or repair bone or soft tissue using tensionable fixation members. In some embodiments, the knotless stabilization system may have a built-in locking mechanism so that the device is self-locking. In some embodiments, the knotless stabilization system may couple with tensionable fixation members (e.g., suture/tapes) that are tensioned to secure, fix, or tension the bone, soft tissue or another member to achieve repair.

The knotless stabilization system of the present disclosure provides the ability to perform a soft tissue repair or bone repair using a method for securing sutures or tensionable fixation members in a knotless manner. The knotless stabilization system of the present disclosure is designed in a manner to as to not rely on an additional component to perform the locking. The knotless stabilization system of the present disclosure includes the ability to optimally tension the repair by pulling the tensionable fixation members (e.g., sutures) in the tensioning (e.g., proximal) direction and prevent slippage of the tensionable fixation members in the opposite (e.g., distal) direction by capturing the tensionable fixation members in a manner such that pulling on the tensionable fixation members in the direction opposite of the tensioning direction (e.g., if connected tissue or bone were to attempt to "pull away" from the button-suture assembly under tension) actually increases the tension, resulting in a tighter locking interface to increase the security of the repair.

In some embodiments, the present disclosure includes a method of repairing bone or soft tissue using a suture interacting with a self-locking button.

In some embodiments, the knotless stabilization system of the present disclosure includes the ability to perform a repair by eliminating the need to use a secondary fixation element such as a knot and/or fixation hardware (e.g., screw, hook, pin, staple etc.) to hold the repair in place after tensioning of the tensionable fixation member, thereby preventing complications associated with failures of secondary fixation elements.

In some embodiments, the knotless stabilization system and related methods of the present disclosure make the surgery safer by eliminating the need to tie a knot through a small incision and around important anatomical structures using invasive surgical instruments such as needles which can cause inadvertent damage.

In some embodiments, the knotless stabilization system of the present disclosure includes the ability to tension the tissue directly. The tension created may also assist with maintaining the fixation as described above.

The knotless stabilization system and related methods of use described herein will make bone and/or soft tissue repair safer, faster, cheaper, more reliable, and less complex due to the self-locking design.

The unique method of repair disclosed herein allows the surgeon to fix the soft tissue or bone using a self-locking fixation assembly. This method of repair also teaches a technique to connect the tensionable fixation members or fibers used to repair a torn tissue (e.g., tendon) to the self-locking fixation assembly, and a technique to tension the repair using a knotless, self-locking interaction which eliminates the need to use a back-up device or technique for fixation.

By way of example only, for the purpose of disclosure, a biceps tendon repair is used in the method of repair technique described herein, however the repair method may be used for in any number of tissue repair procedures.

In some embodiments, the knotless stabilization system disclosed herein may be provided to the surgeon in an assembled state to begin the repair (e.g., with base member, locking element, and one or more shuttle members associated with the base member and locking element). By way of example, the knotless stabilization system may have a base member and a locking element. In some embodiments, the shuttle members may be connected later. In some embodiments, the shuttle members may have a looped end or a capture mechanism to connect with the tensionable fixation member used for repair of the tendon. This technique may require passing each of those tensionable fixation members ends through a capture end of the shuttle members.

In some embodiments, the tensionable fixation members are first secured to the tissue (e.g., tendon) to be repaired and then loaded in the capture ends of the shuttle members. The free ends of the shuttle members are pulled in the proximal (or pulling) direction. The pull in the proximal direction will chaperone the tensionable fixation members through the base member. Finally, the shuttle members will be removed and the tensionable fixation members attached to the tissue to be repaired will be threaded through fixation assembly.

Pulling the tensionable fixation members will tension the repair and pull the tendon close to the fixation assembly to a desired site of repair, for example by decreasing the distance between the tendon and the fixation assembly. The tension can be adjusted to the surgeons liking, and the tensionable fixation members are then locked in place relative to the fixation assembly. The locking happens at a locking interface or "pinch point" wherein the tensionable fixation members are captured between cooperating surfaces of the base member and the locking element. Pulling on the tensionable fixation members in the proximal direction will create tension which can be changed or increased by additional pulling in the same direction. Once the knotless stabilization system is in its locked state the tensionable fixation members, fixation assembly, and repaired tissue will maintain its locked state through a combination of compression, friction, and tension. This completes the repair with no need for an additional screw or knot tying.

If the tendon pulls away from the site of repair, it will pass the tension through the tensionable fixation members, causing the construct to lock tighter by pulling the locking element closer to the base member. This will pinch the tensionable fixation members even tighter and prevent the tendon from moving away from the repair state.

In some embodiments, the knotless orthopedic stabilization system described herein includes a locking assembly comprising a base member and a locking element, and a tensionable fixation member (e.g., a surgical suture, tape, fiber, etc.). In some embodiments, the base member includes a central recess sized and configured to receive the locking element therein upon assembly of the locking assembly. In some embodiments, the base member and locking element have complementary surfaces that form a locking interface to capture and hold the tensionable fixation member under tension, thereby locking the assembly in place.

In some embodiments, the locking assembly may couple with a tensionable fixation member (e.g., a surgical suture, tape, fiber, etc.) that is attached to a tissue, bone, or other member to lock the tensionable fixation member under tension during a surgical procedure. For example, in a biceps repair, one end of the tensionable fixation member (e.g., the "attachment end") may first be attached to or otherwise associated with a torn muscle or other tissue, then subsequently coupled with a locking assembly, (e.g., by threading or chaperoning the free end of the tensionable fixation member through the locking assembly as described herein) which may then be advanced through a surgical corridor formed through bone. Once the locking assembly is secured on the opposite side of the bone, the surgeon may apply a desired amount of tension to the tensionable fixation member in the direction of the attached tissue to locate and secure the tissue in the desired location, for example by decreasing the distance between the attached tissue and the locking assembly. By way of example, the locking assembly is a self-locking assembly that does not require secondary fixation (e.g., knots, fixation hardware, etc.) to secure the tension in the tensionable fixation member. Generally, the tensionable fixation member is threaded or chaperoned through the locking assembly by entering the locking assembly from one side (e.g., the bottom or proximal side) of the locking assembly, looping or making a "U-turn" around a crossbar or fulcrum element of the locking element, passing through a locking interface of the locking assembly (described below), and exiting the locking assembly on the same side as entry (e.g., bottom, or proximal side). The looping or "U-turn" of the tensionable fixation member provides several advantages over the existing button-suture assemblies, including but not limited to: (i) keeping the base member and locking element aligned and in a compressed state which maintains tension in the tension element; (ii) increasing tension in the construct in response to attached tissue being pulled away from the assembly; and (iii) maintaining compression in the locking interface.

Optionally, in any embodiment, the locking assembly may be provided with a secondary locking element to provide an additional secure interaction between the locking element and base member, for example to ensure that the locking element remains engaged with the base member during retensioning of the tensionable fixation member, if necessary, and to prevent rocking or other movement of the locking element within the central recess to prevent loosening of the tensionable fixation member. By way of example only, the secondary locking element may include any physical mechanism that provides a secure interaction between the base member and locking element, including but not limited to a press-fit engagement, snap-fit engagement, friction-fit engagement, and the like.

In some embodiments, the locking element includes one or more proximal extensions extending proximally from the bottom surface of the locking element. By way of example, the proximal extensions are sized and configured to be received within the lateral openings of the base member in a snug, flush, and/or nesting manner, when the locking assembly is in a locked state, such that a surface area of the proximal extensions engage with a surface area of the peripheral walls of the lateral openings. This engagement of surface areas stabilizes the locking element relative to the base member, for example preventing rocking or other movement that may cause the tension applied to the tensionable fixation members to loosen after the knotless stabilization system has been locked and the surgical procedure completed.

Optionally, in any embodiment, the knotless stabilization system includes an unlocking feature to unlock the locking assembly to enable re-tensioning of the tensionable fixation member after initial tensioning and locking has been completed. In some embodiments, the unlocking feature comprises an unlocking component or tool that can engage the base member and/or locking element and displace the locking element relative to the base member to create a space or distance or separation which allows for the tensionable fixation member to be relaxed and subsequently tensioned again if desired. The relaxed state will allow the tensionable fixation member to manipulate and slide for re-tensioning. Once the desired tension is achieved the unlocking component or tool is pulled back, removed, or otherwise disengaged from the base member and/or locking element. Due to the tensioned tensionable fixation member pulling the locking element in the proximal direction, the clearance gained by the unlocking tool will disappear and the tensionable fixation member will once again become pinched between the locking element and base member. By way of example only, the unlocking tool or component may comprise any tool or component suitable or capable of overcoming the tension in the tensionable fixation member to create a temporary separation between the locking element and the base member, including but not limited to a threaded member, a snap-fit trigger-controlled pusher/extender, a pliers-like gripper, and the like.

In some embodiments, the unlocking feature may comprise a deflectable member that is moveable from a first position in which the locking assembly is in a locked configuration to a second position in which the locking assembly is in an unlocked configuration, thereby enabling retentioning of the tensionable fixation member.

By way of example, this disclosure describes a unique technique to ease passage of a tensionable fixation member through a multi-component fixation assembly (e.g., locking assembly) used to connect soft tissue or any other tissue to an anchoring device. In some embodiments, the assembly device of the present disclosure includes the ability to shuttle the tensionable fixation member through a multi-component assembly. In some embodiments, the assembly device of the present disclosure includes the ability to pass a tensionable fixation member or tensionable fixation member in between multiple base members or fixation components so that the tensionable fixation members are positioned at a locking interface of the multiple fixation components. This assembly holder technique describes a unique mechanism of securing tensionable fixation members that are used to fix a tissue without the need to perform knot tying. It also prevents the tensionable fixation member from damage and/or breakage as the tensionable fixation member passes through the locking interface of the multi-component fixation assembly. In some embodiments, the assembly device allows for pressure on the tensionable fixation member during assembly with the multi-component fixation assembly to be relieved by reducing the friction at the locking interface of the multi-component assembly. This allows the user to pass the tensionable fixation member(s) through the assembly device in a seamless manner and then disengage the assembly device to couple the tensionable fixation member(s) with the multi-component fixation assembly to finish the repair.

By way of example only, an insertion instrument or flipper device that can be used for implantation of an anchoring device (e.g., fixation assembly) for a soft tissue bone or any other tissue repair is described herein, according to some embodiments. By way of example, the insertion instrument is designed in a way where it can perform multiple functions to aid in the process of this repair. The uniqueness of the flipper device of the present disclosure is that it allows the user to load an anchoring device or fixation assembly on the flipper device, which will maintain the anchoring device or fixation assembly in tension to assist with easy passage through the bony tunnel. When adequate position has been achieved, the surgeon or user will use a release feature to reduce the tension in the construct and flip the anchoring device or fixation assembly to the correct position.

In some embodiments, the fixation assembly of the present disclosure is designed to be used with a fracture plate application and is especially useful where fractures are fixed close to the articulate surface. In some embodiments, the angle of the articular surface e.g., inclination angle or curvatures may vary depending on the anatomical location. By way of example, precise reduction of the articular surface without any further damage to the articular surface from hardware placement is critical to patient outcome. The presently described knotless fixation assembly may have the ability to work with fracture plating systems, including but not limited to (and by way of example only) fracture plates that are used close to the articular surface e.g., distal and radius, fractures around the ankle joint, or shoulder, for example, or non-articular locations as well. In some embodiments, the knotless fixation assembly may be introduced through a hole in the fracture plate using a pilot hole, and the fixation assembly may be shuttled across the fracture site using a shuttling device. Upon reaching the outside of the cortex of at the far end of the fracture site, the fixation assembly may be tensioned to achieve reduction by changing the shape across the far end, changing the orientation (e.g., longitudinal to horizontal), and/or expanding in size. Tensioning of the tensionable fixation members (e.g., sutures, tape, wires, or other) will create compression across the fracture site. The small pilot hole created for the device shuttling will allow for the device to be positioned close to the articular surface. Tensioning will reduce the fracture pending compression at the fracture site and allow the locking member to lock within the fixation plate. This will reduce the risk of non-union, malunion hardware complications and repeat surgeries. It will also prevent the surgeon from making multiple incisions to place additional hardware to achieve repair.

Reestablishing the soft tissue and bony envelope is critical to a well-functioning repair especially when it is around a joint where the muscles and tendons assist with range of motion activities. By way of example, the present disclosure describes a fracture plate that connects the soft tissue and bone through the fracture plate using one or more tensionable fixation members (e.g., surgical suture, tape, wire, or other) in a knotless manner. By way of example only, the fracture plate is analogous to the base members described above in that the fracture plate supplies one of the compression surfaces in the locking interface, which a locking element secured to the plate by a tensionable fixation member supplies the other compression surface in the locking interface.

As additional description to the embodiments described below, the present disclosure describes the following embodiments.

Embodiment 1 is a knotless fixation assembly operable to fix tissue to tissue, bone, or other member, comprising: a base member having a proximal facing engagement surface configured to mate or fix to tissue, bone or other member, a distal facing surface opposite the proximal facing surface, a first through-hole extending between the proximal facing surface and the distal facing surface, and a first compression surface adjacent the first through-hole; a locking element configured to mate with the base member, the locking element having a proximal side, a distal side opposite the proximal side, a central opening extending between the proximal and distal sides, a first lateral opening extending between the proximal and distal sides and positioned adjacent the central opening, the first lateral opening separated from the central opening by a bridge member, the locking element having a second compression surface adjacent the central opening, the locking element having a first proximal extension protruding proximally from the proximal side; and a tensionable fixation member configured to interact with the base member and the locking element, the tensionable fixation member having an attachment end configured for attachment to tissue, bone, or other member and a free end configured for manipulation by a user, the tensionable fixation member passing through the base member and locking element between the first and second compression surfaces; wherein said knotless fixation assembly comprises a first state defining a first distance between the base member and the locking element and a second state defining a second distance between the base member and the locking element, the second distance being less than the first distance; wherein the free end of the tensionable fixation member is configured to be pulled taut in the proximal direction when the attachment end is mated with a first tissue and the base member is mated with a second tissue, bone, or other member, thereby creating tension in the tensionable fixation member which causes the knotless fixation assembly to transition from the first state to the second state, where the second state is maintained via compression and friction applied to the tensionable fixation member between the first and second compression surfaces; and wherein the first proximal extension is sized and configured to nest within the first through-hole when the knotless fixation assembly is in the second state, to prevent relative movement between the locking element and the base member when the assembly is in the second state.

Embodiment 2 is the knotless fixation assembly of embodiment 1, wherein the attachment end of the tensionable fixation member is movable in the distal direction but prevented from moving in the proximal direction when the knotless fixation assembly is in the second state.

Embodiment 3 is the knotless fixation assembly of embodiments 1 or 2, wherein the base member further comprises a recess positioned within the distal facing surface, the recess configured to receive the locking element therein.

Embodiment 4 is the knotless fixation assembly of any of embodiments 1 through 3, wherein the first through-hole is positioned within the recess.

Embodiment 5 is the knotless fixation assembly of any of embodiments 1 through 4, wherein the first through-hole has an inner perimeter wall having a first surface area.

Embodiment 6 is the knotless fixation assembly of any of embodiments 1 through 5, wherein the first proximal extension has an outer perimeter wall having a second surface area.

Embodiment 7 is the knotless fixation assembly of any of embodiments 1 through 6, wherein the first and second surface areas flushly engage one another when the knotless fixation system is in the second state.

Embodiment 8 is the knotless fixation assembly of any of embodiments 1 through 7, wherein the tensionable fixation member passes through the base member and locking element such that, from the attachment end, the tensionable fixation member passes distally through the first through-hole and the first lateral opening, loops around the bridge member and thereafter passes proximally through the central opening and the first through-hole between the first and second compression surfaces.

Embodiment 9 is the knotless fixation assembly of any of embodiments 1 through 8, wherein the base member further comprises a second through-hole extending between the proximal facing surface and the distal facing surface, and a third compression surface adjacent the second through-hole.

Embodiment 10 is the knotless fixation assembly of any of embodiments 1 through 9, wherein the locking element further comprises a second lateral opening extending between the proximal and distal sides and positioned adjacent the central opening opposite the first lateral opening, the second lateral opening separated from the central opening by a second bridge member, the locking element having a fourth compression surface adjacent the central opening and a second proximal extension protruding proximally from the proximal side, the second proximal extension sized and configured to nest within the second through-hole when the knotless fixation assembly is in the second state.

Embodiment 11 is the knotless fixation assembly of any of embodiments 1 through 10, further comprising a second tensionable fixation member configured to interact with the base member and the locking element, the second tensionable fixation member having an attachment end configured for attachment to tissue, bone, or other member and a free end configured for manipulation by a user, the second tensionable fixation member passing through the base member and locking element between the third and fourth compression surfaces.

Embodiment 12 is the knotless fixation assembly of any of embodiments 1 through 11, further comprising an unlock element configured to facilitate transition of the assembly from the second state to the first state upon engagement by a user.

Embodiment 13 is the knotless fixation assembly of any of embodiments 1 through 12, wherein the unlock element comprises a tool engagement feature configured to interface with an unlocking tool.

Embodiment 14 is the knotless fixation assembly of any of embodiments 1 through 13, wherein the unlock element comprises a threaded opening in the locking element.

Embodiment 15 is the knotless fixation assembly of any of embodiments 1 through 14, wherein the unlocking tool comprises a threaded shaft configured to engage the threaded opening and having a distal tip configured to engage a bearing surface of the base member, wherein actuation of the threaded shaft causes the distal tip to rotate against the bearing surface and the locking element to separate from the base member, thereby transitioning the assembly from the second state to the first state.

Embodiment 16 is the knotless fixation assembly of any of embodiments 1 through 15, wherein the unlock element comprises at least one cutout region positioned one at least one end of the locking element, the at least one cutout region having a bearing surface.

Embodiment 17 is the knotless fixation assembly of any of embodiments 1 through 16, wherein the unlocking tool comprises an engagement member configured to interface with the bearing surface of the locking element and is operable to separate the locking element from the base member, thereby transitioning the assembly from the second state to the first state.

Embodiment 18 is a knotless fixation assembly operable to fix tissue to tissue, bone, or other member, comprising: a base member having a proximal facing engagement surface configured to mate or fix to tissue, bone or other member, a distal facing surface opposite the proximal facing surface, a first through-hole extending between the proximal facing surface and the distal facing surface, and a first compression surface adjacent the first through-hole; a locking element configured to mate with the base member, the locking element having a proximal side, a distal side opposite the proximal side, a central opening extending between the proximal and distal sides, a first lateral opening extending between the proximal and distal sides and positioned adjacent the central opening, the first lateral opening separated from the central opening by a bridge member, the locking element having a second compression surface adjacent the central opening; and a tensionable fixation member configured to interact with the base member and the locking element, the tensionable fixation member having an attachment end configured for attachment to tissue, bone, or other member and a free end configured for manipulation by a user, the tensionable fixation member passing through the base member and locking element such that, from the attachment end, the tensionable fixation member passes distally through the first through-hole and the first lateral opening, loops around the bridge member and thereafter passes proximally through the central opening and the first through-hole between the first and second compression surfaces; wherein said knotless fixation assembly comprises a first state defining a first distance between the base member and the locking element and a second state defining a second distance between the base member and the locking element, the second distance being less than the first distance; wherein the free end of the tensionable fixation member is configured to be pulled taut in the proximal direction when the attachment end is mated with a first tissue and the base member is mated with a second tissue, bone, or other member, thereby creating tension in the tensionable fixation member which causes the knotless fixation assembly to transition from the first state to the second state, where the second state is maintained via compression and friction applied to the tensionable fixation member between the first and second compression surfaces.

Embodiment 19 is the knotless fixation assembly of embodiment 18, wherein the attachment end is movable in the distal direction but prevented from moving in the proximal direction when the knotless fixation assembly is in the second state.

Embodiment 20 is the knotless fixation assembly of embodiments 18 or 19, wherein the base member further comprises a recess positioned within the distal facing surface, the recess configured to receive the locking element therein.

Embodiment 21 is the knotless fixation assembly of any of embodiments 18 through 20, wherein the first through-hole is positioned within the recess.

Embodiment 22 is the knotless fixation assembly of any of embodiments 18 through 21, wherein the locking element includes a proximal extension extending proximally from the first lateral opening, the proximal extension configured to nest within the first through-hole when the knotless fixation assembly is in the second state.

Embodiment 23 is a knotless fixation assembly operable to fix tissue to tissue, bone, or other member, comprising: a base member having a proximal facing engagement surface configured to mate or fix to tissue, bone or other member, a distal facing surface opposite the proximal facing surface, a first through-hole extending between the proximal facing surface and the distal facing surface, and a first compression surface adjacent the first through-hole; a locking element configured to mate with the base member, the locking element having a proximal side, a distal side opposite the proximal side, a first opening extending between the proximal and distal sides, a second opening extending between the proximal and distal sides and positioned adjacent the first opening, the second opening separated from the first opening by a bridge member, the locking element having a second compression surface adjacent the first opening; and a tensionable fixation member configured to interact with the base member and the locking element, the tensionable fixation member having an attachment end configured for attachment to tissue, bone, or other member and a free end configured for manipulation by a user, the tensionable fixation member passing through the base member and locking element such that, from the attachment end, the tensionable fixation member passes distally through the base member and the second opening, loops around the bridge member and thereafter passes proximally through the first opening and the first through-hole between the first and second compression surfaces; wherein said knotless fixation assembly comprises a first state defining a first distance between the base member and the locking element and a second state defining a second distance between the base member and the locking element, the second distance being less than the first distance; wherein the free end of the tensionable fixation member is configured to be pulled taut in the proximal direction when the attachment end is mated with a first tissue and the base member is mated with a second tissue, bone, or other member, thereby creating tension in the tensionable fixation member which causes the knotless fixation assembly to transition from the first state to the second state, where the second state is maintained via compression and friction applied to the tensionable fixation member between the first and second compression surfaces.

Embodiment 24 is the knotless fixation assembly of embodiment 23, wherein the base member further includes a second through-hole extending between the proximal facing surface and the distal facing surface and positioned adjacent the first through-hole, and the tensionable fixation member passes distally through the base member by way of the second through-hole.

Embodiment 25 is the knotless fixation assembly of embodiments 23 or 24, wherein the second through-hole extends laterally to a longitudinal end of the base member.

Embodiment 26 is the knotless fixation assembly of any of embodiments 23 through 25, wherein the second opening extends laterally to a longitudinal end of the locking element.

Embodiment 27 is the knotless fixation assembly of any of embodiments 23 through 26, wherein the attachment end of the tensionable fixation member is movable in the distal direction but prevented from moving in the proximal direction when the knotless fixation assembly is in the second state.

Embodiment 28 is the knotless fixation assembly of any of embodiments 23 through 27, wherein the base member further comprises a recess positioned within the distal facing surface, the recess configured to receive the locking element therein.

Embodiment 29 is the knotless fixation assembly of any of embodiments 23 through 28, wherein the first through-hole is positioned within the recess.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION OF A PREFERRED EMBODIMENT

Figure 1:
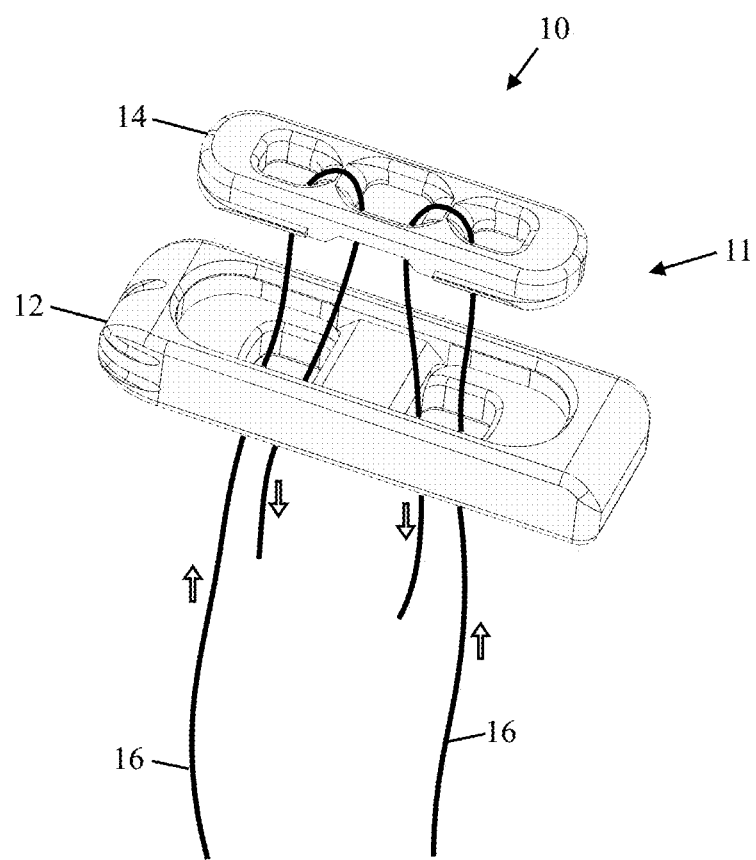
FIG. 1 is a perspective view of an example of a knotless orthopedic stabilization system according to some embodiments.
Figure 2:
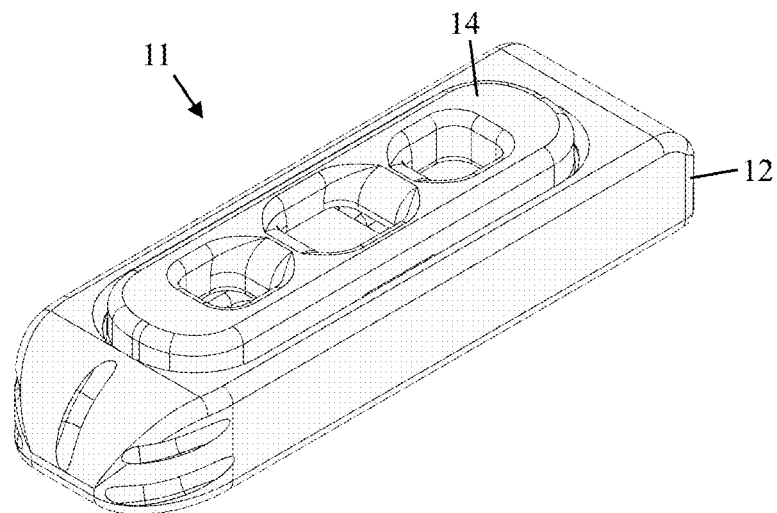
FIG. 2 is a perspective view of an example of a locking assembly forming part of the knotless orthopedic stabilization system of FIG. 1, according to some embodiments.
Figure 3:
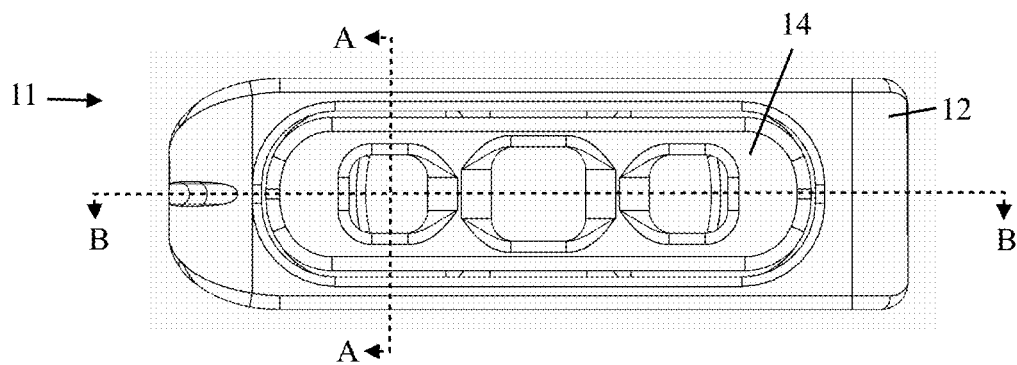
FIG. 3 is a top plan view of the locking assembly of FIG. 2, according to some embodiments.
Figure 4:
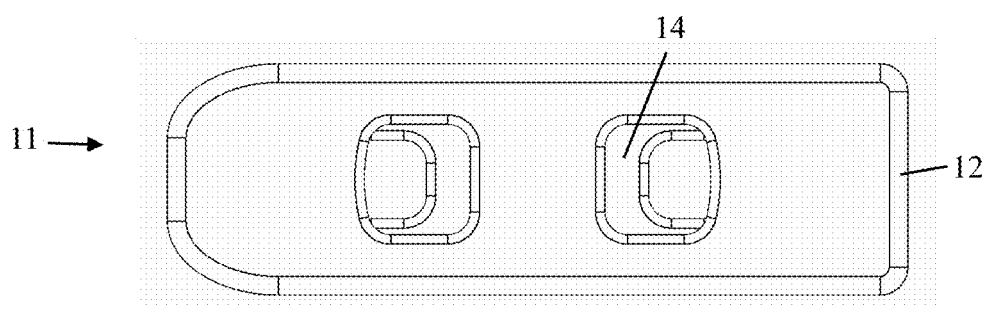
FIG. 4 is a bottom plan view of the locking assembly of FIG. 2, according to some embodiments.
Figure 5:
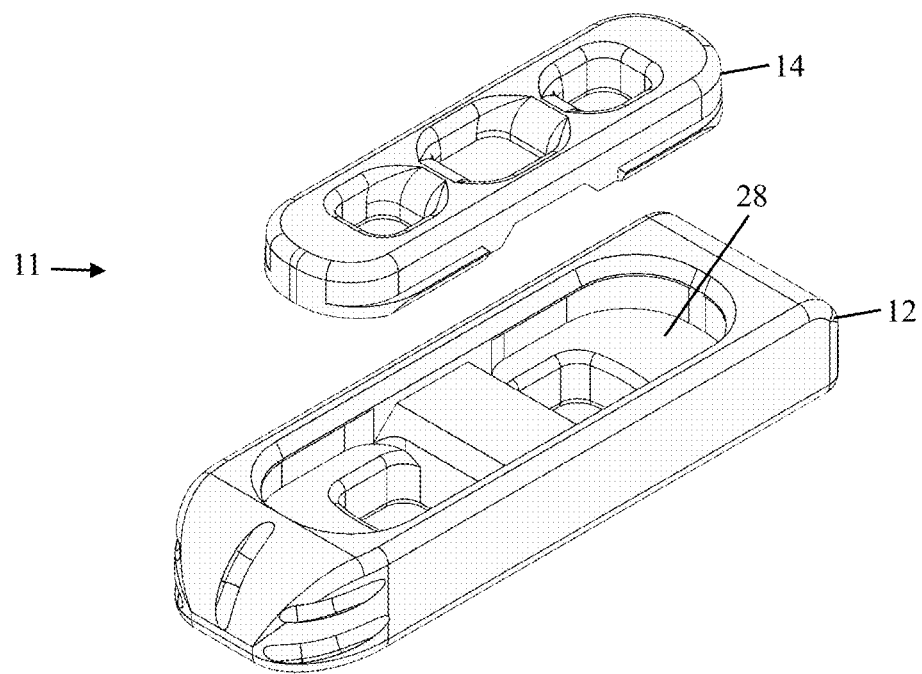
FIGS. 5-6 are exploded perspective views of the locking assembly of FIG. 2, according to some embodiments.
Figure 6:
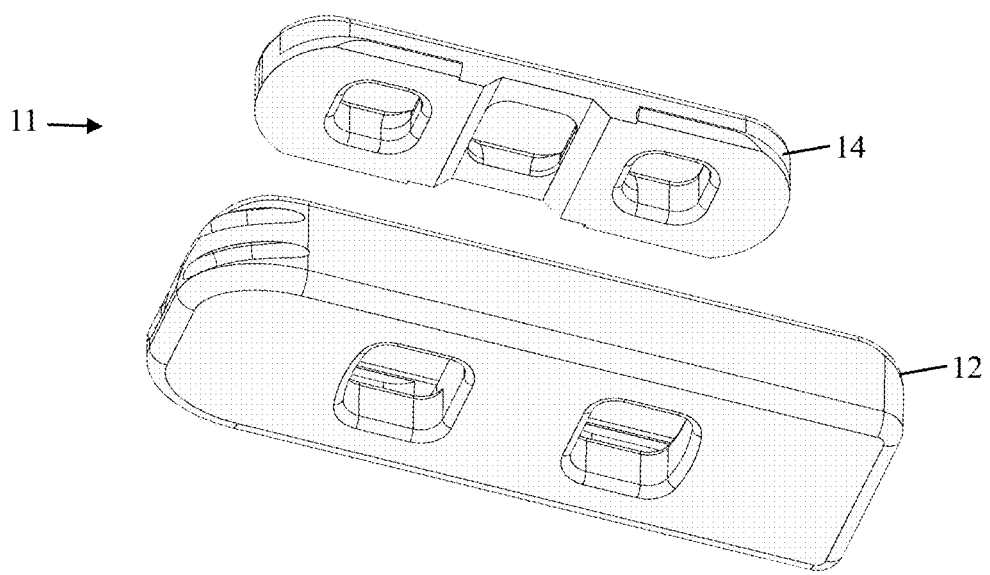

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and businessrelated constraints, which will vary from one implementation to another. Moreover, it will be appreciated that such a development effort might be complex and time-consuming but would nevertheless be a routine undertaking for those of ordinary skill in the art having the benefit of this disclosure. The knotless orthopedic stabilization system and related methods disclosed herein boasts a variety of inventive features and components that warrant patent protection, both individually and in combination.

FIGS. 1-19 illustrate an example of a knotless orthopedic stabilization system 10 according to one embodiment of the present disclosure. By way of example only, the knotless orthopedic stabilization system 10 includes a locking assembly 11 comprising a base member 12 and a locking element 14, and a tensionable fixation member 16 (e.g., a surgical suture, tape, fiber, etc.). The base member 12 includes a central recess 28 sized and configured to receive the locking element 14 therein upon assembly of the locking assembly 11. As will be explained in further detail herein, the base member 12 and locking element 14 have complementary surfaces that form a locking interface to capture and hold the tensionable fixation member 16 under tension, thereby locking the assembly in place.

By way of example only, FIGS. 2-6 illustrate an example of a locking assembly 11 forming part of the knotless orthopedic stabilization system 10 described herein, according to some embodiments. In some embodiments, the locking assembly 11 may couple with a tensionable fixation member 16 (e.g., a surgical suture, tape, fiber, etc.) that is attached to a tissue, bone, or other member to lock the tensionable fixation member 16 under tension during a surgical procedure. For example, in a biceps repair, one end of the tensionable fixation member 16 (e.g., the "attachment end") may first be attached to or otherwise associated with a torn muscle or other tissue, then subsequently coupled with a locking assembly 11, (e.g., by threading or chaperoning the free end of the tensionable fixation member 16 through the locking assembly 11 as described herein) which may then be advanced through a surgical corridor formed through bone. Once the locking assembly 11 is secured on the opposite side of the bone, the surgeon may apply a desired amount of tension to the tensionable fixation member 16 in the direction of the attached tissue to locate and secure the tissue in the desired location, for example by decreasing the distance between the attached tissue and the locking assembly 11. By way of example, the locking assembly 11 is a self-locking assembly that does not require secondary fixation (e.g., knots, fixation hardware, etc.) to secure the tension in the tensionable fixation member 16. Generally, the tensionable fixation member 16 is threaded or chaperoned through the locking assembly 11 by entering the locking assembly 11 from one side (e.g., the bottom or proximal side) of the locking assembly 11, looping or making a "U-turn" around a crossbar or fulcrum element of the locking element 14, passing through a locking interface of the locking assembly 11 (described below), and exiting the locking assembly 11 on the same side as entry (e.g., bottom or proximal side). The looping or "U-turn" of the tensionable fixation member 16 provides several advantages over the existing button-suture assemblies, including but not limited to: (i) keeping the base member 12 and locking element 14 aligned and in a compressed state which maintains tension in the tension element 16; (ii) increasing tension in the construct in response to attached tissue being pulled away from the assembly; and (iii) maintaining compression in the locking interface.

Figure 7:
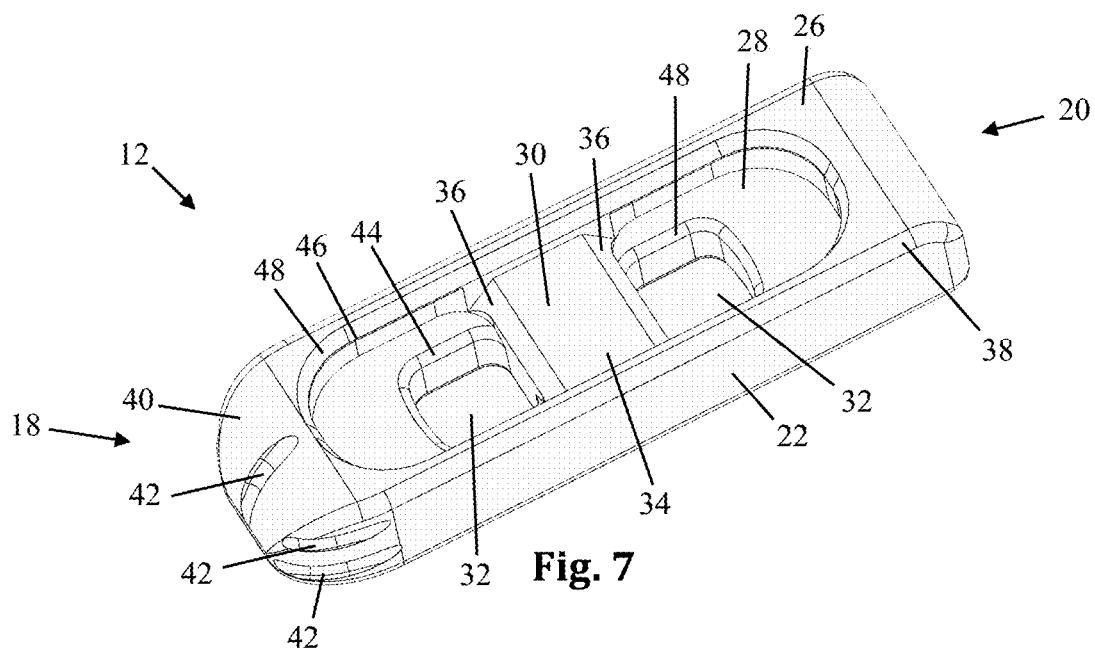
FIG. 7 is a perspective view of an example of a base member forming part of the locking assembly of FIG. 2, according to some embodiments.
Figure 8:
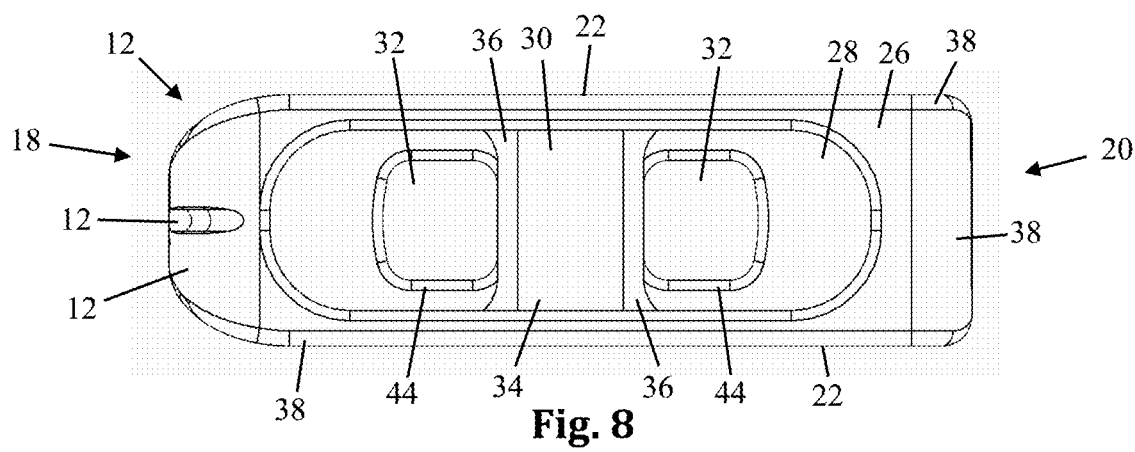
FIG. 8 is a top plan view of the base member of FIG. 7, according to some embodiments.
Figure 9:
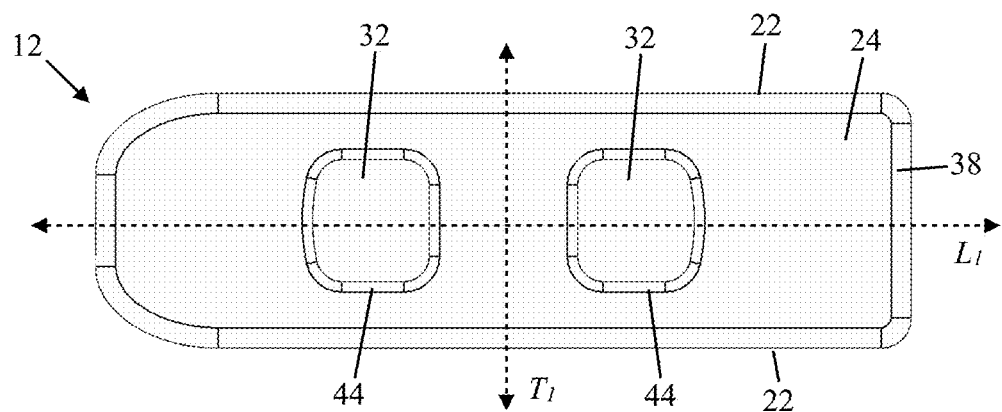
FIG. 9 is a bottom plan view of the base member of FIG. 7, according to some embodiments.
Figure 10:
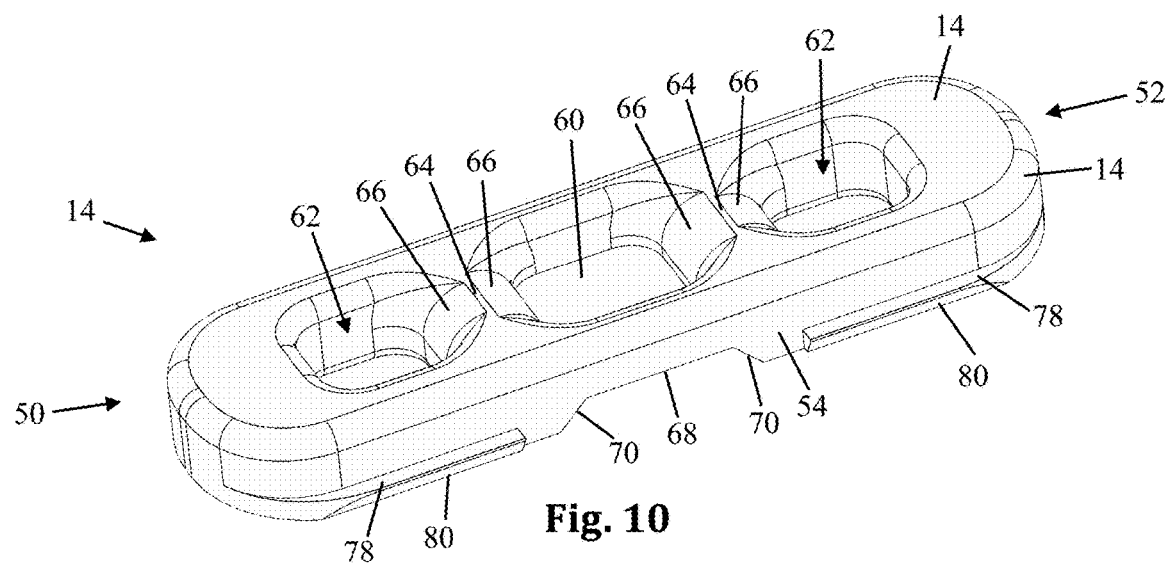
FIG. 10 is a perspective view of an example of a locking element forming part of the locking assembly of FIG. 2, according to some embodiments.
Figure 11:
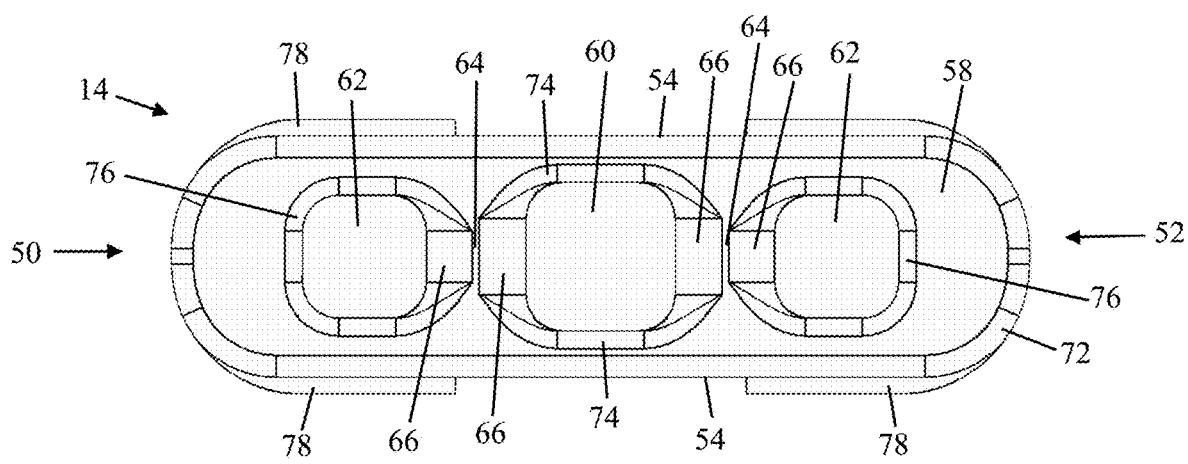
FIG. 11 is a top plan view of the locking element of FIG. 10, according to some embodiments.
Figure 12:
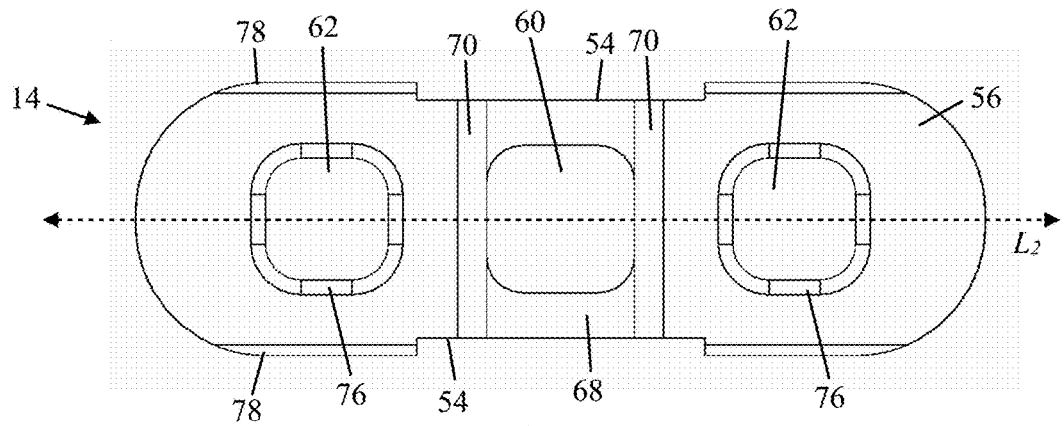
FIG. 12 is a bottom plan view of the locking element of FIG. 10, according to some embodiments.
Figure 13:
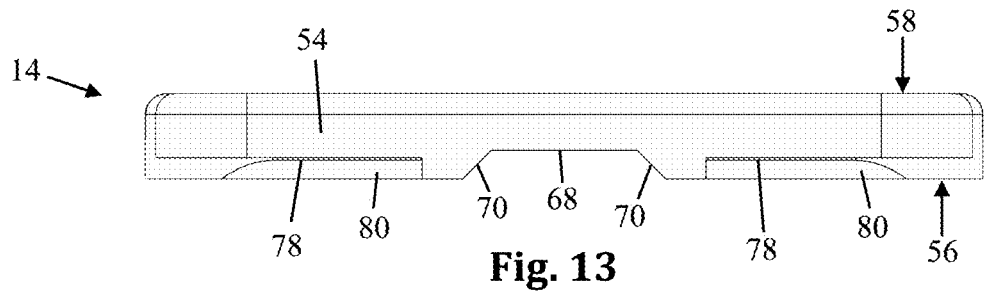
FIG. 13 is a side plan view of the locking element of FIG. 10, according to some embodiments.
Figure 14:
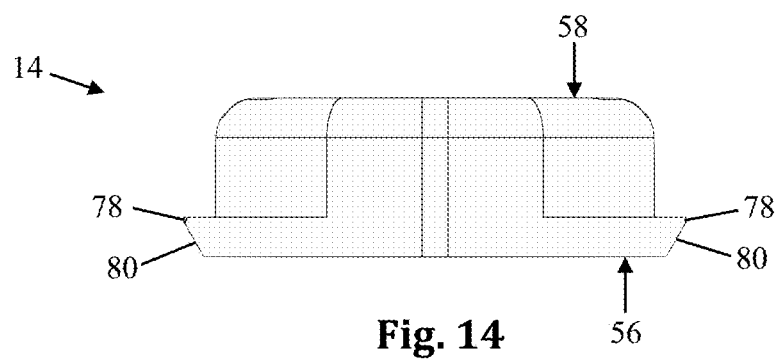
FIG. 14 is an end plan view of the locking element of FIG. 10, according to some embodiments.

By way of example only, FIGS. 7-9 illustrate one example of a base member 12 forming part of the locking assembly 11 described herein, according to one embodiment. In some embodiments, the base member 12 may have a generally rectangular shape having a first end 18, a second end 20, a pair of long sides 22, and a longitudinal axis $L_1$ extending therethrough. By way of example, in some embodiments, the base member 12 may have a first or bottom surface 24 configured to interface with tissue, bone, or other member and a second or top surface 26 opposite the bottom surface 24. In some embodiments, the top surface 26 includes a central recess 28 having a size and shape that is complimentary to the size and shape of the locking element 14 so that the locking element 14 fits snugly within the recess 28 upon assembly.

In some embodiments, the base member 12 may further include a central structure 30 and a pair of lateral openings 32 positioned within the central recess 28, with one lateral opening 32 positioned on each side of the central structure 30. The central structure 30 includes a proximal facing surface 34 and a pair of smooth and/or rounded lateral surfaces 36 positioned on either side of the proximal facing surface 34 and each facing in the direction of a respective lateral opening 32. In some embodiments, the lateral surfaces 36 may be angled or tapered from a first height at the intersection with the proximal facing surface 34 to a second height within the central recess 28, for example at or near an intersection with the lateral openings 32. In some embodiments, the lateral surfaces 36 may extend at least partially over the lateral openings 32. In some embodiments, the lateral surfaces 36 are compression surfaces configured to act in concert with medial surfaces 70 of the locking element 14 (e.g., as a "locking interface") to capture or pinch the tensionable fixation member 16 therebetween (e.g., forming "pinch points") upon tensioning of the locking assembly 11 during use. In some embodiments, the central structure 30 comprises a transverse linear beam extending across the central recess 28 between the lateral openings 32 along a transverse axis $T_1$. In some embodiments, the central structure 30 may have a nonlinear shape resulting in one or both lateral surfaces 36 having a concave and/or convex shape. In some embodiments, the lateral surfaces 36 may have any combination of linear, convex, and/or concave orientations.

In some embodiments, the base member 12 may have a generally rectangular shape. In some embodiments, the base member 12 may have any shape suitable, including but not limited to rectangular, circular, oblong, oval, elliptical, or polygonal. In some embodiments, the base member 12 may be sized and configured to be inserted through a surgical corridor (e.g., having proximal and distal openings) formed in bone, tissue, and/or other anatomical structure and thereafter be pivoted, rotated, or otherwise maneuvered to extend across the distal opening of the surgical corridor without being pulled back through the corridor. In some embodiments, the base member 12 may further include rounded and/or smooth outer perimeter surfaces 38 to minimize the profile of the base member 12 and potentially reduce trauma to surrounding tissue during and after implantation. In some embodiments, the first end 18 comprises a leading end when the base member 12 is advanced through a corridor formed in bone, tissue, or other anatomical structures. In some embodiments, the first or leading end 18 has a smooth, rounded, and or tapered leading surface 40 configured to minimize the profile of the first or leading end 18 and potentially reduce trauma to surrounding tissue during and after implantation. In some embodiments, the first or leading end 18 further includes one or more longitudinal recesses 42 sized and configured to receive at least a portion of the tensionable fixation member 16 therein during advancement of the base member 12 through the surgical corridor, to reduce the profile of the tensionable fixation member 16 exposed to the surgical corridor to protect both the surgical corridor and the tensionable fixation member 16 from damage during implantation.

In some embodiments the distal and/or proximal openings of the lateral openings 32 comprise smooth, angled, tapered, and/or rounded edge surfaces 44 to reduce wear on the tension member 16 during use.

By way of example only, FIGS. 10-14 illustrate one example of a locking element 14 forming part of the orthopedic locking assembly 11 described herein, according to one embodiment. By way of example, the locking element 14 has a size and shape that is complimentary to the size and shape of the central recess 28 of the base member 12 so that the locking element 14 fits snugly within the central recess 28 upon assembly. In some embodiments, the locking element 14 may have a generally rectangular shape (e.g., with rounded ends) having a first end 50, a second end 52, a pair of long sides 54, a bottom surface 56 and a top surface 58 and a longitudinal axis $L_2$ extending therethrough. In some embodiments, the bottom surface 56 is configured to interface with the central recess 28 of the base member 12. In some embodiments, the locking element 14 further includes a central opening 60 and a pair of lateral openings 62 extending through the locking element 14 between the bottom and top surfaces 56, 58. The central opening 60 and lateral openings 62 are separated by a bridge or crossbar 64 or similar structure that may act as a fulcrum for the tensionable fixation member 16. In some embodiments, the crossbar(s) 64 may have a one or more rounded, curved, and/or smooth upper surfaces 66 to minimize friction or other forces applied to the tensionable fixation member 16 by the crossbar during use.

In some embodiments, the bottom surface 56 includes a central recess 68 formed around the central opening 60. By way of example, the central recess 68 may have a size and shape complimentary to the size and shape of the central structure 30 of the base member 12, so that the central structure 30 fits snugly within the central recess 68 of the locking element 14 upon assembly. In some embodiments, the central recess 68 includes a pair of smooth, tapered and/or rounded and/or curved medial surfaces 70 forming the boundaries of the central recess 68. By way of example, the medial surfaces 70 are tapered or curved inward (or medially) toward the central opening 60. In some embodiments, the medial surfaces 70 extend at least partially over the lateral openings 32 of the base member 12. In some embodiments, the medial surfaces 70 are compression surfaces configured to act in concert with lateral surfaces 36 of the base member 12 to capture or pinch the tensionable fixation member 16 therebetween upon tensioning of the tensionable fixation member 16 during use. In some embodiments, the central recess 68 may have a nonlinear shape resulting in one or both medial surfaces 70 having a concave and/or convex shape. In some embodiments, the medial surfaces 70 may have any combination of linear, convex, and/or concave orientations. In any embodiment, the medial surfaces 70 have a complimentary shape to the lateral surfaces 36 of the base member 12 so that the combined compressive action on the tensionable fixation member 16 is maintained.

In some embodiments, locking element 14 may further include rounded and/or smooth outer perimeter surfaces 72 to minimize the profile of the locking element 14 and potentially reduce trauma to surrounding tissue during and after implantation. In some embodiments, perimeter edge surfaces 74 of the central opening 60 comprises smooth, angled, tapered, and/or rounded edge surfaces to reduce wear on the tension member 16 during use. In some embodiments the distal and/or proximal openings of the lateral openings 62 comprise smooth, angled, tapered, and/or rounded edge surfaces 76 to reduce wear on the tension member 16 during use.

As explained herein, the knotless stabilization system 10 is a self-locking system, in which the tension applied to the tensionable fixation member 16 will ensure alignment of the locking element 14 within the base member 12 while also locking the assembly together due to the interaction of the tensionable fixation member 16 with the locking interface (i.e., the lateral surfaces 36 of the base member 12 and medial surfaces 70 of the locking element 14). Optionally, in any embodiment, the locking assembly 11 may be provided with a secondary locking element to provide an additional secure interaction between the locking element 14 and base member 12, for example to ensure that the locking element 14 remains engaged with the base member 12 during re-tensioning of the tensionable fixation member 16, if necessary, and to prevent rocking or other movement of the locking element 14 within the central recess 28 to prevent loosening of the tensionable fixation member 16. By way of example only, the secondary locking element may include any physical mechanism that provides a secure interaction between the base member 12 and locking element 14, including but not limited to a press-fit engagement, snap-fit engagement, friction-fit engagement, and the like.

Figure 15:
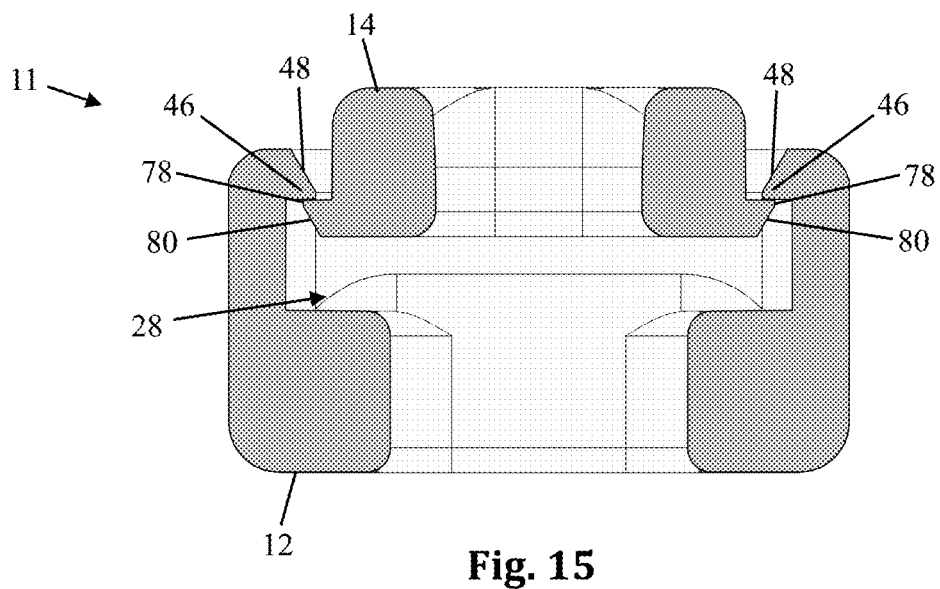
FIG. 15 is a cross-section view of the locking assembly of FIG. 2, taken along line A-A of FIG. 3, according to some embodiments.
Figure 16:
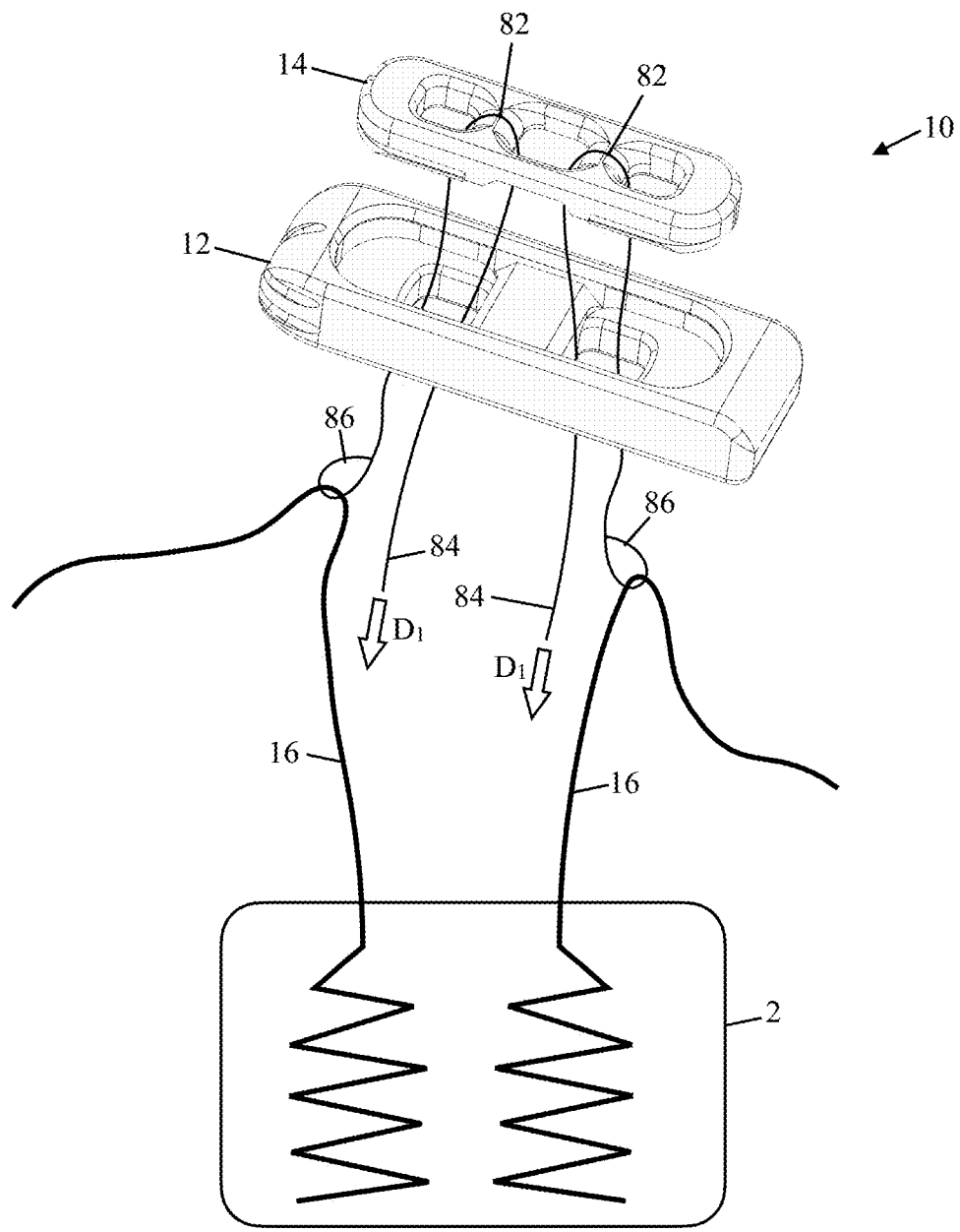
FIG. 16 is a perspective view of the knotless orthopedic stabilization system of FIG. 1, including the locking assembly of FIG. 2, a shuttle member, and tensionable fixation members attached to a tissue to be repaired, according to some embodiments.
Figure 17:
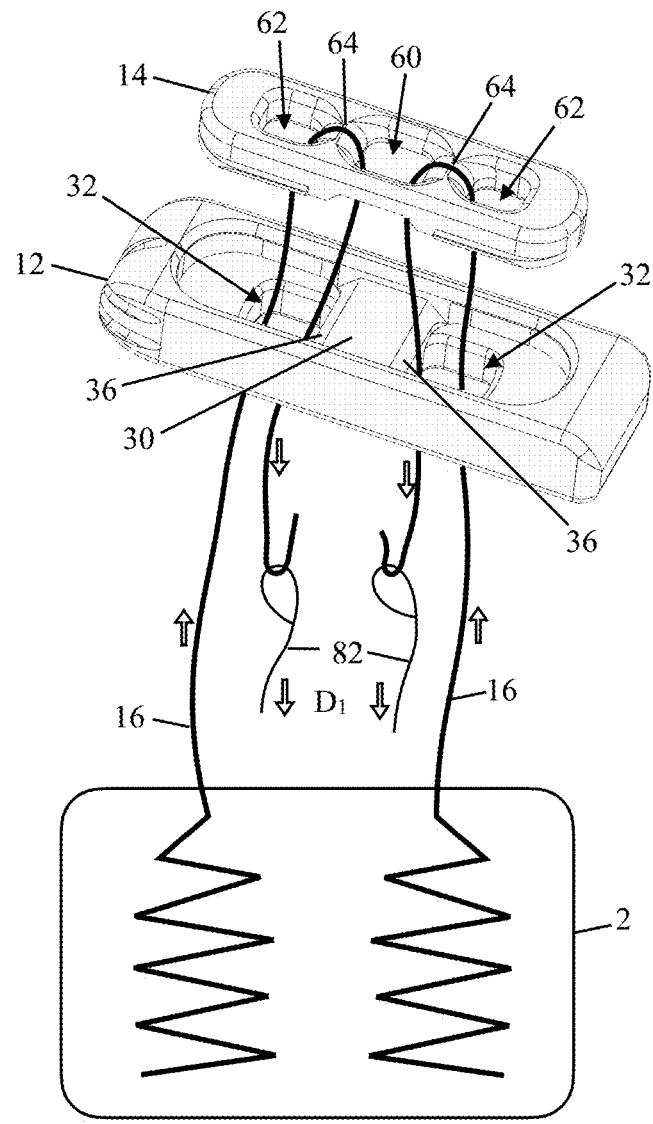
FIG. 17 is a perspective view of the knotless orthopedic stabilization system of FIG. 16 with the tensionable fixation member threaded through the locking assembly, according to some embodiments.
Figure 18:
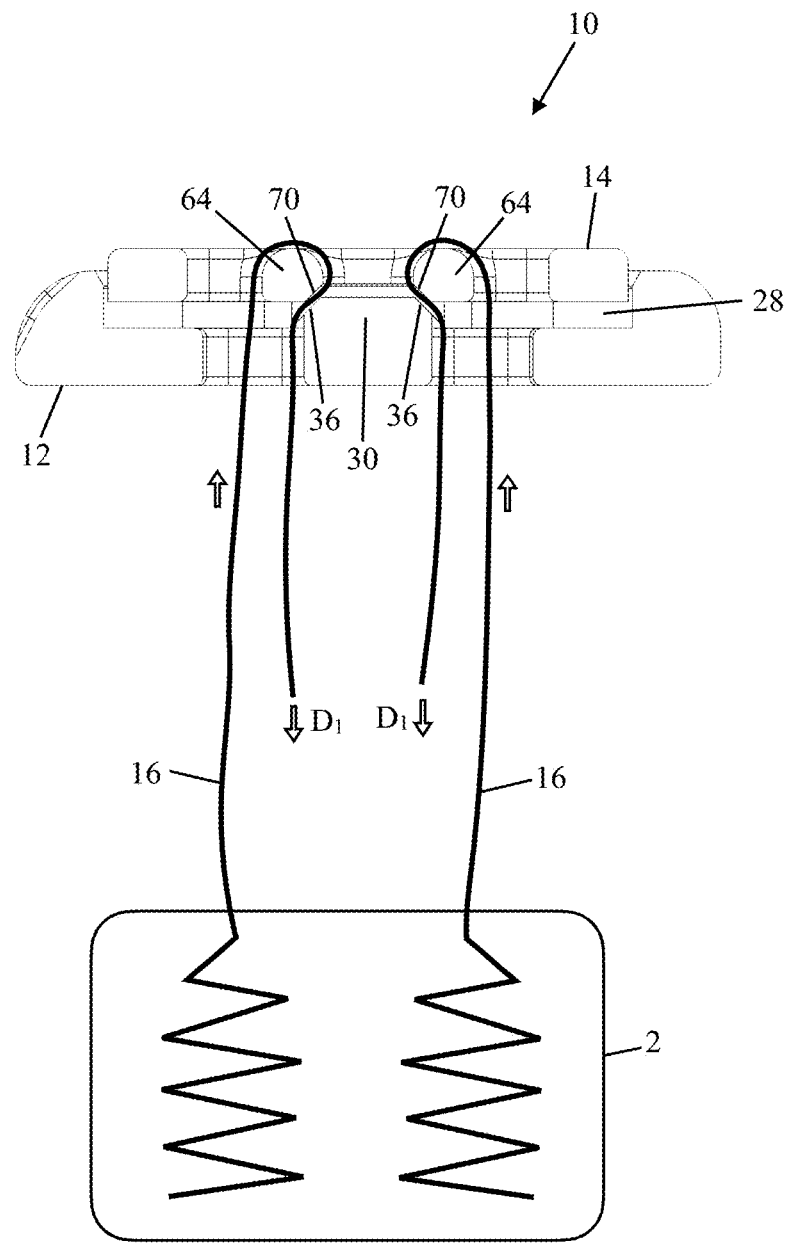
FIGS. 18-19 are side sectional views of the knotless orthopedic stabilization system of FIG. 17 with the tensionable fixation member threaded through, according to some embodiments.
Figure 19:
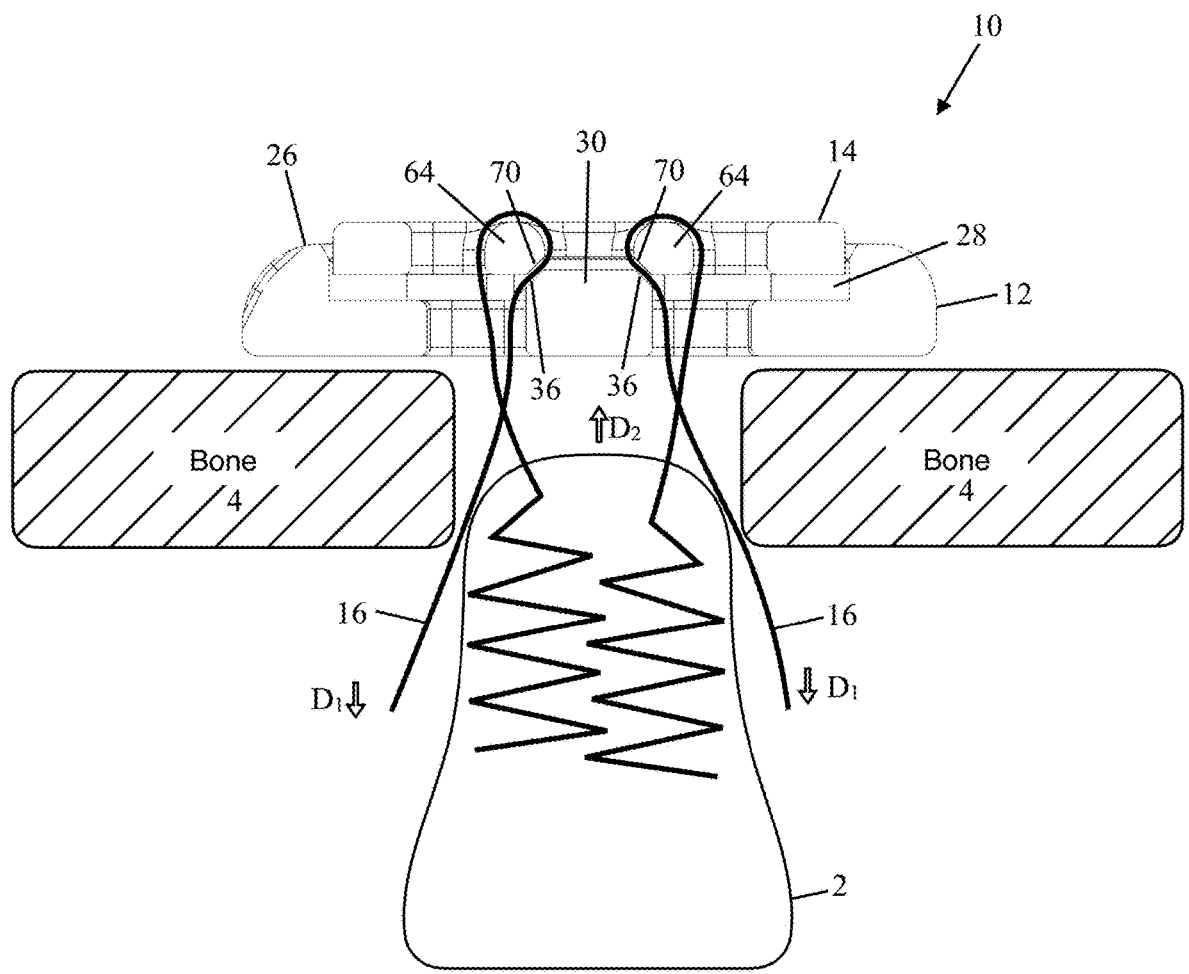
Figure 20:
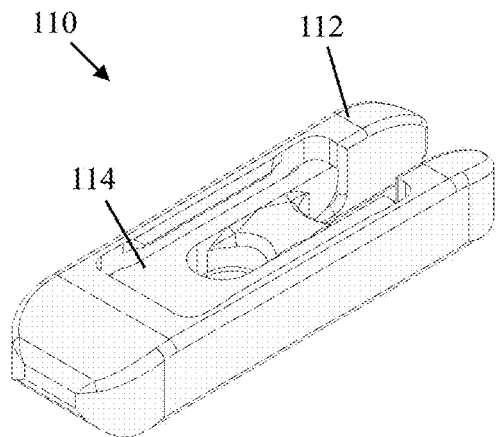
FIG. 20 is a perspective view of another example of a locking assembly configured for use with a flexible tensionable fixation member as part of the knotless orthopedic stabilization system disclosed herein, according to some embodiments.
Figure 21:
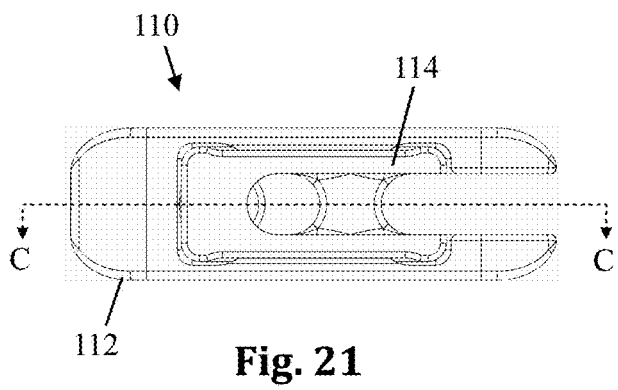
FIG. 21 is a top plan view of the locking assembly of FIG. 20, according to some embodiments.
Figure 22:
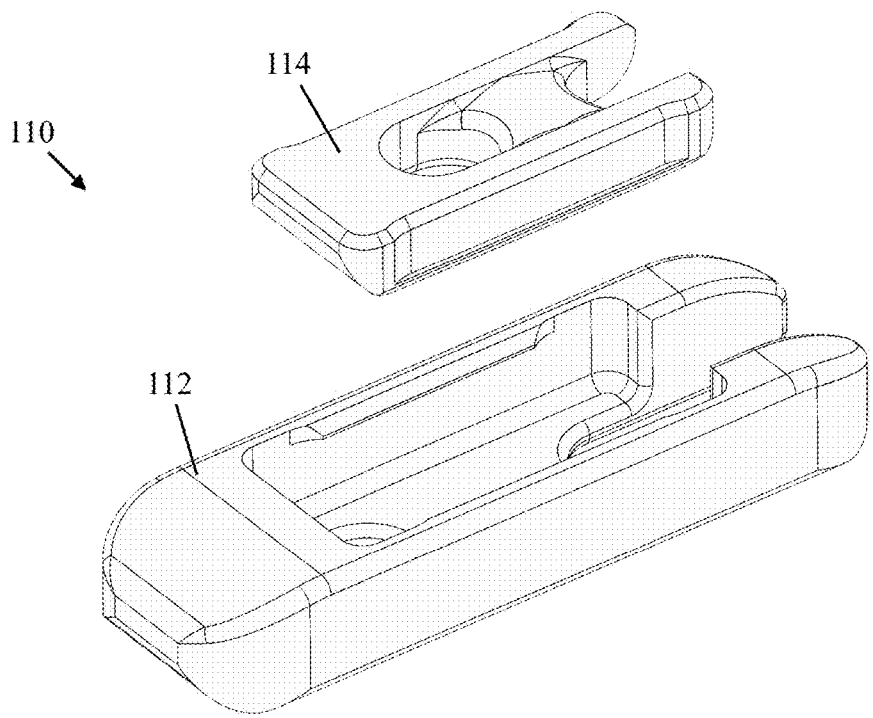
FIG. 22 is an exploded perspective view of the locking assembly of FIG. 20, according to some embodiments.

For example, FIG. 15 illustrates one example of a secondary locking element, according to some embodiments. By way of example only, the locking element 14 may further include one or more elongated flanges 78 positioned along the long sides 54 (for example) near the intersection with the bottom surface 56 and configured to engage with a corresponding elongated flange or overhang 46 extending from the top surface 26 of the base member 12 at least partially over the central recess 28 to form a secondary locking element and ensure retention of the locking element 14 within the base member 12. In some embodiments, the elongated flanges 78 may further include medial facing angled, tapered, or curved surfaces 80 configured to interface with corresponding medial facing angled, tapered, or curved surfaces 48 of the overhang 46 to enable proper alignment of the locking element 14 within the central recess 28 upon engagement of the locking element 14 with the base member 12, and to facilitate passage of the elongated flanges 78 beyond the overhang 46 and into the central recess 28. As shown by way of example in FIG. 14, once the elongated flanges 78 of the locking element 14 pass the overhang 46 of the central recess 28, the overhang 46 provides a physical barrier preventing the locking element 14 from disengaging from the central recess 28 in the absence of additional force applied by a user (e.g., with a removal tool).

In some embodiments, the central opening 60 of the locking element 14 is positioned such that, upon assembly with the base member 12, the central opening 60 is positioned over or aligned with the central structure 30 of the base member 12. In some embodiments, the lateral openings 62 of the locking element 14 are positioned such that, upon assembly with the base member 12, the lateral openings 62 of the locking element 14 are positioned over or aligned with the lateral openings 32 of the base member 12.

In some embodiments, the lateral openings 32 the base member 12 and the lateral openings 62 of the locking element 14 are not the same size. In some embodiments, the lateral openings 32 of the button are larger than the lateral openings 62 of the locking element 14, to enable the lateral compression surfaces 36, 70 to at least partially extend over the lateral openings 32.

By way of example, FIGS. 16-19 illustrate several steps of a method of fixing or repairing bone and/or tissue using the orthopedic locking assembly 11 of the present disclosure, according to some embodiments. In some embodiments, shuttle members 82 may be used to help thread the tensionable fixation members(s) 16 through the base member 12 and locking element 14, as shown by way of example only in FIGS. 16-17. In some embodiments, the shuttle member 82 may have a free end 84 and a capture end 86. By way of example, the capture end 86 is configured to capture or engage with a tensionable fixation member 16 so that the shuttle member 82 may chaperone the tensionable fixation member 16 through the locking assembly 11. By way of example, the capture end 86 may have any capture mechanism suitable for maintaining coupling with the tensionable fixation member 16 while chaperoning the tensionable fixation member 16 through the locking assembly 11, including but not limited to (and by way of example only), loops, adhesives, tear-away coupling, and the like.

In some embodiments, the shuttle member 82 may be coupled with the locking assembly 11 by: (i) advancing the free end 84 through one of the lateral openings 32 of the base member 12 in a distal direction (e.g., from the bottom surface 24 toward the top surface 26); (ii) further advancing the free end 84 through the correspondingly aligned lateral opening 62 of the locking element 14; (iii) advancing the free end 84 medially (e.g., toward the central opening 60) around the crossbar 64; (iv) advancing the free end 84 proximally (e.g. from the top surface 58 toward the bottom surface 56 of the locking element 14 so that the shuttle member 82 and by extension the tensionable fixation member 16 makes a "U-turn" around the crossbar 64) through the central opening 60 of the locking element 14; and (v) advancing the free end 84 proximally through the same lateral opening 32 that it was first advanced through, so that the free end 84 and capture end 86 are on the same side of the locking assembly 11, namely the proximal side (e.g. "below" the bottom surface 24 of the base member 12).

In some embodiments, the locking assembly 11 may be provided with the shuttle member 82 pre-threaded through the locking assembly 11 as described above. In some embodiments, the shuttle member 82 may be provided separately and threaded through the locking assembly 11 during or immediately prior to use.

In some embodiments, one end of a tensionable fixation member 16 is configured to be secured to a tissue, bone, or other member, and then chaperoned through the locking assembly 11 by a shuttle member 82. In the example shown in the accompanying figures, the tensionable fixation member 16 is attached to a tissue 2 (e.g., tendon, muscle, or bone) and coupled to a bone 4 using the locking assembly 11 and tensionable fixation member 16 of the present disclosure. Referring again to FIG. 16, one end of the tensionable fixation member 16 is attached to tendon 2, and the other end of the tensionable fixation member is coupled with the capture end 86 of the shuttle member 82 (e.g., threaded through a looped capture end 86). This step may be repeated for another tensionable fixation member 16 to pass through the second set of lateral openings 32, 62 of the locking assembly 11. By way of example, the second tensionable fixation member 16 may be coupled to another tissue portion (e.g., to repair a torn tissue), or to the same tissue segment as the first tensionable fixation member 16 (e.g., to secure a tissue to a bone). Preferably, the tensionable fixation members 16 are coupled with the tissue, bone, or other member before coupling with the locking assembly 11. Once the tensionable fixation members 16 are coupled to the capture ends 86 of the shuttle members 82, the free ends 84 may be pulled in the proximal direction $D_1$ (or "direction of pull"), which in turn causes the shuttle members 82, and by extension the tensionable fixation members 16, to be pulled through the locking assembly 11 as described above. Once the shuttle members 82 have been pulled completely through the locking assembly 11, the result is that the tensionable fixation members 16 will have been chaperoned through the locking assembly 11 in the same manner as the shuttle member 82, as described above, with the tensionable fixation member 16 making a "U-turn" around the crossbar 64 and with both the ends of the tensionable fixation member 16 (e.g., the loose end and the end coupled with a tissue, bone, or other member) on the same (e.g. proximal) side of the locking assembly 11, as shown by way of example only in FIGS. 17-20. The shuttle members 82 may then be disassociated from the tensionable fixation members 16 and removed from the surgical area, leaving only the tensionable fixation member(s) 16 that is/are a) coupled to a tissue, bone, or other member and b) threaded through the locking assembly 11 so that the loose end of the tensionable fixation member 16 is on the same side (e.g., proximal side) of the locking assembly 11 as the coupled end.

At this point, pulling the loose ends of the tensionable fixation members 16 in direction $D_1$ (proximally) will tension the repair, by pulling the tendon close to the locking assembly 11 in direction $D_2$ to a desired position for repair. By way of example only, the tension in the tensionable fixation members 16 can be adjusted to the surgeon's liking. By way of example, the locking assembly 11 is a self-locking assembly, wherein the locking occurs at a locking interface between the lateral surfaces 36 of the base member 12 and the medial surfaces 70 of the locking element 14, creating "pinch points" wherein the tensionable fixation member 16 is captured and held fast between the lateral surfaces 36 of the base member 12 and the medial surfaces 70 of the locking element 14. By way of example, pulling in direction $D_1$ will create tension which can be changed or increased by further pulling in the same direction. Once the locking assembly 11 is in its locked state the tensionable fixation member(s) 16, locking assembly 11, and tissue 2 will maintain its locked state by a combination of compression, friction, and tension. This completes the repair with no need for an additional screw or knot tying.

If the tendon tries to pull away from the site of repair, (e.g., in direction $D_1$) it will pass the tension through the tensionable fixation members 16 and it will further lock the assembly 11 by pulling the base member 12 and locking element 14 toward each other. This is because the tensionable fixation members 16 are captured and held fast at the locking interface between the lateral surfaces 36 of the base member 12 and the medial surfaces 70 of the locking element 14 (e.g. at the "pinch points"), and tensionable fixation members 16 are looped around or make a "U-turn" around the crossbars 64 (which in some embodiments may act as a fulcrum), and therefore a proximal force exerted by the tissue 2 pulling away from the locking assembly 11 in a proximal direction $D_1$ will in turn cause the tensionable fixation members 16 to exert a proximal force on the crossbar 64 and therefore the locking element 14, which increases compression on the tensionable fixation member 16 at the locking interface. This will pinch the tensionable fixation members 16 tight and prevent the tendon 2 (for example) from moving away from the repair state.

In some embodiments, the base member 12 and/or locking element 14 can be made out of metal, polymer, fiber or any other material that is used or can be used to create a fixation post. In some embodiments, the shuttle members 82 and/or tensionable fixation members 16 can be made of polymer, polyester, UHMWPE, nitinol, tape, or any other material that can be used or is commonly used to fix the tissue for repair.

By way of example only, the tissue referred to herein can be any soft tissue, tendon, muscle, graft, bone or bracing material that needs fixation or stabilization. The technique used to repair the tendon using the fiber can be Mattress, Krakow, or any other technique the surgeon prefers.

FIGS. 20-27 illustrate another example of a knotless orthopedic stabilization system 10 according to one embodiment of the present disclosure. By way of example only, the knotless orthopedic stabilization system 10 of the present example includes a locking assembly 110 comprising a base member 112 and a locking element 114, and a tensionable fixation member 16 (e.g., a surgical suture, tape, fiber, etc.). The base member 112 includes a central recess 128 sized and configured to receive the locking element 114 therein upon assembly of the locking assembly 110. As will be explained in further detail herein, the base member 112 and locking element 114 have complementary surfaces that form a locking interface to capture and hold the tensionable fixation member 16 under tension, thereby locking the assembly in place.

In some embodiments, the orthopedic locking assembly 110 may couple with a tensionable fixation member 16 (e.g., a surgical suture, tape, fiber, etc.) that is attached to a tissue, bone, or other member to lock the tensionable fixation member 16 under tension during a surgical procedure. For example in a biceps repair, one end of the tensionable fixation member 16 (e.g., the "attachment end") may first be attached to or otherwise associated with a torn muscle or other tissue, then subsequently coupled with a locking assembly 110, (e.g., by threading or chaperoning the free end of the tensionable fixation member 16 through the locking assembly 110 as described herein) which may then be advanced through a surgical corridor formed through bone. Once the locking assembly 110 is secured on the opposite side of the bone, the surgeon may apply a desired amount of tension to the tensionable fixation member 16 by pulling the free end of the tensionable fixation member 16 in the direction of the attached tissue to locate and secure the tissue in the desired location. By way of example, the locking assembly 110 is a self-locking assembly that does not require secondary fixation (e.g., knots, fixation hardware, etc.) to secure the tension in the tensionable fixation member 16. Generally, the tensionable fixation member 16 is threaded or chaperoned through the locking assembly 110 by entering the assembly 110 from one side (e.g., the bottom or proximal side) of the locking assembly 110 (and also by way of the open end described below), looping or making a "U-turn" around a crossbar or fulcrum element of the locking element 114, passing through a locking interface of the locking assembly 110 (described below), and exiting the locking assembly 110 on the same side as entry (e.g., bottom or proximal side). The looping or "U-turn" of the tensionable fixation member 16 provides several advantages over the existing button assemblies, including but not limited to: (i) keeping the base member 112 and locking element 114 aligned and in a compressed state which maintains tension in the tension element 16; (ii) increasing tension in the construct in response to attached tissue being pulled away from the assembly; and (iii) maintaining compression in the locking interface.

Figure 23:
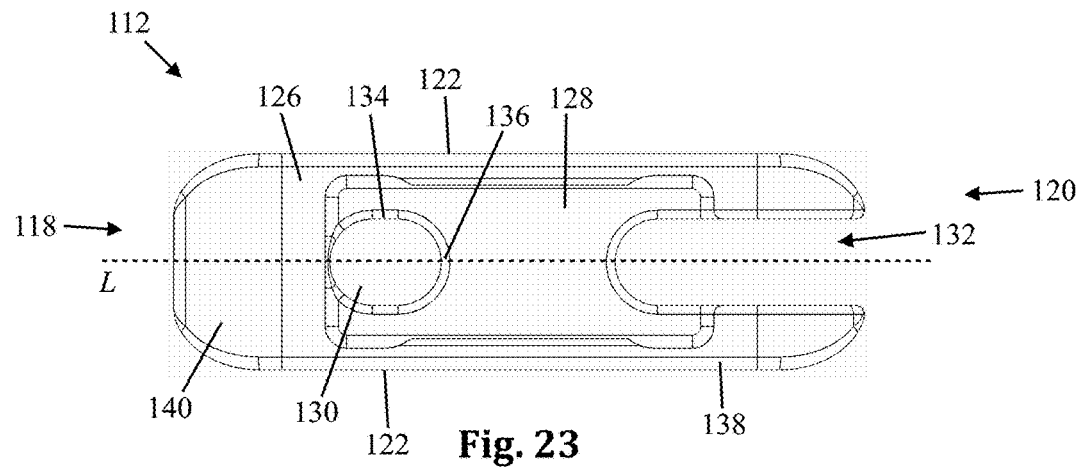
FIG. 23 is a top plan view a base member forming part of the locking assembly of FIG. 20, according to some embodiments.
Figure 24:
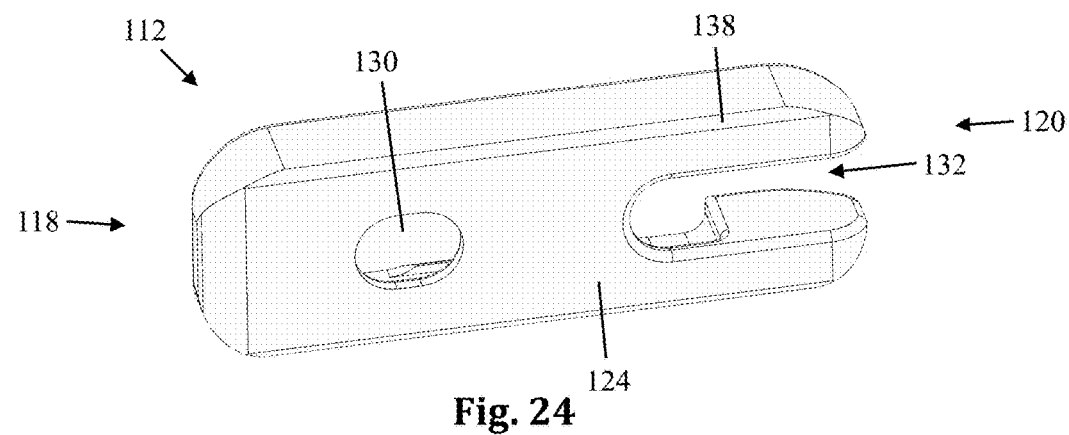
FIG. 24 is a bottom perspective view of the base member of FIG. 23, according to some embodiments.

By way of example only, FIGS. 23-24 illustrate one example of a base member 112 forming part of the locking assembly 110 described herein, according to one embodiment. In some embodiments, the base member 112 may have a generally rectangular shape having a first end 118, a second end 120, a pair of long sides 122, and a longitudinal axis $L_1$ extending therethrough. By way of example, in some embodiments, the base member 112 may have a first or bottom surface 124 configured to interface with tissue, bone, or other member and a second or top surface 126 opposite the bottom surface 124. In some embodiments, the top surface 126 includes a central recess 128 having a size and shape that is complimentary to the size and shape of the locking element 114 so that the locking element 114 fits snugly within the recess 128 upon assembly.

In some embodiments, the base member 112 may further include a first opening 130 formed within the central recess 128 and located proximate the first end 118 and a second opening 132 formed at least partially within the central recess 128 and extending along the longitudinal axis L to the second side 120. Notably, in this example embodiment, the second opening 132 is open to the second end 120, which may enable a faster and more efficient coupling of the locking assembly 110 and the tensionable fixation member 16. By way of example, the first opening 130 comprises a smooth, angled, tapered, and/or rounded edge surface 134 at the intersection with the central recess 128 to reduce wear on the tension member 16 during use. In some embodiments, the medial portion 136 of the edge surface 134 comprises a compression surface configured to act in concert with lateral portion 170 of the edge surfaces 168 of the locking element 114 (e.g., as a "locking interface") to capture or pinch the tensionable fixation member 16 therebetween (e.g., forming a "pinch point") upon tensioning of the locking assembly 110 during use.

In some embodiments, the base member 112 may have a generally rectangular shape. In some embodiments, the base member 112 may have any shape suitable, including but not limited to rectangular, circular, oblong, oval, elliptical, or polygonal. In some embodiments, the base member 112 may be sized and configured to be inserted through a surgical corridor (e.g., having proximal and distal openings) formed in bone, tissue, and/or other anatomical structure and thereafter be pivoted, rotated, or otherwise maneuvered to extend across the distal opening of the surgical corridor without being pulled back through the corridor. In some embodiments, base member 112 may further include rounded and/or smooth outer perimeter surfaces 138 to minimize the profile of the base member 112 and potentially reduce trauma to surrounding tissue during and after implantation. In some embodiments, the first end 118 comprises a leading end when the base member 112 is advanced through a corridor formed in bone, tissue, or other anatomical structures. In some embodiments, the first or leading end 118 has a smooth, rounded, and or tapered leading surface 140 configured to minimize the profile of the first or leading end 118 and potentially reduce trauma to surrounding tissue during and after implantation. Although not shown in the figures, in some embodiments, the first or leading end 118 further includes one or more longitudinal recesses sized and configured to receive at least a portion of the tensionable fixation member 16 therein during advancement of the base member 112 through the surgical corridor, to reduce the profile of the tensionable fixation member 16 exposed to the surgical corridor to protect both the surgical corridor and the tensionable fixation member 16 from damage during implantation.

Figure 25:
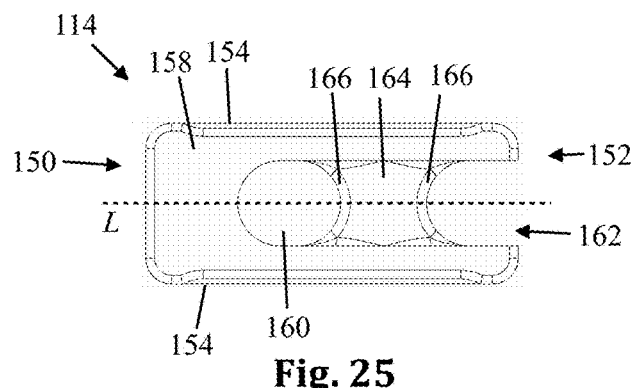
FIG. 25 is a top plan view of a locking element forming part of the locking assembly of FIG. 20, according to some embodiments.
Figure 26:
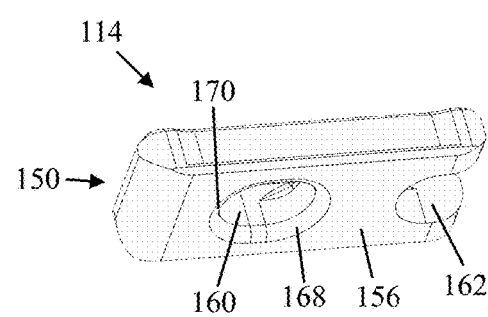
FIG. 26 is a bottom perspective view of the locking element of FIG. 25, according to some embodiments.

By way of example only, FIGS. 25-26 illustrate one example of a locking element 114 forming part of the orthopedic locking assembly 110 described herein, according to one embodiment. By way of example, the locking element 114 has a size and shape that is complimentary to the size and shape of the central recess 128 of the base member 112 so that the locking element 114 fits snugly within the central recess 128 upon assembly. In some embodiments, the locking element 114 may have a generally rectangular shape (e.g., with rounded ends) having a first end 150, a second end 152, a pair of long sides 154, a bottom surface 156, a top surface 158 and a longitudinal axis L extending therethrough. In some embodiments, the bottom surface 156 is configured to interface with the central recess 128 of the base member 112. In some embodiments, the locking element 114 further includes a first opening 160 positioned proximate the first end 150 and extending through the locking element 114 between the bottom and top surfaces 156, 158, and a second opening 162 positioned proximate the second end 152 and extending to the second end 152 such that the second end 152 comprises an open end that compliments the open second end 120 of the base member 112. The first and second openings 160, 162 are separated by a bridge or crossbar 164 or similar structure that may act as a fulcrum for the tensionable fixation member 16. In some embodiments, the crossbar(s) 164 may have a one or more rounded, curved, angled and/or smooth upper surfaces 166 to minimize friction or other forces applied to the tensionable fixation member 16 by the crossbar during use.

By way of example, the first opening 160 comprises a smooth, angled, tapered, and/or rounded edge surface 168 at the intersection with the central recess bottom surface 156 to reduce wear on the tension member 16 during use. In some embodiments, the lateral portion 170 of the edge surface 168 (e.g., the portion of the edge surface 168 proximate the first end 150) comprises a compression surface configured to act in concert with medial portion 136 of the edge surface 134 of the base member 112 (e.g., as a "locking interface") to capture or pinch the tensionable fixation member 16 therebetween (e.g. forming a "pinch point") upon tensioning of the locking assembly 110 during use.

In some embodiments, locking element 114 may further include rounded and/or smooth outer perimeter surfaces 172 to minimize the profile of the locking element 114 and potentially reduce trauma to surrounding tissue during and after implantation.

As explained herein, the knotless stabilization system 10 is a self-locking system, in which the tension applied to the tensionable fixation member 16 will ensure alignment of the locking element 114 within the base member 112 while also locking the assembly together due to the interaction of the tensionable fixation member 16 with the locking interface (i.e., the medial portion 136 of the rounded edge surface 134 of the base member 112 and lateral portion 170 of the edge surfaces 168 of the locking element 114 described above). In some embodiments, the locking assembly 110 may be provided with a secondary locking element (e.g., similar to the secondary locking element described above in relation to the locking assembly 11) to provide an additional secure interaction between the locking element 114 and base member 112, for example to ensure that the locking element 114 remains engaged with the base member 112 during re-tensioning of the tensionable fixation member 16, if necessary. By way of example only, the secondary locking element may include any physical mechanism that provides a secure interaction between the base member 112 and locking element 114, including but not limited to a press-fit engagement, snap-fit engagement, friction-fit engagement, and the like.

By way of example only, the locking element 114 may further include one or more elongated flanges 178 positioned along the long sides 154 near the intersection with the bottom surface 156 and configured to engage with a corresponding elongated flange or overhang 146 extending from the top surface 126 of the base member 112 at least partially over the central recess 128 to form a secondary locking element and ensure retention of the locking element 114 within the base member 112. In some embodiments, the elongated flanges 178 may further include medial facing angled, tapered, or curved surfaces 180 configured to interface with corresponding medial facing angled, tapered, or curved surfaces 148 of the overhang 146 to enable proper alignment of the locking element 114 within the central recess 128 upon engagement of the locking element 114 with the base member 112, and to facilitate passage of the elongated flanges 178 beyond the overhang 146 and into the central recess 128. By way of example, once the elongated flanges 178 of the locking element 114 pass the overhang 146 of the central recess 128, the overhang 146 provides a physical barrier preventing the locking element 114 from disengaging from the central recess 128 in the absence of additional force applied by a user (e.g., with a removal tool).

Figure 27:
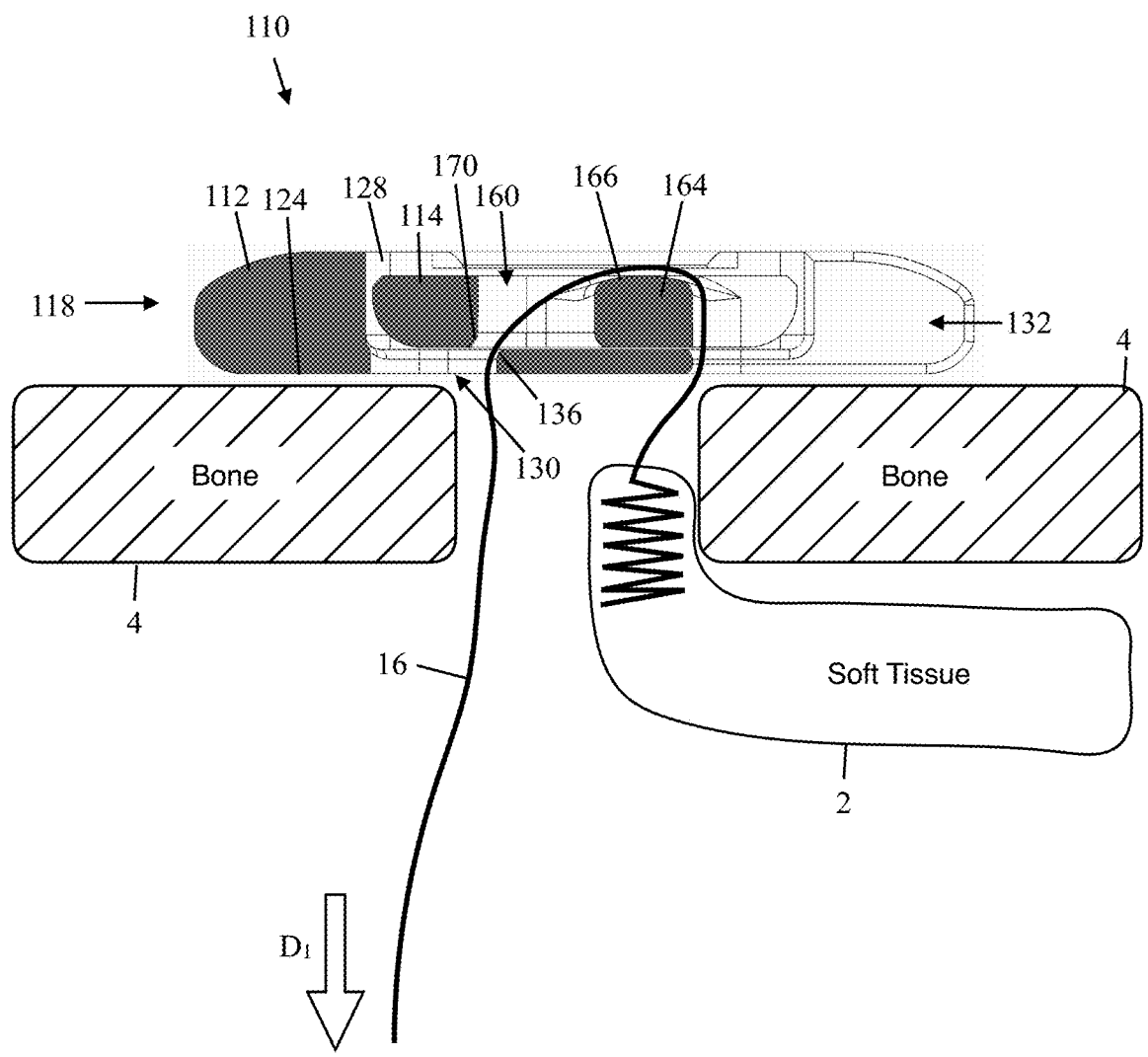
FIG. 27 is a side sectional view of the locking assembly of FIG. 20, taken along line C-C of FIG. 21, illustrating an exemplary use of the knotless orthopedic stabilization system disclosed herein, according to some embodiments.
Figure 28:
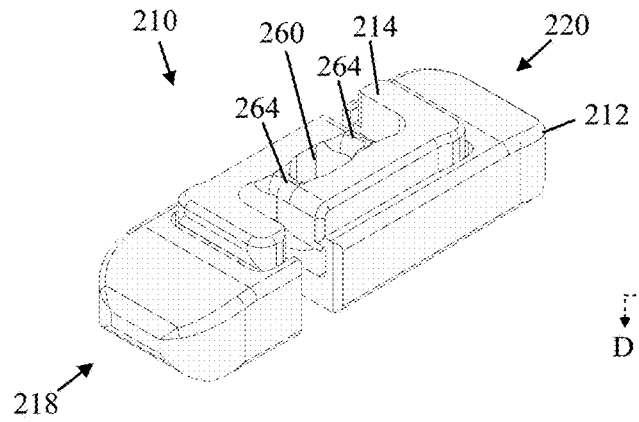
FIG. 28 is a perspective view of another example of a locking assembly configured for use with a flexible tensionable fixation member as part of the knotless orthopedic stabilization system disclosed herein, according to some embodiments.
Figure 29:
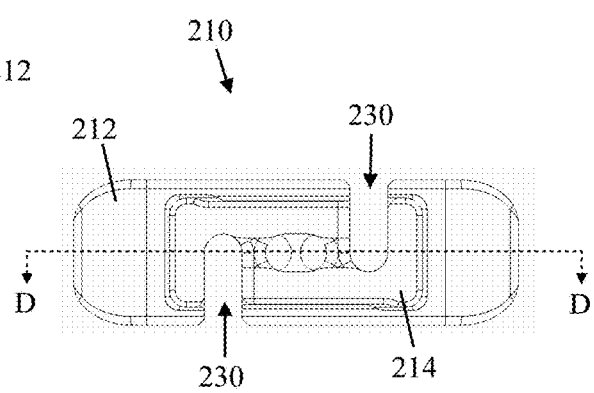
FIG. 29 is a top plan view of the locking assembly of FIG. 28.
Figure 30:
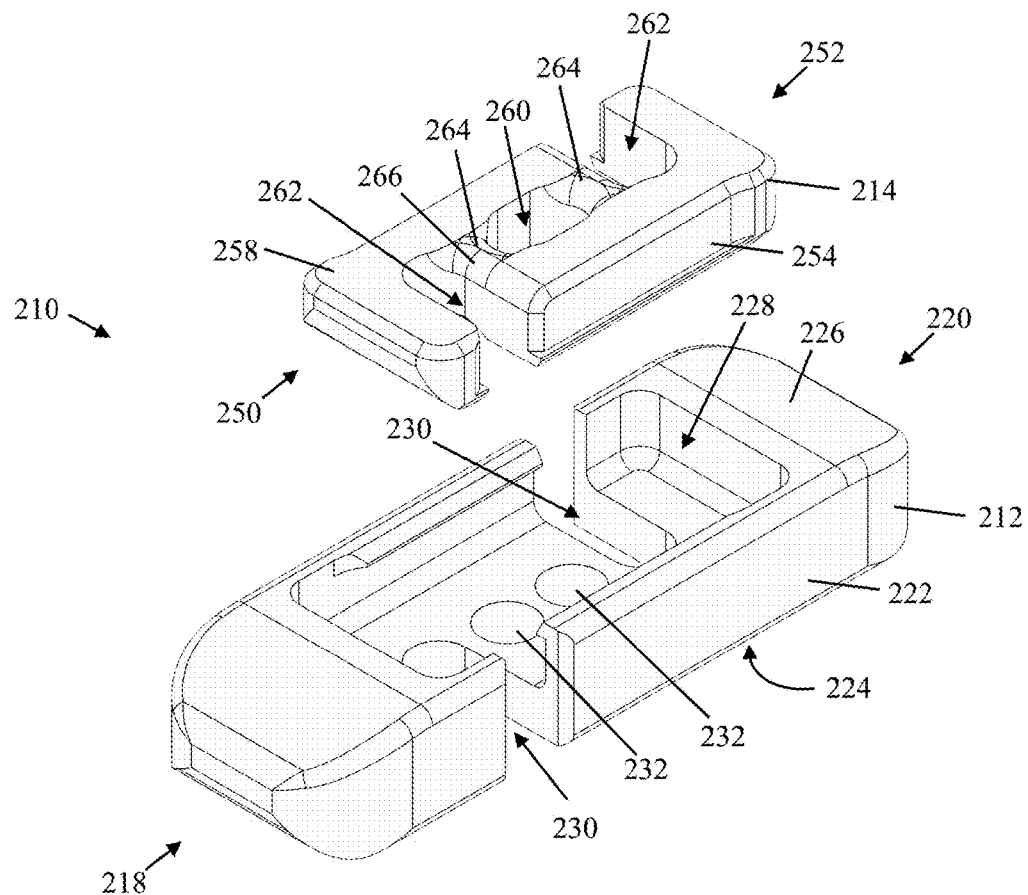
FIG. 30 is an exploded perspective view of the locking assembly of FIG. 28.

By way of example, FIG. 27 illustrates a tensionable fixation member 16 associated with the locking assembly 110 according to some embodiments. Although not shown, in some embodiments, the tensionable fixation member 16 may be chaperoned through the locking assembly 110 using a shuttle member 82 in a similar manner to that described above with the locking assembly 11.

In some embodiments, the tensionable fixation member 16 may be coupled with the locking assembly 110 by: (i) advancing a free end of the tensionable fixation member 16 (e.g., optionally using a shuttle member 82 as described above) through the second opening 132 of the base member 112 in a distal direction (e.g., from the bottom surface 124 toward the top surface 126) or alternatively sliding the tensionable fixation member 16 laterally into the second opening 132 via the open end 120 so that the attached tissue is on the proximal or bottom side of the base member 112 and the free end of the tensionable fixation member 16 extends distally through the second opening 132 (and second opening 162 of the locking element 114); (ii) advancing the tensionable fixation member 16 medially around the crossbar 164; (iii) advancing the tensionable fixation member 16 proximally (e.g. from the top surface 158 toward the bottom surface 156 of the locking element 114 so that the tensionable fixation member 16 makes a "U-turn" around the crossbar 164) through the first opening 160 of the locking element 114; and (iv) advancing the tensionable fixation member 16 proximally through the first opening 130 of the base member 112, so that the tensionable fixation member passes through the locking interface (e.g., between the medial portion 136 of the edge surface 134 of the base member 112 and the lateral portion 170 of the edge surface 168 of the first opening 160 of the locking element 114), and the free end and the attached end of the tensionable fixation member 16 are on the same side of the locking assembly 110, namely the proximal side (e.g. "below" the bottom surface 124 of the base member 112).

In some embodiments, the locking assembly 11 may be provided with a shuttle member (e.g., shuttle member 82 described above) pre-threaded through the locking assembly 110 as described above in relation to locking assembly 11. In some embodiments, the shuttle member 82 may be provided separately and threaded through the locking assembly 110 during or immediately prior to use.

With continued reference to FIG. 27, in some embodiments, one end of the tensionable fixation member 16 is configured to be secured to a tissue, bone, or other member, and then chaperoned through the locking assembly 110 by a shuttle member (not shown). In the example shown in FIG. 27, the tensionable fixation member 16 is attached to a soft tissue 2 (e.g., muscle, tendon, etc.) and coupled to a bone 4 using the locking assembly 110 and tensionable fixation member 16 of the present disclosure. For example, this method demonstrates repair of soft tissue e.g., biceps tendon. In some embodiments, the torn biceps tendon is repaired using a one or more tensionable fixation members 16. The surgeon may use the suturing technique based on his preference. In some embodiments, multiple tensionable fixation members 16 may be used with the locking assembly 110 (and/or any button assembly described herein) to achieve tissue repair. The one or more tensionable fixation members 16 attached to the tissue to be repaired (e.g., biceps tendon) will be connected to the locking assembly 110. The locking assembly 110 will allow for fixation of the bicep tendon, tensioning of the biceps repair and will self-lock and maintain tension once the repair is complete.

By way of example only, a surgical corridor or tunnel is drilled though the radial tuberosity. Next, one end or "attachment end" of the tensionable fixation member 16 is attached to tissue 2, and the other end or "free end" of the tensionable fixation member is shuttled through the locking assembly 110 as described herein. In some embodiments, additional tensionable fixation members 16 may be coupled to another tissue portion (e.g., to repair a torn tissue), or to the same tissue segment as the first tensionable fixation member 16 (e.g., to secure a tissue to a bone). Preferably, the tensionable fixation members 16 are coupled with the tissue, bone, or other member before coupling with the locking assembly 110.

Figure 78:
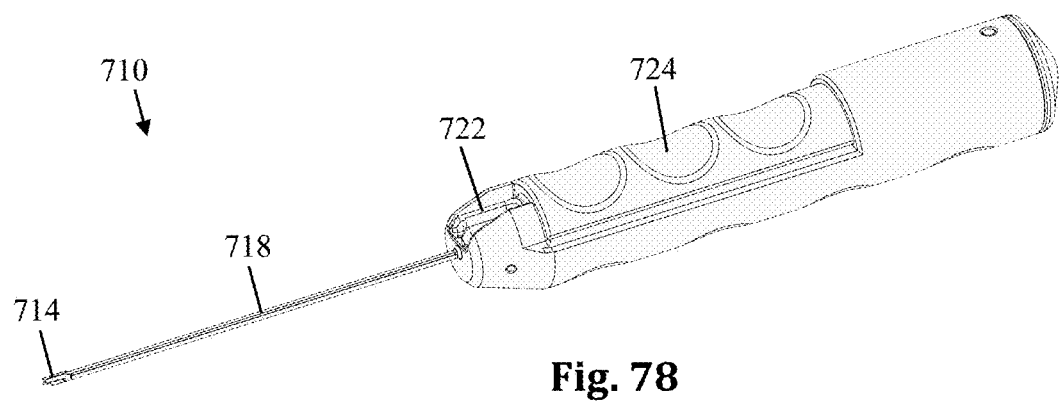
FIGS. 78-80 are perspective views of an example of an insertion instrument or flipper device that can be used for implantation of an anchoring device for a soft tissue bone or any other tissue repair, according to some embodiments.
Figure 79:
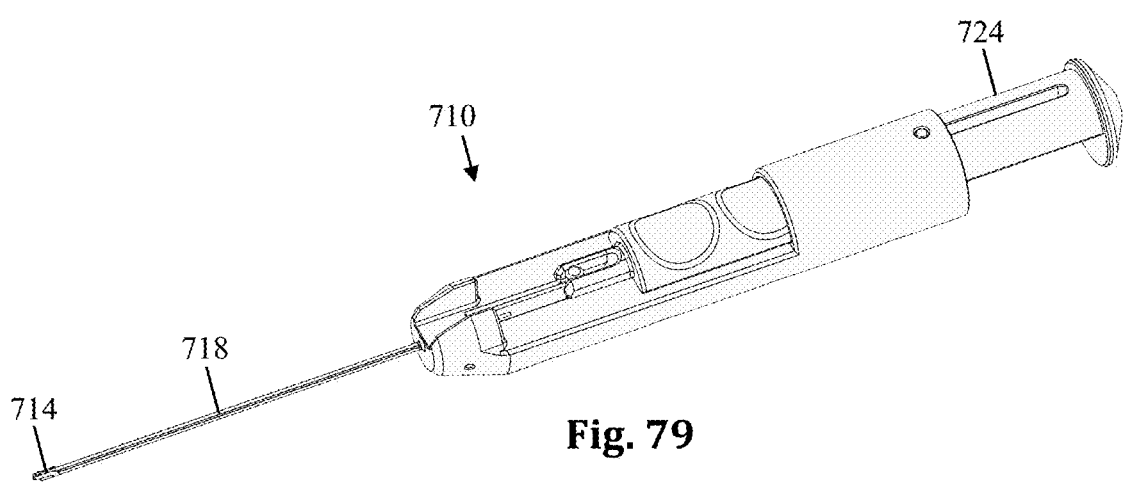
Figure 80:
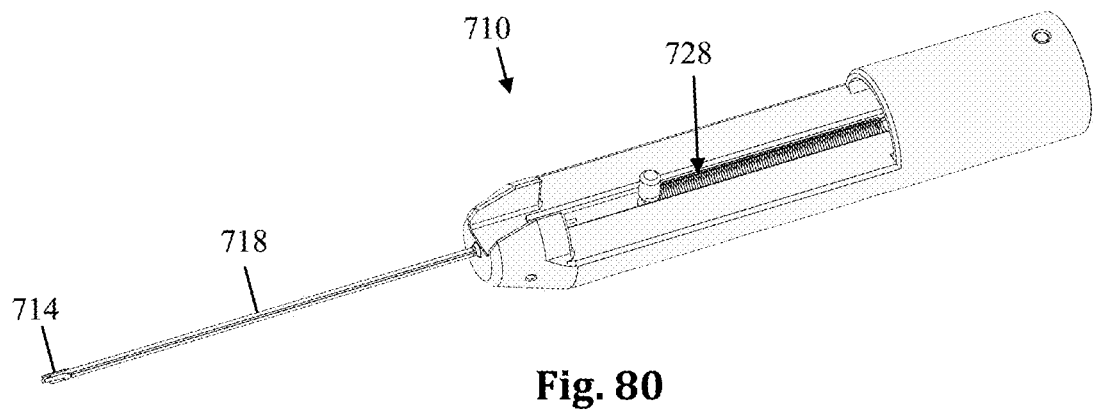
Figure 81:
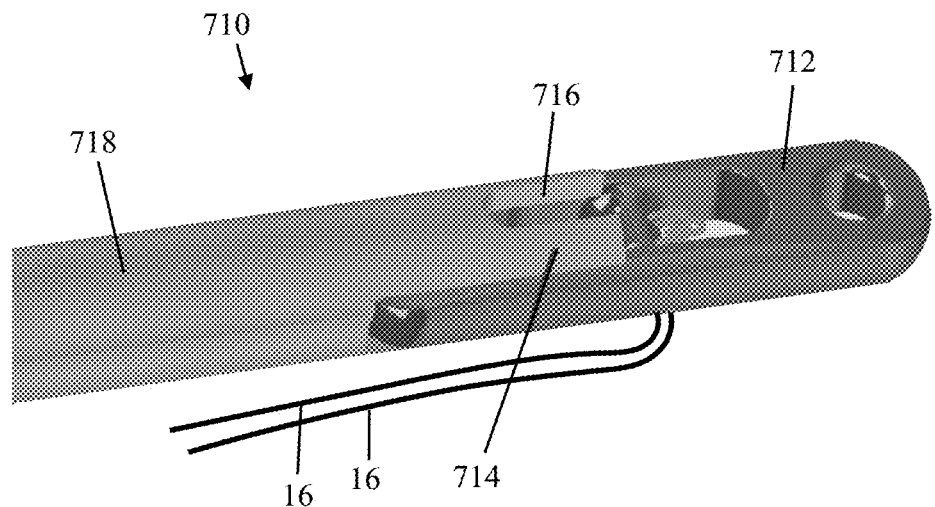
FIG. 81 is a perspective view of a distal end of the insertion instrument of FIG. 78 coupled with an anchor device, according to some embodiments.
Figure 82:
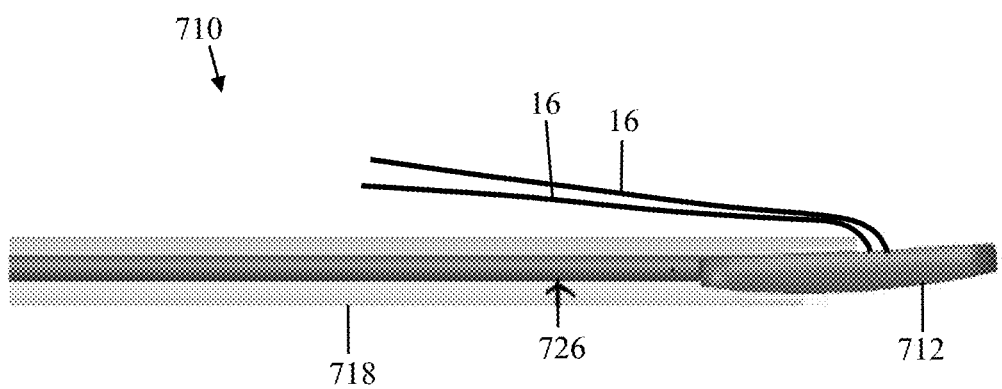
FIG. 82 is a side plan view of the distal end of the insertion instrument of FIG. 78 coupled with an anchor device, with an outer shaft of the insertion instrument shown as transparent, according to some embodiments.
Figure 83:
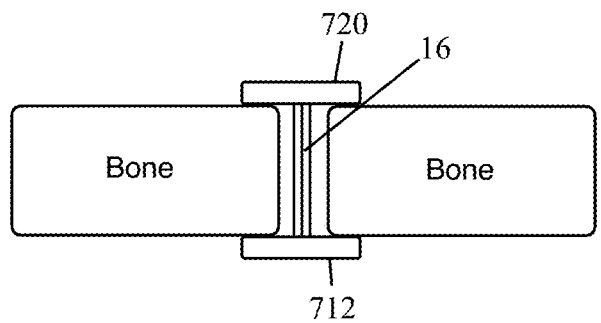
FIG. 83 is a block diagram of an anchor device coupled with a locking assembly by way of a tensionable fixation member through a bony channel after placement with the insertion device of FIG. 78, according to some embodiments.
Figure 84:
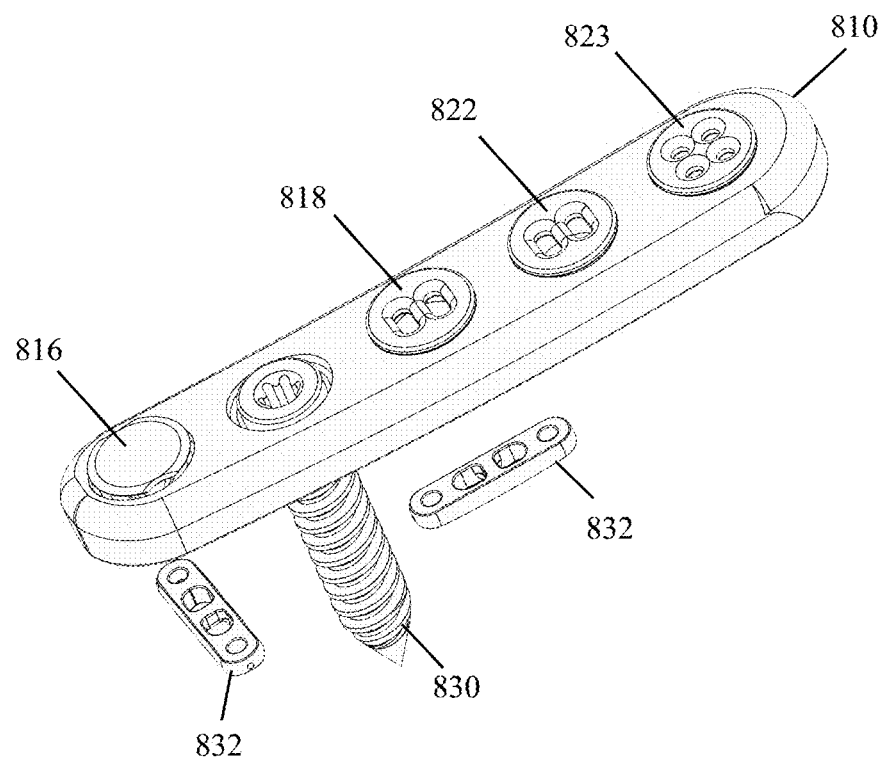
FIG. 84 is a perspective view of an example of a fracture repair plate with a knotless self-locking fixation assembly, according to some embodiments.
Figure 85:
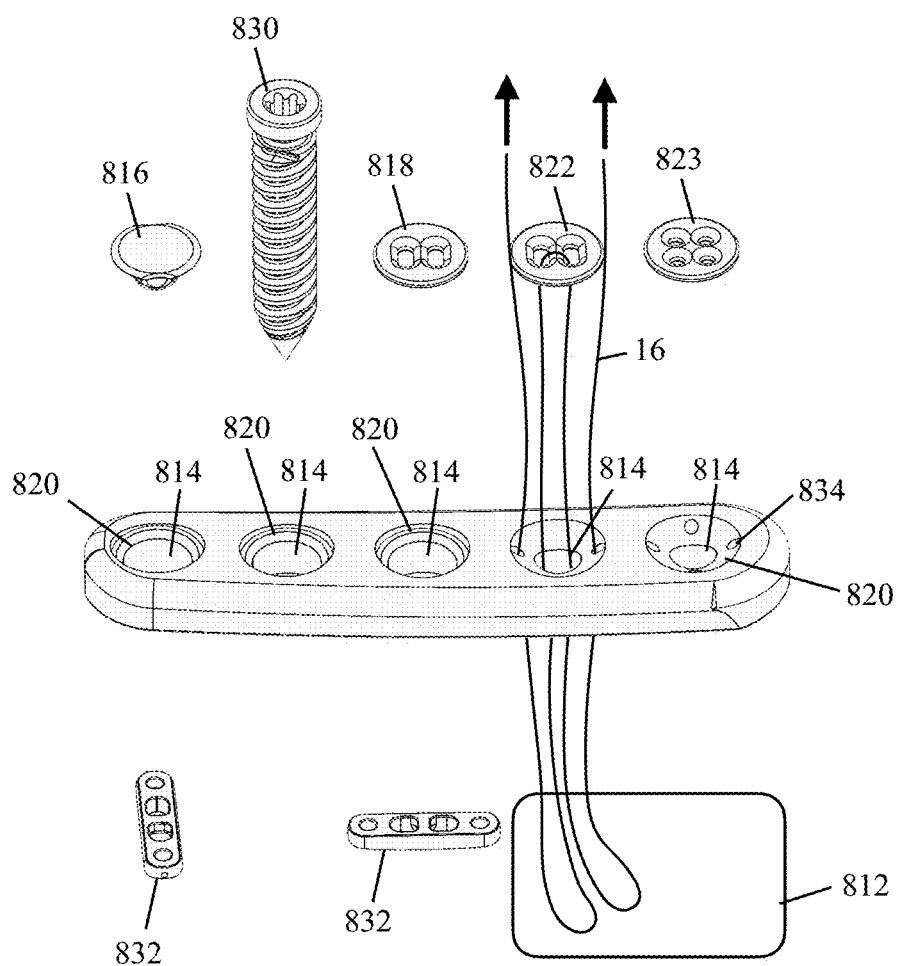
FIG. 85 is an exploded perspective view of the fracture repair plate of FIG. 84, according to some embodiments.
Figure 86:
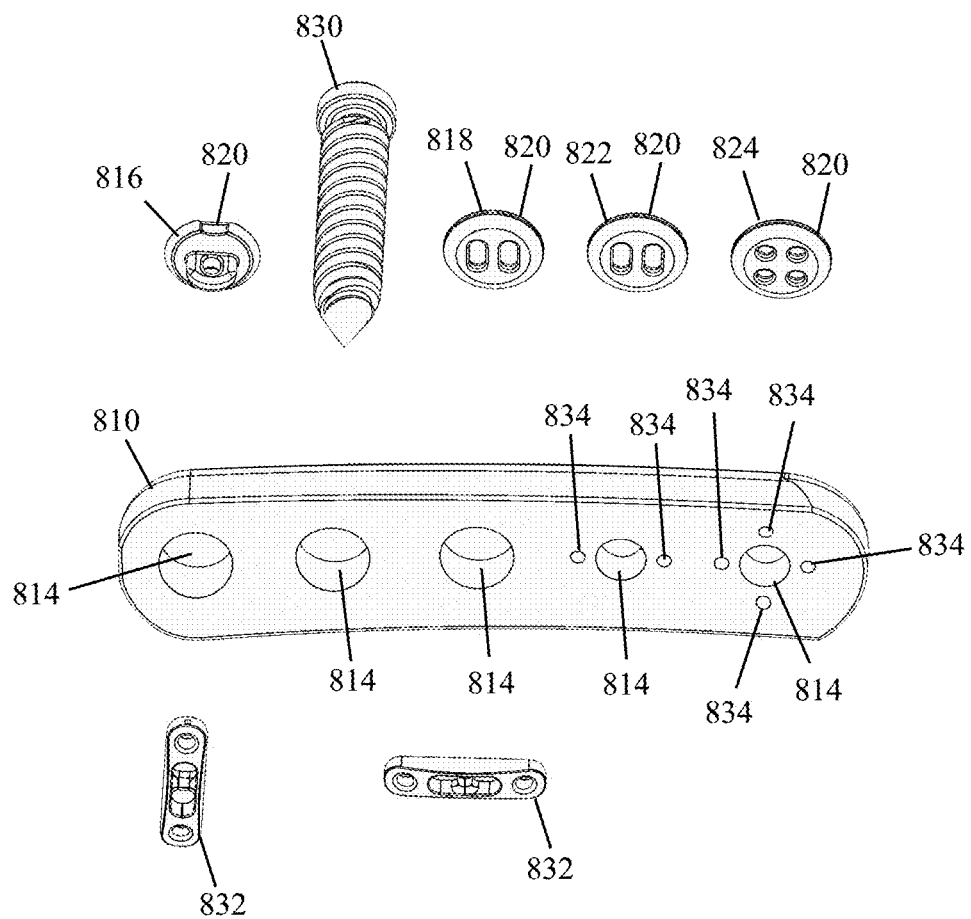
FIG. 86 is another exploded perspective view of the fracture repair plate of FIG. 84, according to some embodiments.

The locking assembly 110 with associated suture(s) 16 is then passed through the tunnel in an orientation in which the longitudinal axis L is generally parallel to the longitudinal axis of the tunnel (for example using an insertion device 710 of FIGS. 78-80 described below), and then rotated so that the longitudinal axis L of the locking assembly 110 is generally perpendicular to the tunnel, and the locking assembly 110 is seated on the far cortex of the bone 4 (e.g., radius). In this orientation, the bottom surface 124 of the base member 112 will rest on the bone 4 (e.g., the far cortex of the radius), which the loose end of the tensionable fixation member(s) 16 and the tissue to be repaired.

The tensionable fixation member(s) 16 exiting proximally through the first opening 130 and extending away from the bottom surface 124 of the base member 112 may be pulled in the direction $D_1$ to create tension in the repair, by pulling the tendon close to the locking assembly 11 in direction $D_2$ to a desired position for repair (e.g., thereby decreasing the distance between the tendon and the base member 112), including but not limited to docking in the tunnel (for example). By way of example only, the tension in the tensionable fixation members 16 can be adjusted to the surgeon's liking. Once the desired tension has been achieved in the biceps tendon 2 (for example), the locking is complete. The locking is caused by capture of the tensionable fixation members 16 in the locking interface between the base member 112 and locking element 114 as described above. This allows for the tensionable fixation members 16 to slide when the surgeon is performing the tensioning in the permitted direction $D_1$ but prevents the slide of the suture in the opposite direction which can cause the loosening if the repair. By way of example, pulling in direction $D_1$ will create tension which can be changed or increased by further pulling in the same direction. Once the locking assembly 110 is in its locked state the tensionable fixation member(s) 16, locking assembly 110, and tissue 2 will maintain its locked state by a combination of compression, friction, and tension. This completes the repair with no need for an additional screw or knot tying.

If the tendon 2 (or tissue, bone, or other member) tries to pull away from the site of repair, (e.g. in direction $D_1$) it will pass the tension through the tensionable fixation members 16 and it will further lock the assembly 110 by pulling the base member 112 and locking element 114 toward each other. This is because the tensionable fixation members 16 are captured and held fast at the locking interface between the base member 112 and the locking element 114 (e.g., at the "pinch points"), and tensionable fixation members 16 are looped around the crossbar 164 (which in some embodiments may act as a fulcrum) and therefore a proximal force exerted by the tissue 2 pulling away from the locking assembly 110 in a proximal direction $D_1$ will in turn cause the tensionable fixation members 16 to exert a proximal force on the crossbar 164 and therefore the locking element 114, which increases compression on the tensionable fixation member 16 at the locking interface. This will pinch the tensionable fixation members 16 tight and prevent the tendon 2 (for example) from moving away from the repair state.

FIGS. 28-31 illustrate another example of a locking assembly 210 forming part of the knotless orthopedic stabilization system 10 according to one embodiment of the present disclosure. By way of example only, the locking assembly 210 comprises a base member 212 and a locking element 214 configured to engage a tensionable fixation member 16 (e.g., a surgical suture, tape, fiber, etc.). The base member 212 includes a central recess 228 sized and configured to receive the locking element 214 therein upon assembly of the locking assembly 210. As will be explained in further detail herein and similar to the embodiments described above, the base member 212 and locking element 214 have complementary surfaces that form a locking interface to capture and hold the tensionable fixation member 16 under tension, thereby locking the assembly in place.

In some embodiments, the orthopedic locking assembly 210 may couple with a tensionable fixation member 16 (e.g., a surgical suture, tape, fiber, etc.) that is attached to a tissue, bone, or other member to lock the tensionable fixation member 16 under tension during a surgical procedure, as described above with respect to other embodiments. For example in a biceps repair, one end of the tensionable fixation member 16 (e.g., the "attachment end") may first be attached to or otherwise associated with a torn muscle or other tissue, then subsequently coupled with a locking assembly 210, (e.g., by threading or chaperoning the free end of the tensionable fixation member 16 through the locking assembly 210 as described herein) which may then be advanced through a surgical corridor formed through bone. Once the locking assembly 210 is secured on the opposite side of the bone, the surgeon may apply a desired amount of tension to the tensionable fixation member 16 by pulling the free end of the tensionable fixation member 16 in the direction of the attached tissue to locate and secure the tissue in the desired location. By way of example, the locking assembly 210 is a self-locking assembly that does not require secondary fixation (e.g., knots, fixation hardware, etc.) to secure the tension in the tensionable fixation member 16. Generally, the tensionable fixation member 16 is threaded or chaperoned through the locking assembly 210 by entering the assembly 210 from one side (e.g., the bottom or proximal side) of the locking assembly 210 (and also by way of the open end described below), looping or making a "U-turn" around a crossbar or fulcrum element of the locking element 214, passing through a locking interface of the locking assembly 210 (described below), and exiting the locking assembly 210 on the same side as entry (e.g., bottom or proximal side). The looping or "U-turn" of the tensionable fixation member 16 provides several advantages over the existing button assemblies, including but not limited to: (i) keeping the base member 212 and locking element 214 aligned and in a compressed state which maintains tension in the tension element 16; (ii) increasing tension in the construct in response to attached tissue being pulled away from the assembly; and (iii) maintaining compression in the locking interface.

By way of example only, the base member 212 is similar to the base members 12 and 112 described above and may include any feature described herein in relation to any other base member embodiment even if not specifically described. In some embodiments, the base member 212 may have a generally rectangular shape having a first end 218, a second end 220, a pair of long sides 222, and a longitudinal axis extending therethrough. By way of example, in some embodiments, the base member 212 may have a first or bottom surface 224 configured to interface with tissue, bone, or other member and a second or top surface 226 opposite the bottom surface 224. In some embodiments, the top surface 226 includes a central recess 228 having a size and shape that is complimentary to the size and shape of the locking element 214 so that the locking element 214 fits snugly within the recess 228 upon assembly.

In some embodiments, the base member 212 may include a pair of lateral openings 230 formed within the central recess 228, with one lateral opening 230 located proximate the first end 218 and the other lateral opening 230 located proximate the second end 220, and a pair of medial openings 232 located between the lateral openings 230. Notably, in this example embodiment, each of the lateral openings 230 extend to one of the long sides 222 of the base member 212, which may enable a faster and more efficient coupling of the locking assembly 210 and the tensionable fixation member 16. The lateral openings 230 may extend to the same long side 222 or opposite long sides 222. By way of example, the medial openings 232 extend through the base member 212 from the central recess 228 to the bottom surface 224. In some embodiments, the medial openings 232 each have a smooth, angled, tapered, and/or rounded edge surface 234 at the intersection with the central recess 228 to reduce wear on the tension member 16 during use. In some embodiments, the edge surface 234 comprises a compression surface configured to act in concert with the edge surface 268 of the locking element 214 (e.g., as a "locking interface") to capture or pinch the tensionable fixation member 16 therebetween (e.g., forming a "pinch point") upon tensioning of the locking assembly 210 during use.

By way of example, the locking element 214 has a size and shape that is complimentary to the size and shape of the central recess 228 of the base member 212 so that the locking element 214 fits snugly within the central recess 228 upon assembly. In some embodiments, the locking element 214 may have a generally rectangular shape having a first end 250, a second end 252, a pair of long sides 254, a bottom surface 256, a top surface 258 and a longitudinal axis extending therethrough. In some embodiments, the bottom surface 256 is configured to interface with the central recess 228 of the base member 212. In some embodiments, the locking element 214 further includes a central opening 260 extending through the locking element 214 between the bottom and top surfaces 256, 258 and a pair of lateral openings 262 positioned proximate the first and second ends 250, 252, respectively and extending through the locking element 214 between the bottom and top surfaces 256, 258, and extending to one of the long sides 254 of the locking element 214. The lateral openings 262 may extend to the same long side 254 or opposite long sides 254, but in either case the lateral openings 262 are complimentary to the lateral openings 230 of the base member 212. The central opening 260 and lateral openings 262 are separated by a bridge or crossbar 264 or similar structure that may act as a fulcrum for the tensionable fixation member 16. In some embodiments, the crossbar(s) 264 may have a one or more rounded, curved, angled and/or smooth upper surfaces 266 to minimize friction or other forces applied to the tensionable fixation member 16 by the crossbar during use.

By way of example, the central opening 260 comprises a smooth, angled, tapered, and/or rounded edge surface 268 at the intersection with the bottom surface 256 to reduce wear on the tension member 16 during use. In some embodiments, the edge surface 268 comprises a compression surface configured to act in concert with the edge surface 234 of the base member 212 (e.g., as a "locking interface") to capture or pinch the tensionable fixation member 16 therebetween (e.g., forming a "pinch point") upon tensioning of the locking assembly 210 during use.

As explained herein, the knotless stabilization system 10 is a self-locking system, in which the tension applied to the tensionable fixation member 16 will ensure alignment of the locking element 214 within the base member 212 while also locking the assembly together due to the interaction of the tensionable fixation member 16 with the locking interface.

Figure 31:
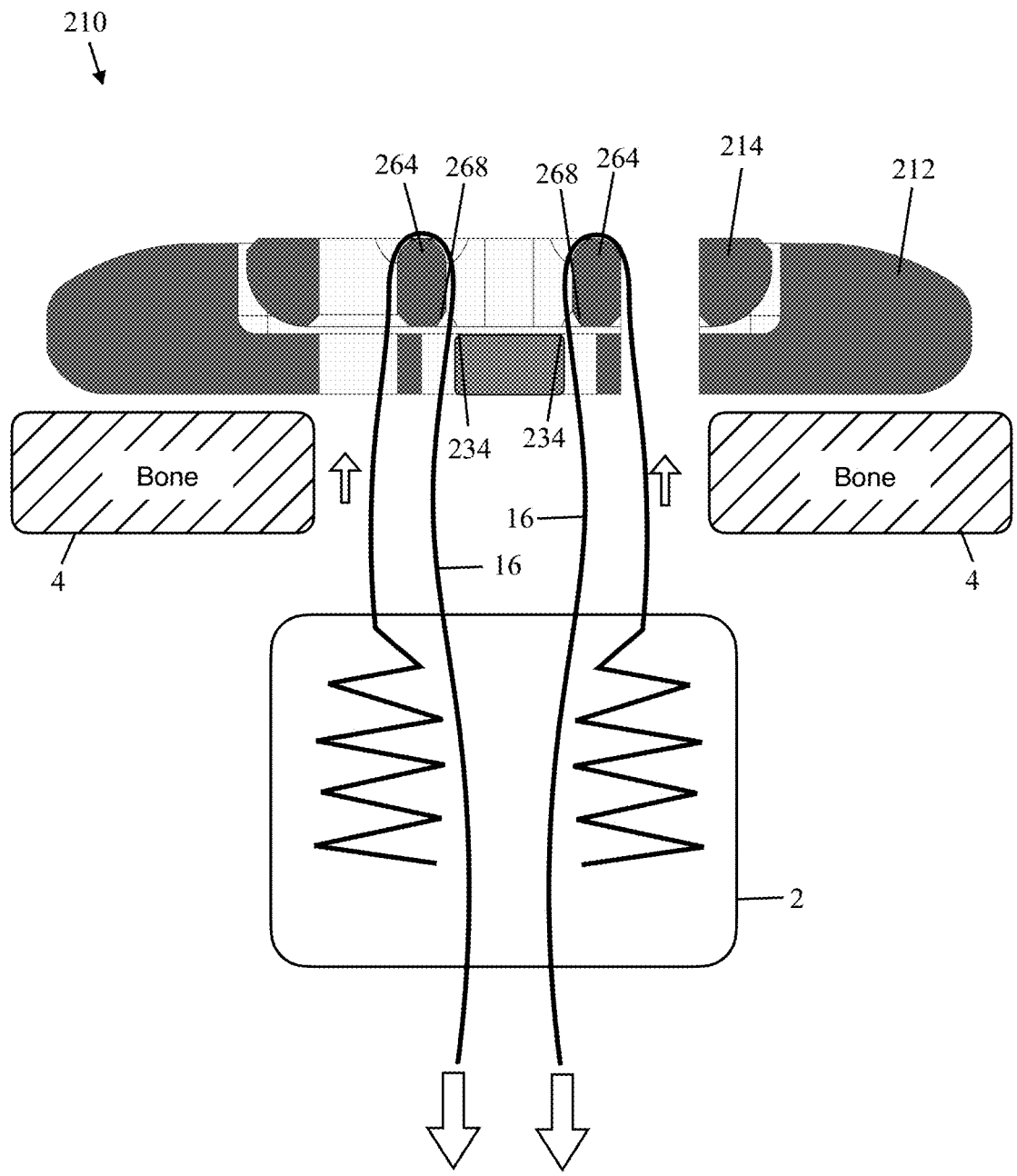
FIG. 31 is a side sectional view of the locking assembly of FIG. 28, taken along line D-D of FIG. 29, illustrating an exemplary use of the knotless fixation orthopedic stabilization system disclosed herein, according to some embodiments.

By way of example, FIG. 31 illustrates a tensionable fixation member 16 associated with the locking assembly 210 according to some embodiments. Although not shown, in some embodiments, the tensionable fixation member 16 may be chaperoned through the locking assembly 210 using a shuttle member 82 in a similar manner to that described above with the locking assembly 11.

In some embodiments, the tensionable fixation member 16 may be coupled with the locking assembly 210 by: (i) advancing a free end of the tensionable fixation member 16 (e.g., optionally using a shuttle member 82 as described above) through a lateral opening 232 of the base member 212 in a distal direction (e.g., from the bottom surface 224 toward the top surface 226) or alternatively sliding the tensionable fixation member 16 laterally into the lateral opening 232 via the open side so that the attached tissue is on the proximal or bottom side of the base member 212 and the free end of the tensionable fixation member 16 extends distally through the lateral opening 232 (and lateral opening 262 of the locking element 214); (ii) advancing the tensionable fixation member 16 medially around the crossbar 264; (iii) advancing the tensionable fixation member 16 proximally (e.g. from the top surface 258 toward the bottom surface 256 of the locking element 214 so that the tensionable fixation member 16 makes a "U-turn" around the crossbar 264) through the central opening 260 of the locking element 214; and (iv) advancing the tensionable fixation member 16 proximally through the medial opening 232 of the base member 212, so that the tensionable fixation member passes through the locking interface (e.g., between the edge surface 234 of the base member 212 and the edge surface 268 of the central opening 260 of the locking element 214), and the free end and the attached end of the tensionable fixation member 16 are on the same side of the locking assembly 210, namely the proximal side (e.g. "below" the bottom surface 224 of the base member 212).

By way of example, the locking assembly 210 may be used in the same or similar tissue repair methods described herein in relation to other locking assembly embodiments.

Figure 32:
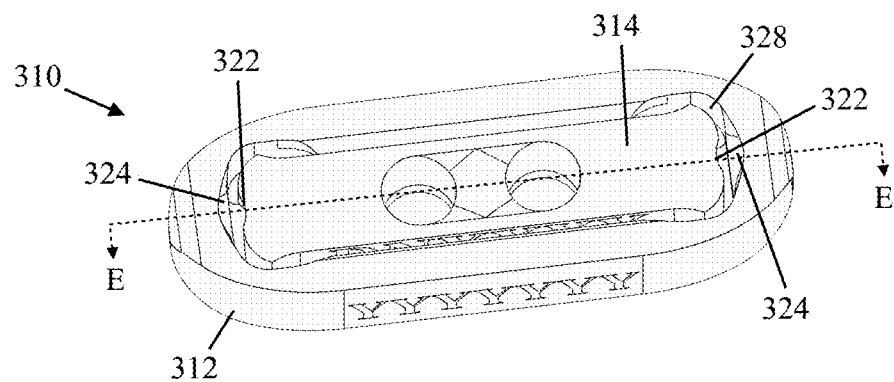
FIG. 32 is a perspective view of another example of a locking assembly configured for use with a flexible tensionable fixation member as part of the knotless orthopedic stabilization system disclosed herein, according to some embodiments.
Figure 33:
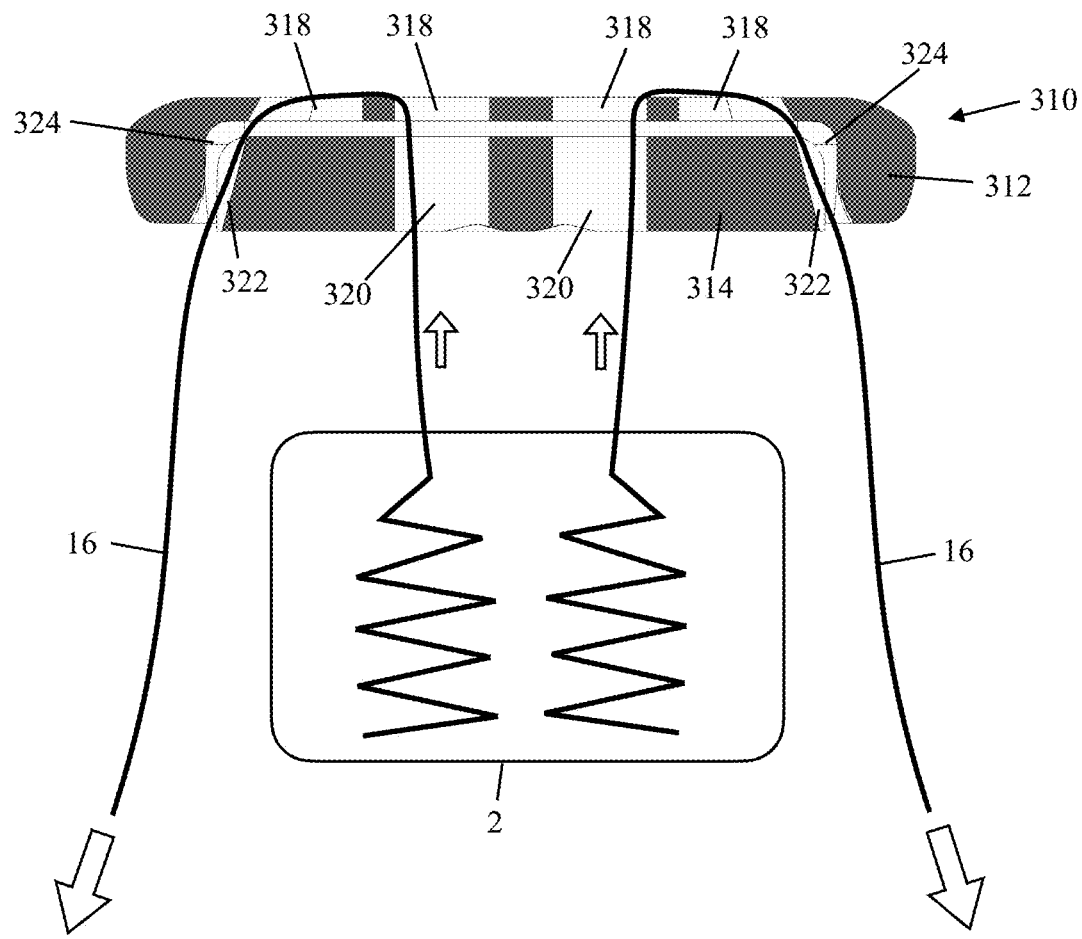
FIG. 33 is a side sectional view of the locking assembly of FIG. 32, taken along line E-E of FIG. 32, illustrating an exemplary use of the knotless fixation orthopedic stabilization system disclosed herein, according to some embodiments.
Figure 34:
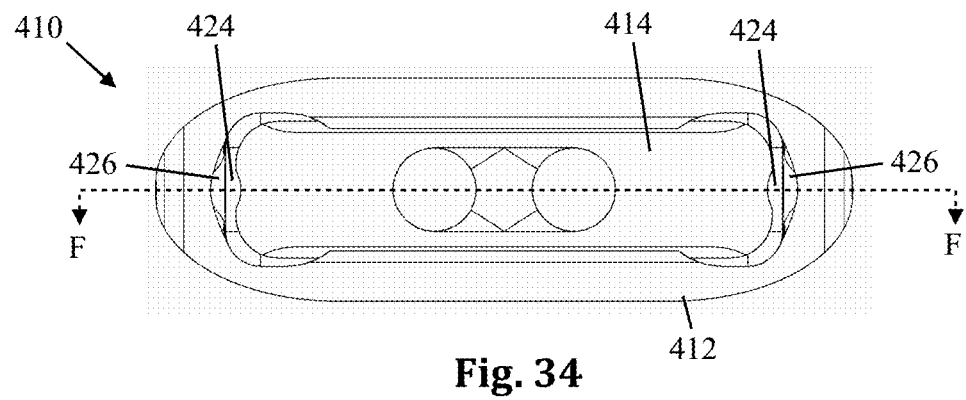
FIG. 34 is a perspective view of another example of a locking assembly configured for use with a flexible tensionable fixation member as part of the knotless orthopedic stabilization system disclosed herein, according to some embodiments.
Figure 35:
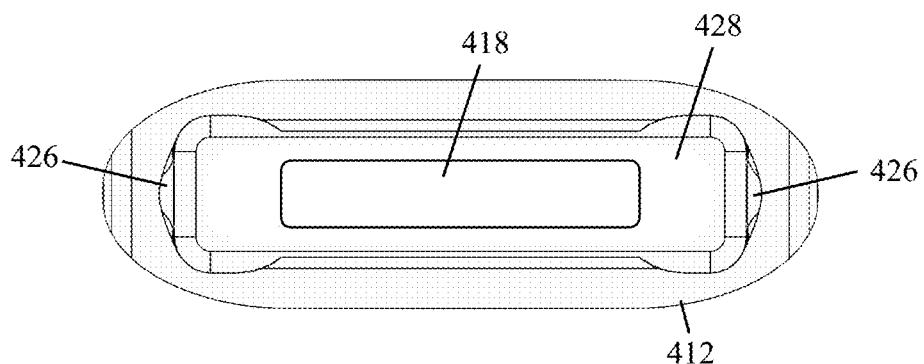
FIG. 35 is a top plan view of a base member forming part of the locking assembly of FIG. 34.
Figure 36:
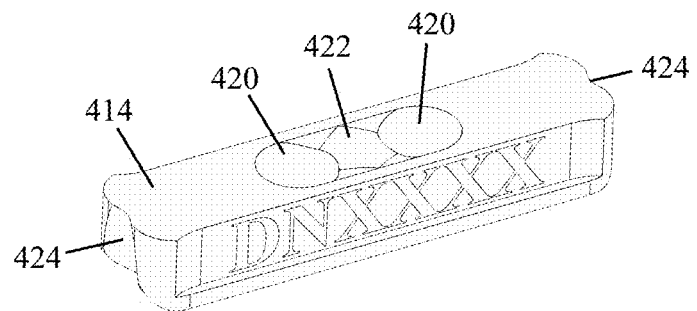
FIG. 36 is a perspective view of a locking element forming part of the locking assembly of FIG. 34.
Figure 37:
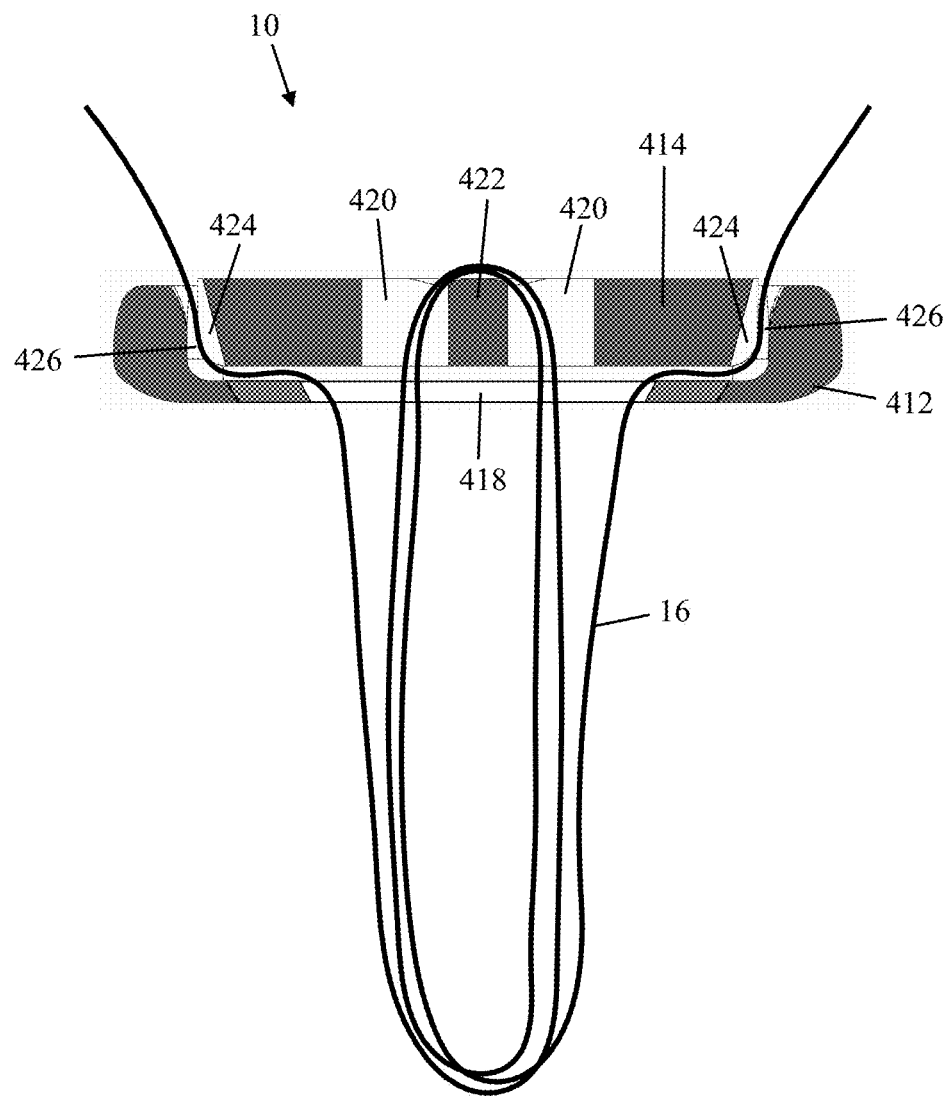
FIG. 37 is a side sectional view of the locking assembly of FIG. 34, taken along line F-F of FIG. 34, illustrating an exemplary use of the knotless orthopedic stabilization system disclosed herein, according to some embodiments.
Figure 38:
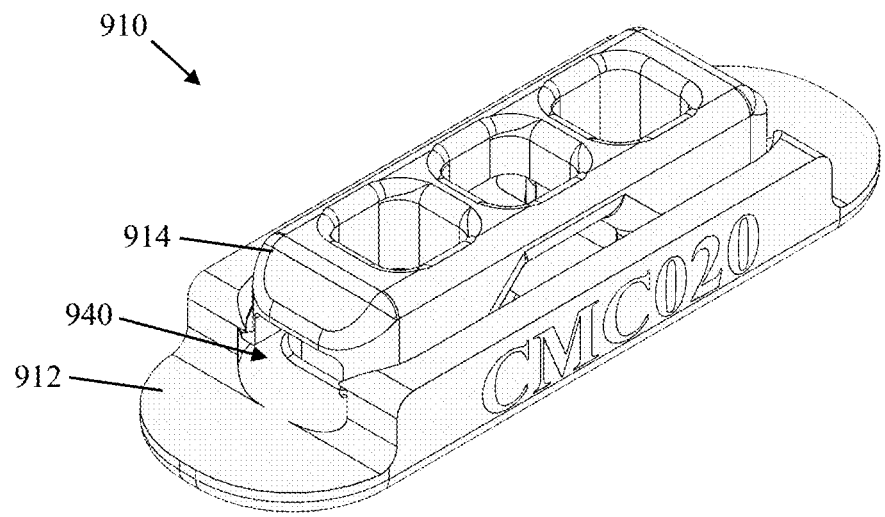
FIG. 38 is a perspective view of another example of a locking assembly configured for use with a flexible tensionable fixation member as part of the knotless orthopedic stabilization system disclosed herein, according to some embodiments.
Figure 39:
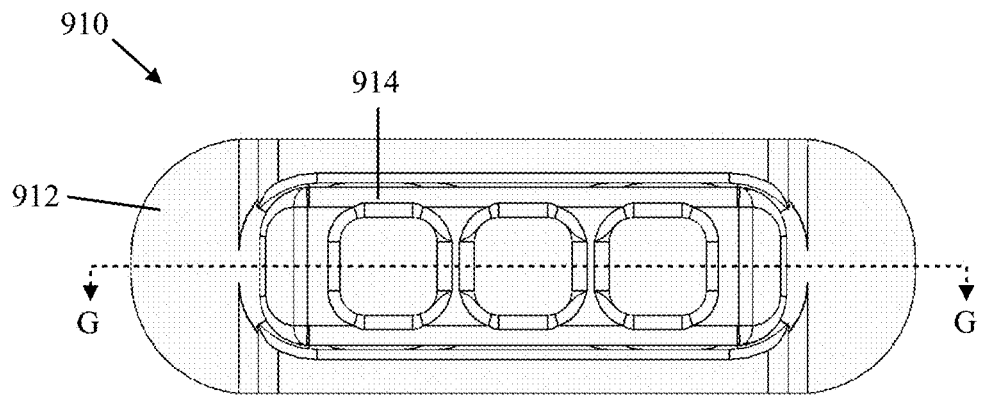
FIG. 39 is a top plan view of the locking assembly of FIG. 38, according to some embodiments.
Figure 40:
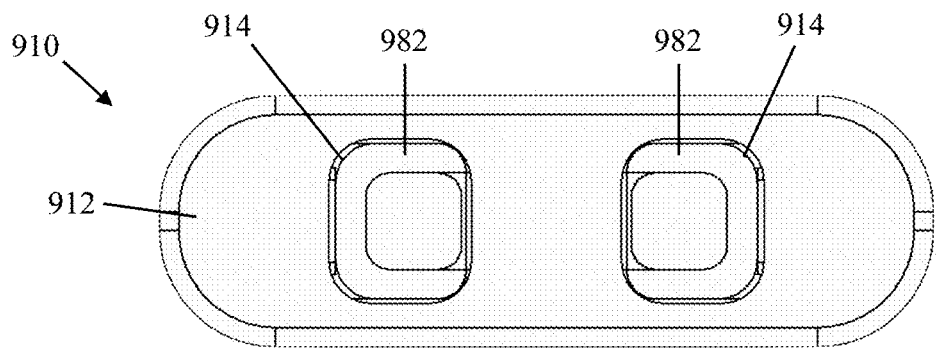
FIG. 40 is a bottom plan view of the locking assembly of FIG. 38, according to some embodiments.
Figure 41:
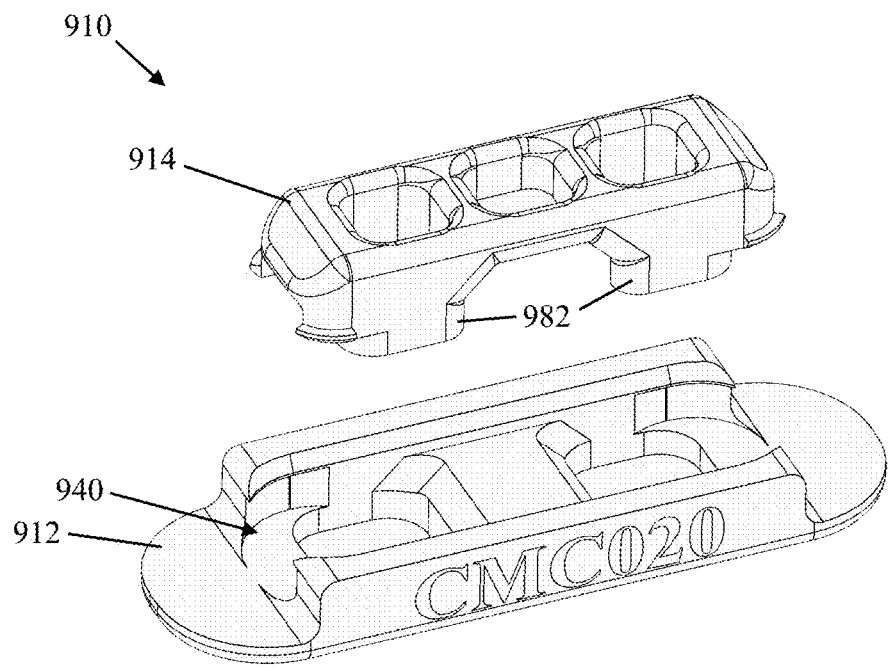
FIGS. 41-42 are exploded perspective views of the locking assembly of FIG. 38, according to some embodiments.
Figure 42:
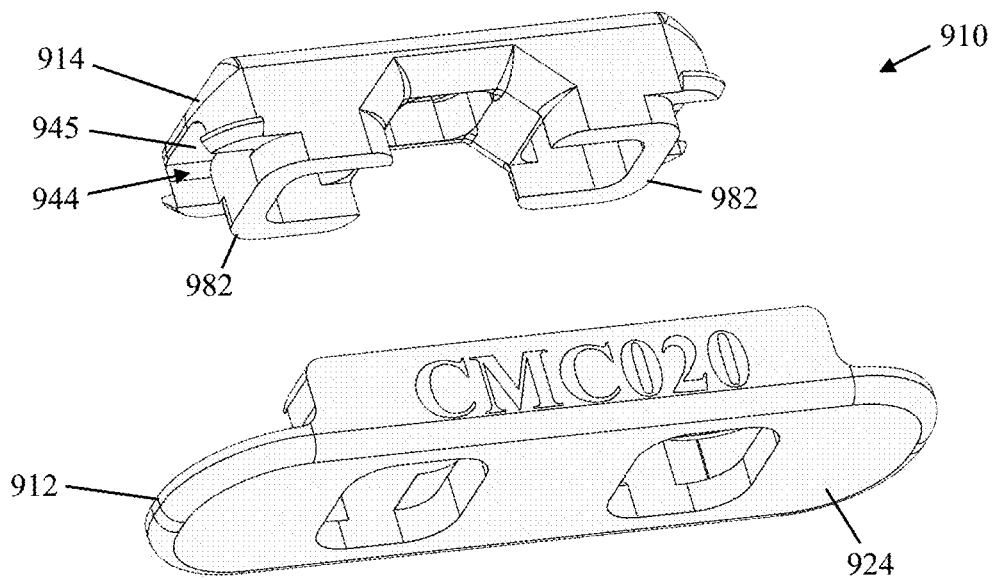

FIGS. 32-33 illustrate another example of a locking assembly 310 forming part of the knotless orthopedic stabilization system 10 according to one embodiment of the disclosure. By way of example only, the locking assembly 310 is similar in structure and function to the locking assemblies 11, 110, and 210 described above, and may include any feature described herein in relation to any other locking assembly even if not specifically described. By way of example only, the locking assembly 310 comprises a base member 312 and a locking element 314, and a tensionable fixation member 16 (e.g., a surgical suture, tape, fiber, etc.). The base member 312 includes a central recess 328 sized and configured to receive the locking element 314 therein upon assembly of the orthopedic button assembly 310. Similar to the embodiments described above, the base member 312 and locking element 314 have complementary surfaces that form a locking interface to capture and hold the tensionable fixation member 16 under tension, thereby locking the assembly in place. By way of example only, the base member 312 has four through holes 318 extending through the central recess 328. The locking element 314 has two through holes 320 that are in line with the outer button. Similar to previously described embodiments, in order to couple the tensionable fixation member 16 to the button assembly, one end of the tensionable fixation member 16 is attached to the soft tissue 2, and the other end of the tensionable fixation member 16 is passed through the through holes 320, 318 in the locking element 314 and base member 312, respectively. The tensionable fixation member 16 will then make a 'U' turn toward the respective ends of the base member 312 and pass through the remaining through holes 318 (lateral or outer through holes) of the base member 312, passing through a locking interface between the base member 312 and locking element 314, the locking interface comprising the lateral ends 322 of the locking element 314 and the lateral ends 324 of the central recess 328. Pulling the tensionable fixation members 16 in the direction of the soft tissue will cause tensioning of the repair. Releasing the tension will leave the device in locked state. This configuration can be used within the bone or can be used on the far side of the cortex to accomplish the repair. By way of example only, the locking assembly 310 of the current embodiment can perform with the locking element 314 being in contact with the bone or any stable member (e.g., plate, etc.) as shown in FIG. 33, or alternatively with the base member 312 in contact with the bone or any other stable member, for example as shown and described with the previously described embodiments.

FIGS. 34-37 illustrate another example of a locking assembly 410 according to one embodiment of the disclosure. By way of example only, the locking element 414 sits within the central recess 428 of the base member 412. The base member 412 has one opening 418 and the locking element 414 has two openings 420 which are separated by a bridge 422. As shown by way of example only in FIG. 37, the tensionable fixation member 16 attached to the soft tissues or used for soft tissue repair can form single or multiple loops by passing between the single opening 418 in the base member 412 and the two openings 420 in the locking element 414. Free ends of the tensionable fixation member 16 finally exit the locking assembly 410 by passing through the single opening 418 of the base member 412 and between the base member 412 and locking element 414, thus passing through a locking interface comprising the lateral ends 424 of the locking element 414 and the lateral ends 426 of the central recess 428. Pulling on the free ends of the tensionable fixation members 16 will tension the repair. Once the tension is released, the repair is maintained by the locking between the base member 412 and locking element 414. The locking interface may have different shapes. In some embodiments, the locking assembly 410 may be used with two additional holes in the base member 412 for additional tensionable fixation members 16 to exit through the locking interface.

FIGS. 38-49 illustrate an example of a locking assembly 910 comprising a base member 912 and a locking element 914, for use with a tensionable fixation member 16 (e.g., a surgical suture, tape, fiber, etc.) as part of the knotless orthopedic fixation system 10, according to some embodiments. By way of example only, the base member 912 includes a central recess 928 sized and configured to receive the locking element 914 therein upon assembly of the locking assembly 910. As will be explained in further detail herein, the base member 912 and locking element 914 have complementary surfaces that form a locking interface to capture and hold the tensionable fixation member 16 under tension, thereby locking the assembly in place. Notably, the locking assembly 910 differs from other locking assembly embodiments disclosed herein in that the locking assembly 910 includes an anti-rocking feature and a unlocking tool engagement feature. By way of example only, the anti-rocking feature described herein comprises proximal extensions 982 on the locking element 914 extending into the lateral openings 932 of the base member 912 when the locking assembly 910 is in a locked state. By way of example only, the unlocking tool engagement feature described herein includes a pair of end openings 940 on the base member 912 and a lateral cutout 944 and engagement surface 945 on the locking element 914, which are configured to engage with a unlocking tool so that the unlocking tool may be manipulated to physically unlock the locking assembly by forcing the locking element 914 distally away from the base member 912 such that the tensionable fixation members are again moveable relative to the base member 912.

By way of example only, FIGS. 38-42 illustrate an example of a locking assembly 910 forming part of the knotless orthopedic stabilization system 10 described herein, according to some embodiments. In some embodiments, the locking assembly 910 may couple with a tensionable fixation member 16 (e.g., a surgical suture, tape, fiber, etc.) that is attached to a tissue, bone, or other member to lock the tensionable fixation member 16 under tension during a surgical procedure. For example, in a biceps repair, one end of the tensionable fixation member 16 (e.g., the "attachment end") may first be attached to or otherwise associated with a torn muscle or other tissue, then subsequently coupled with a locking assembly 910, (e.g., by threading or chaperoning the free end of the tensionable fixation member 16 through the locking assembly 910 as described herein) which may then be advanced through a surgical corridor formed through bone. Once the locking assembly 910 is secured on the opposite side of the bone, the surgeon may apply a desired amount of tension to the tensionable fixation member 16 in the direction of the attached tissue to locate and secure the tissue in the desired location, for example by decreasing the distance between the attached tissue and the locking assembly 910. By way of example, the locking assembly 910 is a self-locking assembly that does not require secondary fixation (e.g., knots, fixation hardware, etc.) to secure the tension in the tensionable fixation member 16. Generally, the tensionable fixation member 16 is threaded or chaperoned through the locking assembly 910 by entering the locking assembly 910 from one side (e.g., the bottom or proximal side) of the locking assembly 910, looping or making a "U-turn" around a crossbar or fulcrum element of the locking element 914, passing through a locking interface of the locking assembly 910 (described below), and exiting the locking assembly 910 on the same side as entry (e.g., bottom or proximal side). The looping or "U-turn" of the tensionable fixation member 16 provides several advantages over the existing button-suture assemblies, including but not limited to: (i) keeping the base member 912 and locking element 914 aligned and in a compressed state which maintains tension in the tension element 16; (ii) increasing tension in the construct in response to attached tissue being pulled away from the assembly; and (iii) maintaining compression in the locking interface.

Figure 43:
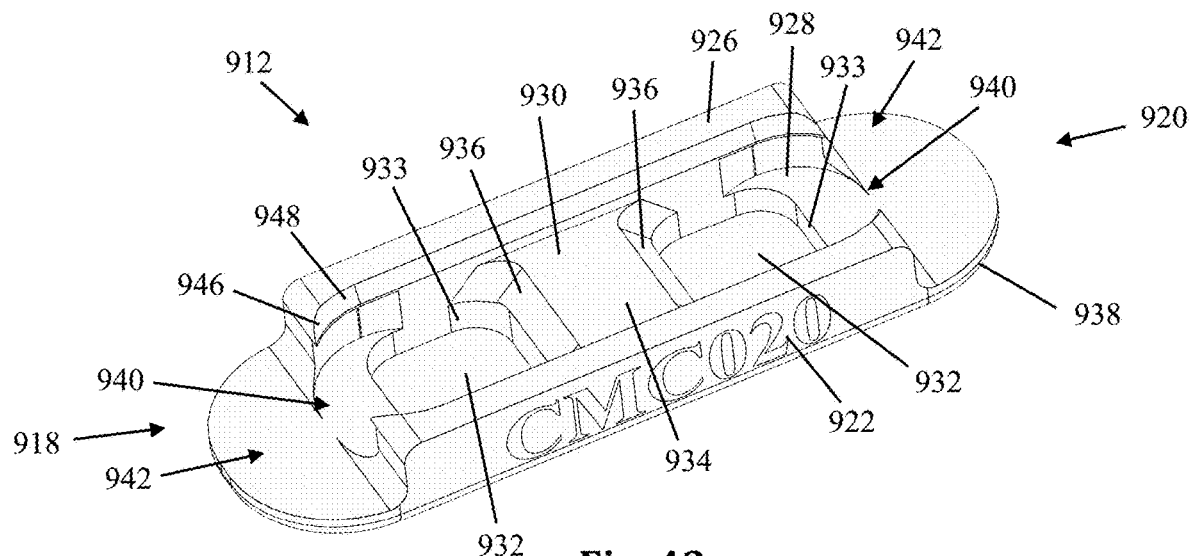
FIG. 43 is a perspective view of an example of a base member forming part of the locking assembly of FIG. 38, according to some embodiments.
Figure 44:
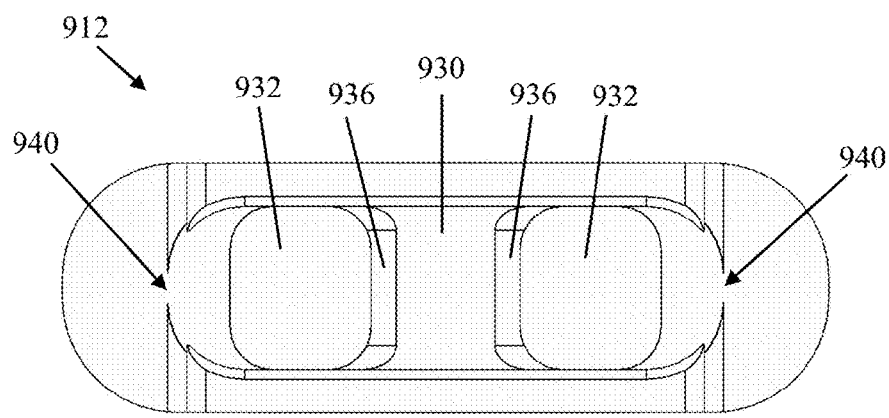
FIG. 44 is a top plan view of the base member of FIG. 43, according to some embodiments.

By way of example only, FIGS. 43-44 illustrate one example of a base member 912 forming part of the locking assembly 910 described herein, according to one embodiment. In some embodiments, the base member 912 may have a generally rectangular shape having a first end 918, a second end 920, a pair of long sides 922, and a longitudinal axis L extending therethrough. By way of example, in some embodiments, the base member 912 may have a first or bottom surface 924 configured to interface with tissue, bone, or other member and a second or top surface 926 opposite the bottom surface 924. In some embodiments, the top surface 926 includes a central recess 928 having a size and shape that is complimentary to the size and shape of the locking element 914 so that the locking element 914 fits snugly within the recess 928 upon assembly.

In some embodiments, the base member 912 may further include a central structure 930 and a pair of lateral openings 932 positioned within the central recess 928, with one lateral opening 932 positioned on each side of the central structure 930. The central structure 930 includes a proximal facing surface 934 and a pair of smooth and/or rounded lateral surfaces 936 positioned on either side of the proximal facing surface 934 and each facing in the direction of a respective lateral opening 932. In some embodiments, the lateral surfaces 936 may be angled or tapered from a first height at the intersection with the proximal facing surface 934 to a second height within the central recess 928, for example at or near an intersection with the lateral openings 932. In some embodiments, the lateral surfaces 936 may extend at least partially over the lateral openings 932. In some embodiments, the lateral surfaces 936 are compression surfaces configured to act in concert with medial surfaces 970 of the locking element 914 (e.g., as a "locking interface") to capture or pinch the tensionable fixation member 16 therebetween (e.g., forming "pinch points") upon tensioning of the locking assembly 910 during use. In some embodiments, the central structure 930 comprises a transverse linear beam extending across the central recess 928 between the lateral openings 932 along a transverse axis T. In some embodiments, the central structure 930 may have a nonlinear shape resulting in one or both lateral surfaces 936 having a concave and/or convex shape. In some embodiments, the lateral surfaces 936 may have any combination of linear, convex, and/or concave orientations.

By way of example, the lateral openings 932 extend completely through the base member 910 between the central recess 928 and the bottom surface 924. In some embodiments, the lateral openings 932 have a peripheral wall 933 extending around the perimeter of the lateral openings 932. In some embodiments, the peripheral wall 933 extends vertically (e.g., perpendicular to a plane defined by the bottom surface 924) through the base member 910. By way of example only, the lateral openings 932 have a rounded rectangular cross-sectional shape, however the lateral openings 932 may have any cross-sectional shape suitable to receive a tensionable fixation member 16 therethrough.

In some embodiments, the base member 912 may have a generally rectangular shape. In some embodiments, the base member 912 may have any shape suitable, including but not limited to rectangular, circular, oblong, oval, elliptical, or polygonal. In some embodiments, the base member 912 may be sized and configured to be inserted through a surgical corridor (e.g., having proximal and distal openings) formed in bone, tissue, and/or other anatomical structure and thereafter be pivoted, rotated, or otherwise maneuvered to extend across the distal opening of the surgical corridor without being pulled back through the corridor. In some embodiments, the base member 912 may further include rounded and/or smooth outer perimeter surfaces 938 to minimize the profile of the base member 12 and potentially reduce trauma to surrounding tissue during and after implantation. In some embodiments, the first and second ends 918, 920 are identically formed so that either end may comprise a leading end when the base member 912 is advanced through a corridor formed in bone, tissue, or other anatomical structures. In some embodiments, the first and second ends 918, 920 each have an end opening 940 extending into the central recess 928 and configured to receive an engagement portion of a unlocking tool (not shown) therein. In some embodiments, the first and second ends 918, 920 each further comprise a lateral cutout 942 configured to provide space for the unlocking tool when the unlocking tool is engaged with the end openings 940.

Figure 45:
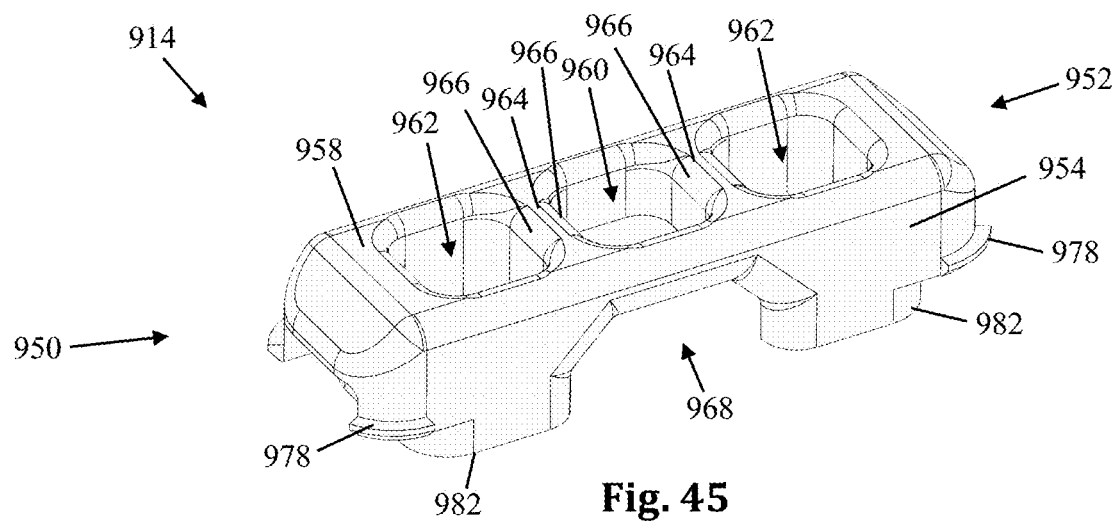
FIG. 45 is a perspective view of an example of a locking element forming part of the locking assembly of FIG. 38, according to some embodiments.
Figure 46:
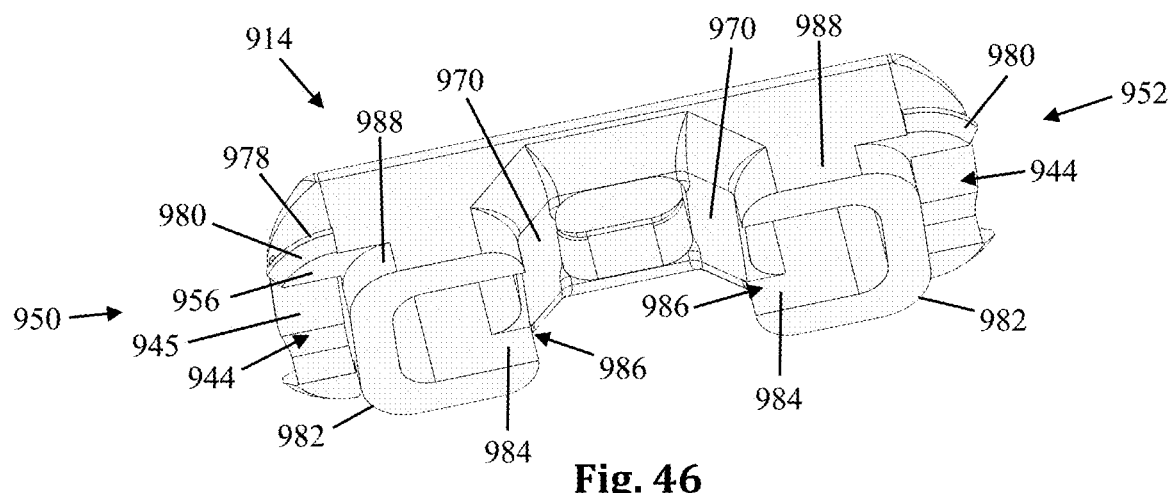
FIG. 46 is a bottom perspective view of the locking element of FIG. 45, according to some embodiments.
Figure 47:
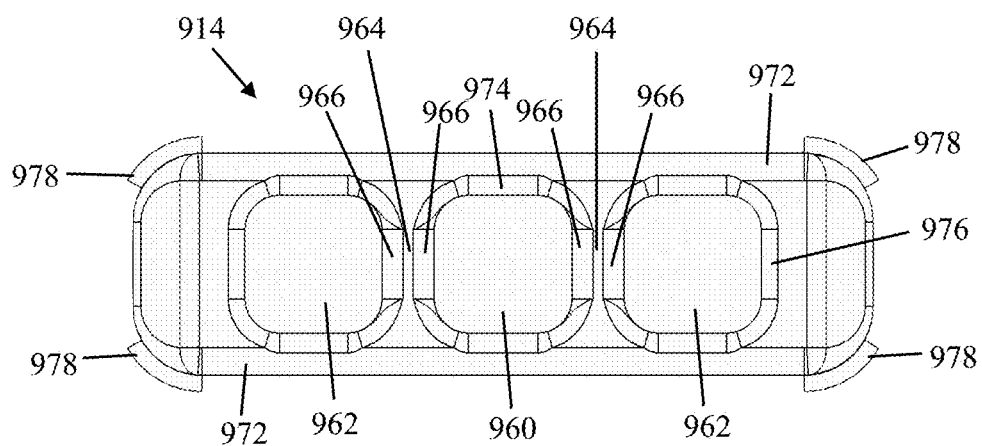
FIG. 47 is a top plan view of the locking element of FIG. 38, according to some embodiments.

By way of example only, FIGS. 45-47 illustrate one example of a locking element 914 forming part of the locking assembly 910 described herein, according to one embodiment. By way of example, the locking element 914 has a size and shape that is complimentary to the size and shape of the central recess 928 of the base member 912 so that the locking element 914 fits snugly within the central recess 928 upon assembly. In some embodiments, the locking element 914 may have a generally rectangular shape (e.g., with rounded ends) having a first end 950, a second end 952, a pair of long sides 954, a bottom surface 956 and a top surface 958 and a longitudinal axis L extending therethrough. In some embodiments, the bottom surface 956 is configured to interface with the central recess 928 of the base member 912. In some embodiments, the locking element 914 further includes a central opening 960 and a pair of lateral openings 962 extending through the locking element 914 between the bottom and top surfaces 956, 958. The central opening 960 and lateral openings 962 are separated by a bridge or crossbar 964 or similar structure that may act as a fulcrum for the tensionable fixation member 16. In some embodiments, the crossbar(s) 964 may have a one or more rounded, curved, and/or smooth upper surfaces 966 to minimize friction or other forces applied to the tensionable fixation member 16 by the crossbar during use.

In some embodiments, the bottom surface 956 includes a central recess 968 formed around the central opening 960. By way of example, the central recess 968 may have a size and shape complimentary to the size and shape of the central structure 930 of the base member 912, so that the central structure 930 fits snugly within the central recess 968 of the locking element 914 upon assembly. In some embodiments, the central recess 968 includes a pair of smooth, tapered and/or rounded and/or curved medial surfaces 970 forming the boundaries of the central recess 968. By way of example, the medial surfaces 970 are tapered or curved inward (or medially) toward the central opening 960. In some embodiments, the medial surfaces 970 extend at least partially over the lateral openings 932 of the base member 912. In some embodiments, the medial surfaces 970 are compression surfaces configured to act in concert with lateral surfaces 936 of the base member 912 to capture or pinch the tensionable fixation member 16 therebetween upon tensioning of the tensionable fixation member 16 during use. In some embodiments, the central recess 968 may have a nonlinear shape resulting in one or both medial surfaces 970 having a concave and/or convex shape. In some embodiments, the medial surfaces 970 may have any combination of linear, convex, and/or concave orientations. In any embodiment, the medial surfaces 970 have a complimentary shape to the lateral surfaces 936 of the base member 912 so that the combined compressive action on the tensionable fixation member 16 is maintained.

In some embodiments, the first and second ends 950, 954 each further comprise a lateral cutout 944 configured to receive an engagement portion of an unlocking tool (not shown) therein. In some embodiments, the lateral cutout 944 further includes an engagement surface 945 configured to engage the unlocking tool and receive a distal force applied by the unlocking tool to cause separation between the locking element 914 and the base member 912 to thereby unlock the assembly 910 and enable movement of the tensionable fixation member 16 for re-tensioning.

In some embodiments, locking element 914 may further include rounded and/or smooth outer perimeter surfaces 972 to minimize the profile of the locking element 914 and potentially reduce trauma to surrounding tissue during and after implantation. In some embodiments, perimeter edge surfaces 974 of the central opening 960 comprises smooth, angled, tapered, and/or rounded edge surfaces to reduce wear on the tension member 16 during use. In some embodiments the distal and/or proximal openings of the lateral openings 62 comprise smooth, angled, tapered, and/or rounded edge surfaces 976 to reduce wear on the tension member 16 during use.

In some embodiments, the locking element 914 includes a pair of proximal extensions 982 extending proximally from the bottom surface 956. By way of example, the proximal extensions 982 comprise a vertical extension of the lateral openings 962, in that the proximal extensions 982 have a peripheral inner wall 984 comprising a seamless extension of the inner peripheral boundary of the lateral openings 962. In some embodiments, the proximal extensions 982 have a medial opening 986 configured to enable passage of the tensionable fixation member 16 proximally out of lateral openings 962. In some embodiments, the proximal extensions 982 have a peripheral outer wall 988 sized and configured to be received within the lateral openings 932 of the base member 912 in a snug, flush, and/or nesting manner, when the locking assembly 912 is in a locked state (see, e.g., FIG. 49), such that a surface area of the proximal extensions 982 engage with a surface area of the peripheral walls 933 of the lateral openings 932. This engagement of surface areas stabilizes the locking element 914 relative to the base member 912, for example preventing rocking or other movement that may cause the tension applied to the tensionable fixation members 16 to loosen after the knotless stabilization system 10 has been locked and the surgical procedure completed.

Thus, in some embodiments, the proximal extensions 982 have an outer peripheral shape that is complimentary to an inner peripheral shape of the lateral openings 932 of the base member 912. In some embodiments, the proximal extensions 982 have an outer peripheral size that is complementary to an inner peripheral size of the lateral openings 932 of the base member 912. In some embodiments, a surface area of the peripheral walls 933 of the lateral openings 932 engages with a surface area of the peripheral outer wall 988 on at least one side of the proximal extensions 982 when the locking assembly 910 is in a locked state. In some embodiments, a surface area of the peripheral walls 933 of the lateral openings 932 engages with a surface area of the peripheral outer wall 988 on at least two sides of the proximal extensions 982 when the locking assembly 910 is in a locked state. In some embodiments, a surface area of the peripheral walls 933 of the lateral openings 932 engages with a surface area of the peripheral outer wall 988 on at least three sides of the proximal extensions 982 when the locking assembly 910 is in a locked state. In some embodiments, a surface area of the peripheral walls 933 of the lateral openings 932 engages with a surface area of the peripheral outer wall 988 on four sides of the proximal extensions 982 when the locking assembly 910 is in a locked state.

As explained herein, the knotless stabilization system 10 is a self-locking system, in which the tension applied to the tensionable fixation member 16 will ensure alignment of the locking element 914 within the base member 912 while also locking the assembly together due to the interaction of the tensionable fixation member 16 with the locking interface (i.e., the lateral surfaces 936 of the base member 912 and medial surfaces 970 of the locking element 914). In some embodiments, the locking assembly 910 may be provided with a secondary locking element to provide an additional secure interaction between the locking element 914 and base member 912, for example to ensure that the locking element 914 remains engaged with the base member 912 during re-tensioning of the tensionable fixation member 16, if necessary, and to prevent rocking or other movement of the locking element 914 within the central recess 928 to prevent loosening of the tensionable fixation member 16. By way of example only, the secondary locking element may include any physical mechanism that provides a secure interaction between the base member 912 and locking element 914, including but not limited to a press-fit engagement, snap-fit engagement, friction-fit engagement, and the like.

By way of example only, the locking element 914 may further include one or more elongated flanges 978 positioned near the first and second ends 918, 920 near the intersection with the bottom surface 956 and configured to engage with a corresponding elongated flange or overhang 946 extending from the top surface 926 of the base member 912 at least partially over the central recess 928 to form a secondary locking element and ensure retention of the locking element 914 within the base member 912 when the locking assembly 910 is in an unlocked state (e.g., when the tensionable fixation member(s) 16 can move freely for adjustment or re-tensioning). In some embodiments, the elongated flanges 978 may further include medial facing angled, tapered, or curved surfaces 980 configured to interface with corresponding medial facing angled, tapered, or curved surfaces 948 of the overhang 946 to enable proper alignment of the locking element 914 within the central recess 928 upon engagement of the locking element 914 with the base member 912, and to facilitate passage of the elongated flanges 978 beyond the overhang 946 and into the central recess 928. As shown by way of example in FIG. 38, once the elongated flanges 978 of the locking element 914 pass the overhang 946 of the central recess 928, the overhang 946 provides a physical barrier preventing the locking element 914 from disengaging from the central recess 928 in the absence of additional force applied by a user (e.g., with a removal tool).

In some embodiments, the central opening 960 of the locking element 914 is positioned such that, upon assembly with the base member 912, the central opening 960 is positioned over or aligned with the central structure 930 of the base member 912. In some embodiments, the lateral openings 962 of the locking element 914 are positioned such that, upon assembly with the base member 912, the lateral openings 962 of the locking element 914 are positioned over or aligned with the lateral openings 932 of the base member 912.

Figure 48:
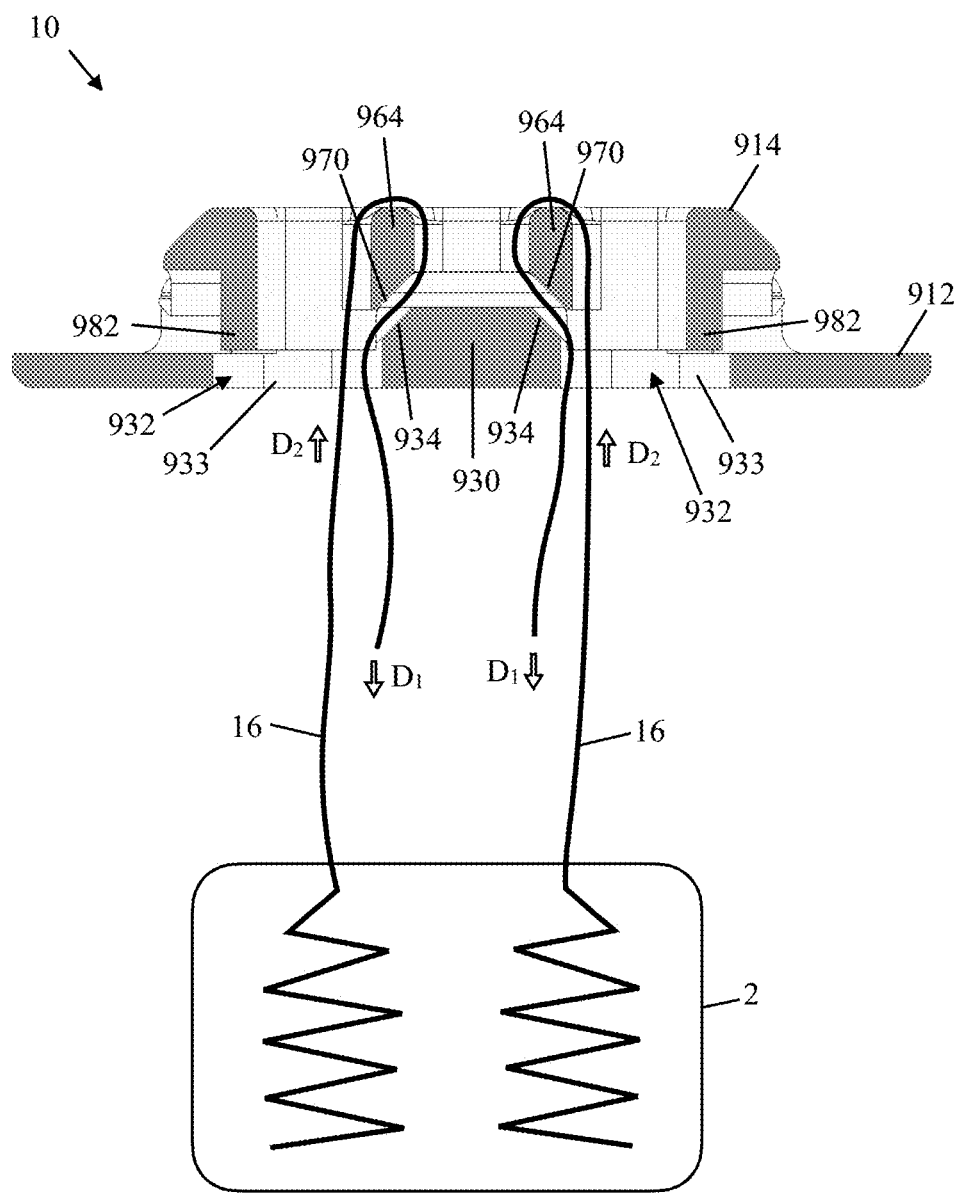
FIG. 48 is a side sectional view of the locking assembly of FIG. 38 taken along line G-G of FIG. 39, with a tensionable fixation member threaded through and the assembly in an unlocked state, according to some embodiments.
Figure 49:
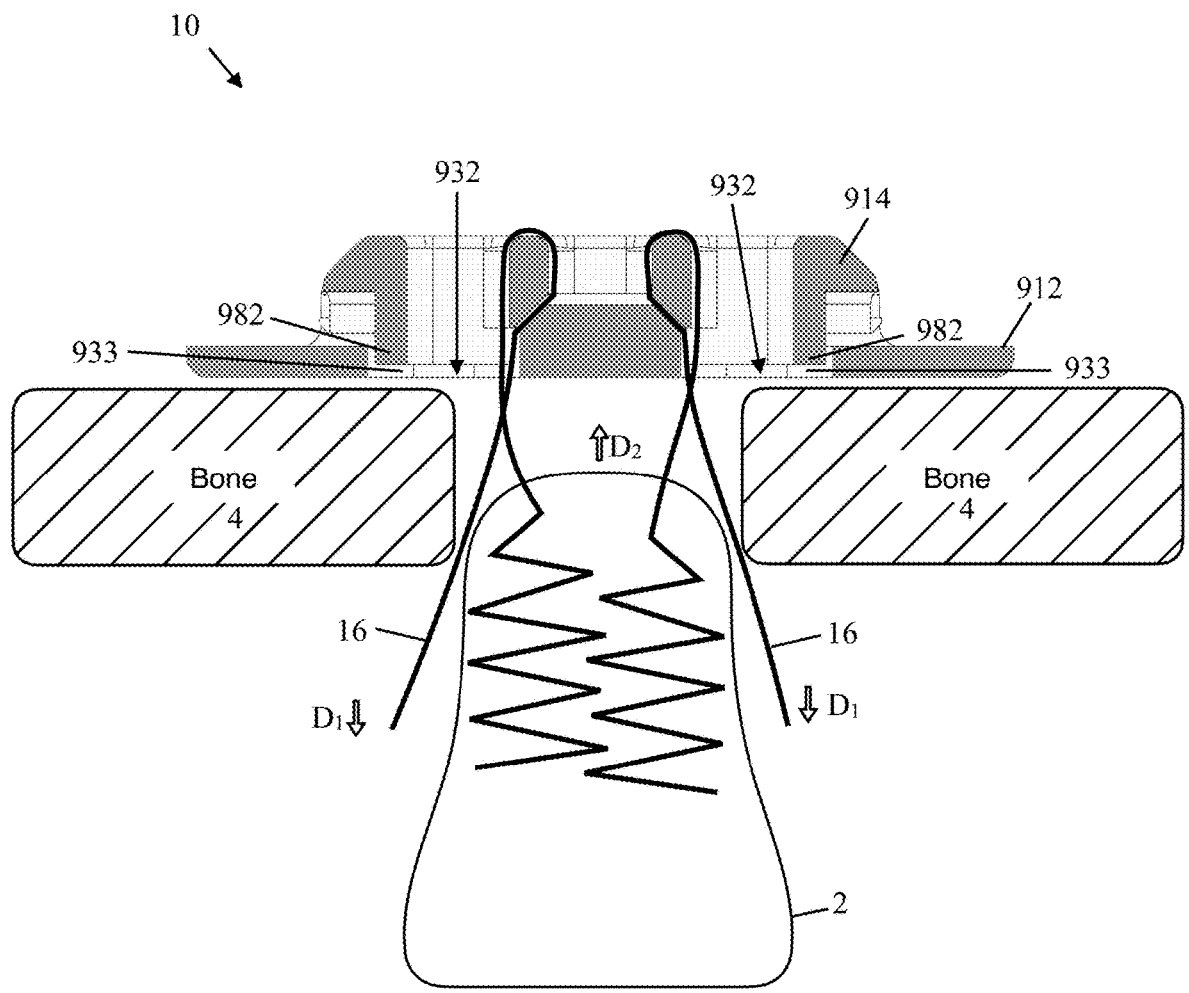
FIG. 49 is a side sectional view of the locking assembly of FIG. 38 taken along line G-G of FIG. 39, with a tensionable fixation member threaded through and the assembly in a locked state, according to some embodiments.

By way of example, FIGS. 48-49 illustrate several steps of a method of fixing or repairing bone and/or tissue using the locking assembly 910 of the present disclosure, according to some embodiments. In some embodiments, shuttle members may be used to help thread the tensionable fixation members(s) 16 through the base member 912 and locking element 914, as described above in relation to other embodiments.

In some embodiments, the tensionable fixation member 16 may be coupled with the locking assembly 910 by: (i) advancing the free end (e.g., coupled with a shuttle member as described above) through one of the lateral openings 932 of the base member 912 in a distal direction (e.g., from the bottom surface 924 toward the top surface 926); (ii) further advancing the free end through the correspondingly aligned lateral opening 962 of the locking element 914; (iii) advancing the free end medially (e.g., toward the central opening 960) around the crossbar 964; (iv) advancing the free end proximally (e.g. from the top surface 958 toward the bottom surface 956 of the locking element 914 so that the tensionable fixation member 16 makes a "U-turn" around the crossbar 964) through the central opening 960 of the locking element 914; and (v) advancing the free end proximally through the same lateral opening 932 that it was first advanced through, so that the free end and attached end of the tensionable fixation member 16 are on the same side of the locking assembly 910, namely the proximal side (e.g. "below" the bottom surface 924 of the base member 912).

In some embodiments, the locking assembly 910 may be provided with the shuttle member pre-threaded through the locking assembly 910 as described above in relation to other embodiments. In some embodiments, the shuttle member may be provided separately and threaded through the locking assembly 910 during or immediately prior to use.

In some embodiments, one end of a tensionable fixation member 16 is configured to be secured to a tissue, bone, or other member, and then chaperoned through the locking assembly 910 by a shuttle member. In the example shown in the accompanying figures, the tensionable fixation member 16 is attached to a tissue 2 (e.g., tendon, muscle, or bone) and coupled to a bone 4 using the locking assembly 910 and tensionable fixation member 16 of the present disclosure.

Referring to FIGS. 48-49, one end of the tensionable fixation member 16 is attached to tendon 2, and the other end of the tensionable fixation member has been threaded through the locking assembly 910 as described above. By way of example, a second tensionable fixation member 16 may be coupled to another tissue portion (e.g., to repair a torn tissue), or to the same tissue segment as the first tensionable fixation member 16 (e.g., to secure a tissue to a bone). Preferably, the tensionable fixation members 16 are coupled with the tissue, bone, or other member before coupling with the locking assembly 910.

At this point, pulling the loose ends of the tensionable fixation members 16 in direction $D_1$ (proximally) will tension the repair, by pulling the tendon 2 close to the locking assembly 910 in direction $D_2$ to a desired position for repair. By way of example only, the tension in the tensionable fixation members 16 can be adjusted to the surgeon's liking. By way of example, the locking assembly 910 is a self-locking assembly, wherein the locking occurs at a locking interface between the lateral surfaces 936 of the base member 912 and the medial surfaces 970 of the locking element 914, creating "pinch points" wherein the tensionable fixation member 16 is captured and held fast between the lateral surfaces 936 of the base member 912 and the medial surfaces 970 of the locking element 914. By way of example, pulling in direction $D_1$ will create tension which can be changed or increased by further pulling in the same direction. Once the locking assembly 910 is in its locked state the tensionable fixation member(s) 16, locking assembly 910, and tissue 2 will maintain its locked state by a combination of compression, friction, and tension. This completes the repair with no need for an additional screw or knot tying.

If the tendon tries to pull away from the site of repair, (e.g., in direction $D_1$) it will pass the tension through the tensionable fixation members 16 and it will further lock the assembly 910 by pulling the base member 912 and locking element 914 toward each other. This is because the tensionable fixation members 16 are captured and held fast at the locking interface between the lateral surfaces 936 of the base member 912 and the medial surfaces 970 of the locking element 914 (e.g. at the "pinch points"), and tensionable fixation members 16 are looped around or make a "U-turn" around the crossbars 964 (which in some embodiments may act as a fulcrum), and therefore a proximal force exerted by the tissue 2 pulling away from the locking assembly 910 in a proximal direction $D_1$ will in turn cause the tensionable fixation members 16 to exert a proximal force on the crossbar 964 and therefore the locking element 914, which increases compression on the tensionable fixation member 16 at the locking interface. This will pinch the tensionable fixation members 16 tight and prevent the tendon 2 (for example) from moving away from the repair state.

The several examples of locking assemblies described herein (e.g., locking assembly 11, 110, 210, 310, 410, 910) are shown and described as specific examples of an overall concept, and are not limited by the specific combination of features each example depict. As such, any locking assembly described herein may include any features described with respect to any other locking assembly, even if not specifically described in combination. Moreover, the various locking assemblies are not limited to the specific number of through-holes or openings shown, or number of tensionable fixation members 16. Optionally, in any embodiment, the specific size and shape of the various features may differ from that shown in the Figures. Optionally, in any embodiment, the number of compression surfaces or locking interfaces may vary from that shown.

Optionally, in any embodiment, the knotless stabilization system 10 includes an unlocking feature to unlock the locking assembly 11 (or any alternative embodiment thereof) to enable re-tensioning of the tensionable fixation member 16 after initial tensioning and locking has been completed. Referring to FIGS. 50-54 in addition to the previous figures, in some embodiments, the unlocking feature comprises an unlocking component or tool 90 that can engage the base member 12 and/or locking element 14 and displace the locking element 14 relative to the base member 12 to create a space or distance or separation which allows for the tensionable fixation member 16 to be relaxed and subsequently tensioned again if desired. The relaxed state will allow the tensionable fixation member to manipulate and slide for re-tensioning. Once the desired tension is achieved the unlocking component or tool 90 is pulled back, removed, or otherwise disengaged from the base member 12 and/or locking element 14. Due to the tensioned tensionable fixation member 16 pulling the locking element 14 in the proximal direction, the clearance gained by the unlocking tool 90 will disappear and the tensionable fixation member 16 will once again become pinched between the locking element 14 and base member 12 as described above.

Figure 50:
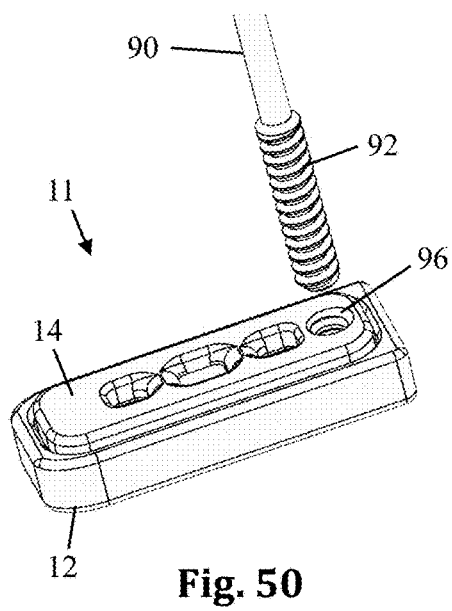
FIG. 50 is a perspective and view of an example of a locking assembly and unlocking tool, with the locking assembly in a locked state, according to some embodiments.
Figure 51:
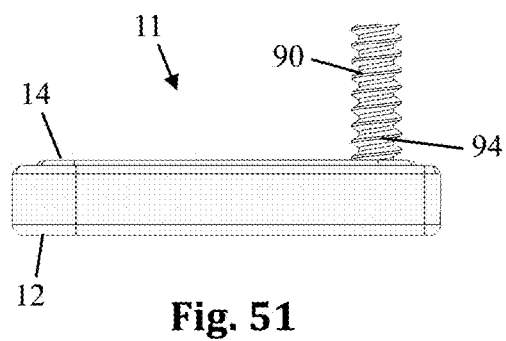
FIG. 51 is a side plan view of the locking assembly and unlocking tool of FIG. 50 with the unlocking tool engaged with the locking assembly and with the locking assembly in a locked state, according to some embodiments.
Figure 52:
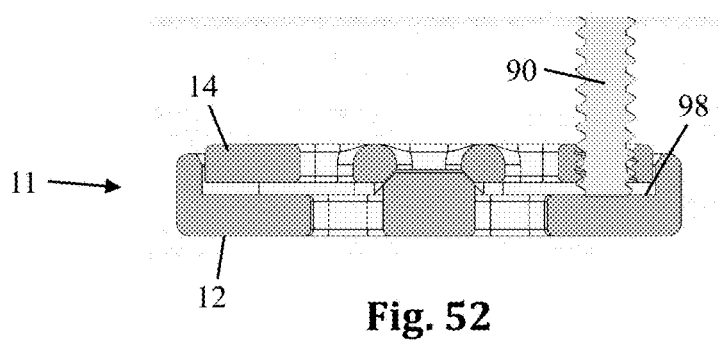
FIG. 52 is a side sectional view of the locking assembly and unlocking tool of FIG. 50 with the unlocking tool engaged with the locking assembly and with the locking assembly in a locked state, according to some embodiments.
Figure 53:
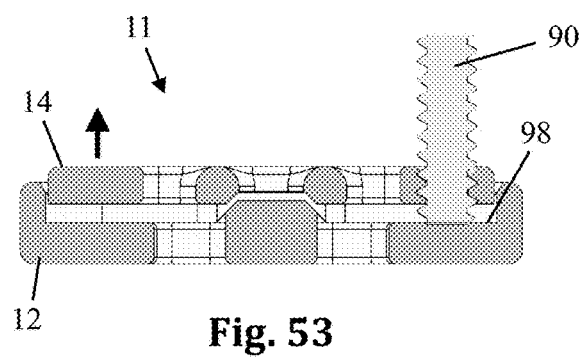
FIG. 53 is a side sectional view of the locking assembly and unlocking tool of FIG. 50 with the unlocking tool engaged with the locking assembly and with the locking assembly in an unlocked state, according to some embodiments.
Figure 54:
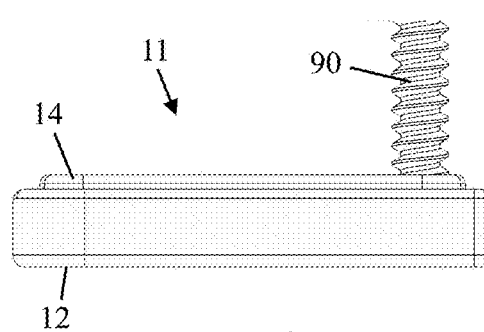
FIG. 54 is a side plan view of the locking assembly and unlocking tool of FIG. 50 with the unlocking tool engaged with the locking assembly and with the locking assembly in an unlocked state, according to some embodiments.

The unlocking tool or component 90 may comprise any tool or component suitable or capable of overcoming the tension in the tensionable fixation member 16 to create a temporary separation between the locking element 14 and the base member 12, including but not limited to a threaded member, a snap-fit trigger-controlled pusher/extender, a pliers-like gripper, and the like. By way of example only, FIGS. 50-54 illustrate one example of an unlocking tool 90 according to some embodiments. By way of example, the unlocking tool 90 includes a threaded portion 92 and a distal end 94. In the instant example, the locking element 14 includes a threaded aperture 96 having a threadform complementary to that of the threaded portion 92 such that the threaded portion 92 threadedly engages the threaded aperture 96. In the instant example, the base member 12 has an engagement surface 98, which provides a contact surface for the distal end 94 of the unlocking tool 90. By way of example, FIGS. 50-52 illustrate a locking assembly 11 in a locked position (the tensionable fixation member 16 is not shown), with an unlocking tool 90 being aligned with and then advanced into the threaded aperture 96 (e.g., by rotating the threaded portion 92 of the engagement tool 90 of the present example in the advancement direction) until the distal end 94 contacts the engagement surface 98. Once the distal end 94 contacts the engagement surface 98, further rotation in the advancement direction will cause the locking element 14 to translate distally along the threaded portion 92 thereby creating separation between the locking element 14 and the base member 12, as shown by way of example only in FIGS. 53-54. Once separation has been achieved, the tensionable fixation member may be adjusted as described above, and the locking assembly 11 may be locked again by removal or dissociation of the unlocking tool 90.

In some embodiments, as described herein, the locking assembly 11, in addition to the unlocking feature described herein, may include a secondary locking element to prevent the locking element 14 from disassociating from the base member 12 during the re-tensioning process.

Figure 55:
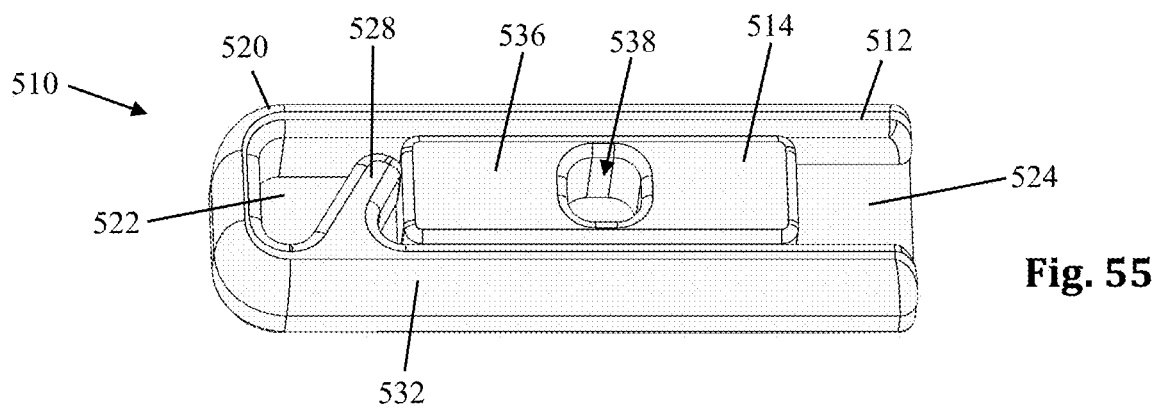
FIG. 55 is a perspective view of another example of a locking assembly with a deflectable unlocking element forming part of the knotless orthopedic stabilization system of FIG. 1, shown in a locked state, according to some embodiments.
Figure 56:
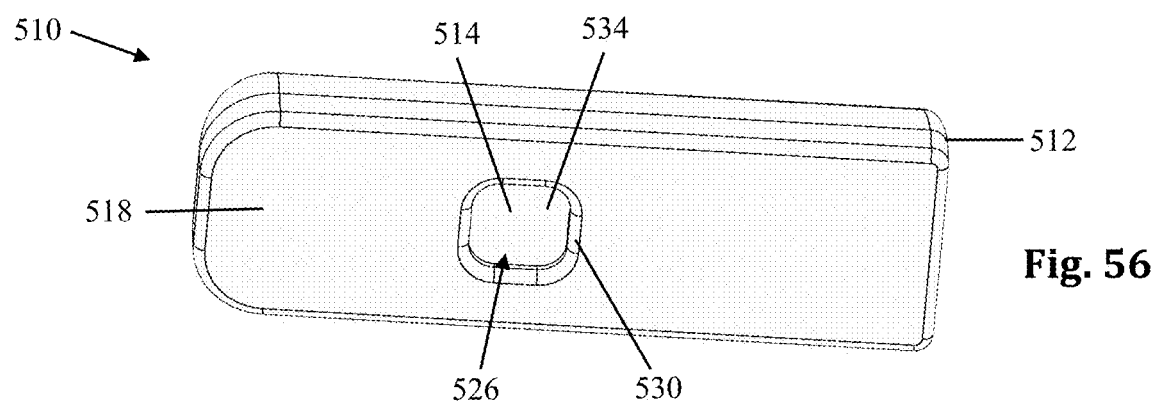
FIG. 56 is a bottom perspective view of the locking assembly of FIG. 55 in a locked state, according to some embodiments.
Figure 57:
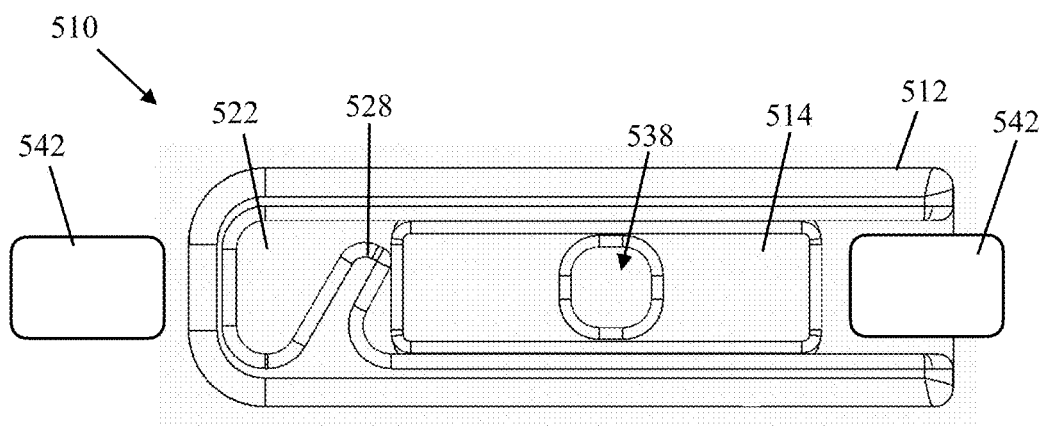
FIG. 57 is a top plan view of the locking assembly of FIG. 55 in a locked state, shown with an example of a pinching component, according to some embodiments.
Figure 58:
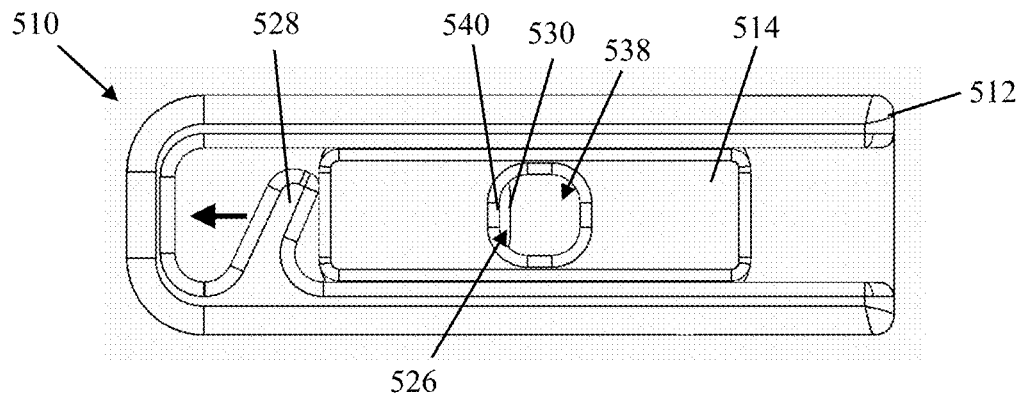
FIG. 58 is a top plan view of the locking assembly of FIG. 55 in an unlocked state, according to some embodiments.
Figure 59:
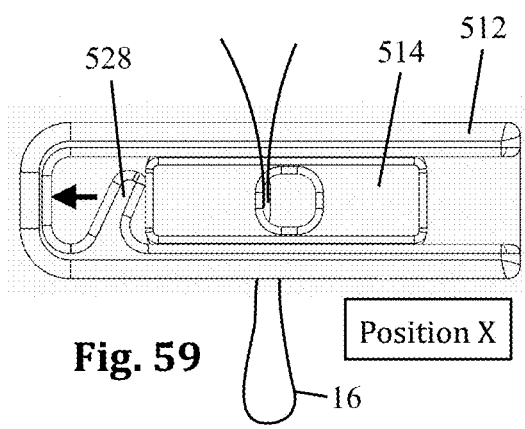
FIGS. 59-60 are top plan views of the locking assembly of FIG. 55 in an unlocked state coupled with a tensionable fixation member, according to some embodiments.
Figure 60:
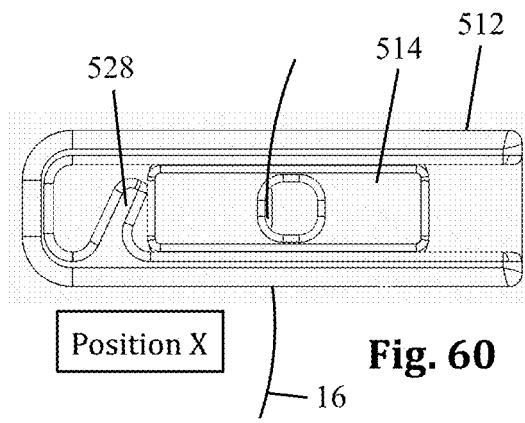
Figure 61:
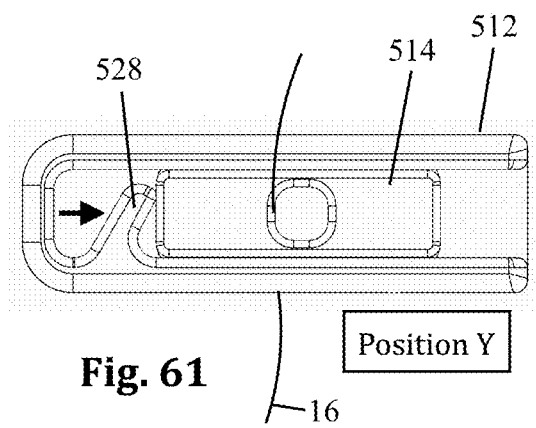
FIGS. 61-62 are top plan views of the locking assembly of FIG. 55 in a locked state coupled with a tensionable fixation member, according to some embodiments.
Figure 62:
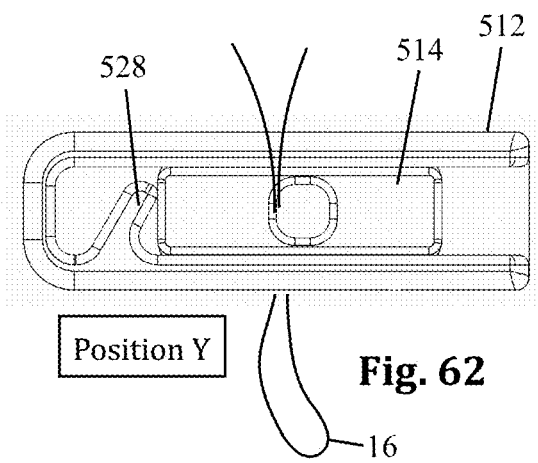
Figure 65:
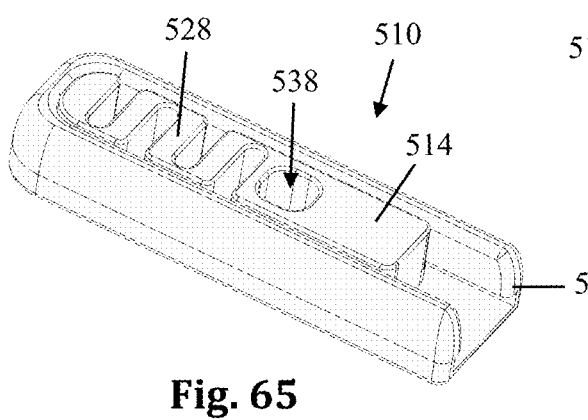
FIG. 65 is a perspective view of another example of a locking assembly with a deflectable unlocking element forming part of the knotless orthopedic stabilization system of FIG. 1, shown in a locked state, according to some embodiments.
Figure 66:
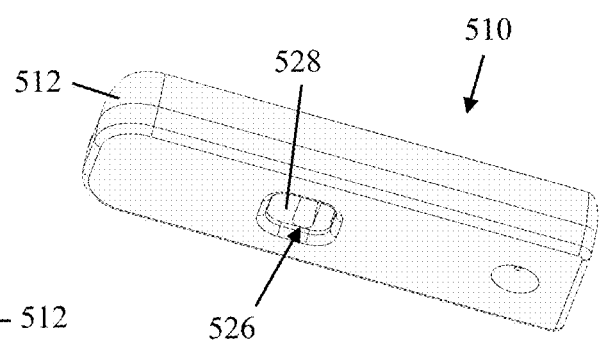
FIG. 66 is a bottom perspective view of the locking assembly of FIG. 65, according to some embodiments.
Figure 67:
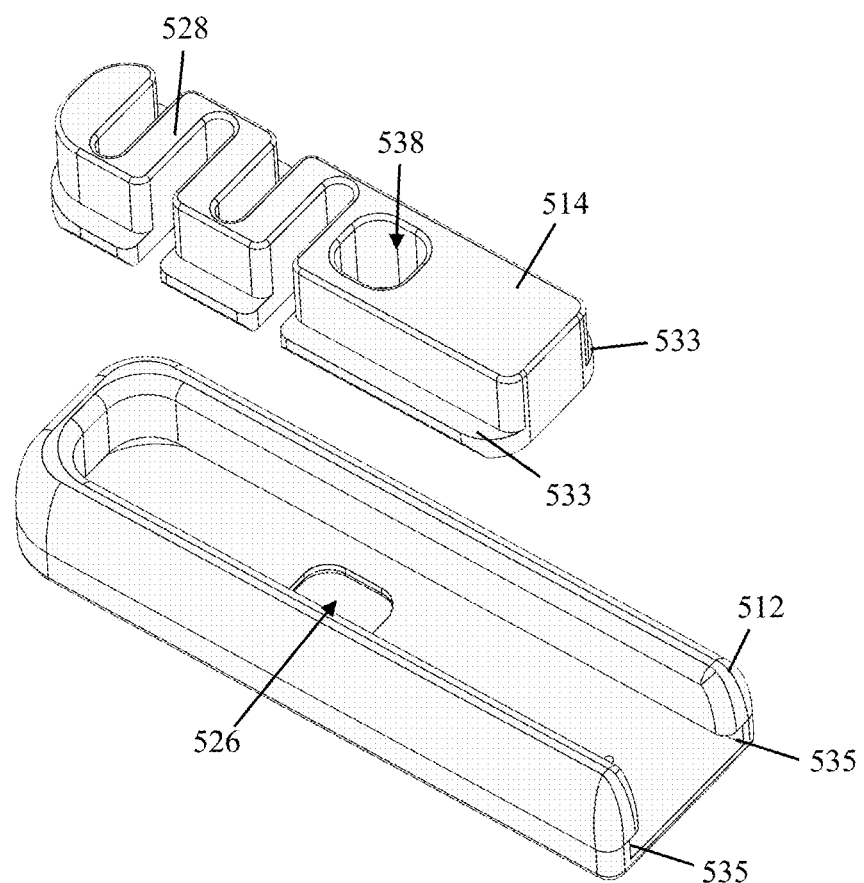
FIG. 67 is an exploded perspective view of the locking assembly of FIG. 65, according to some embodiments.
Figure 68:
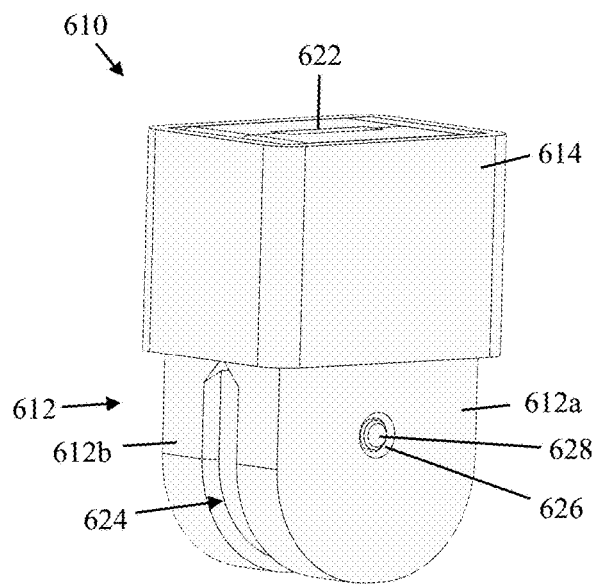
FIG. 68 is a perspective view of an example of an assembly device configured for use with a multi-component fixation device, according to some embodiments.
Figure 69:
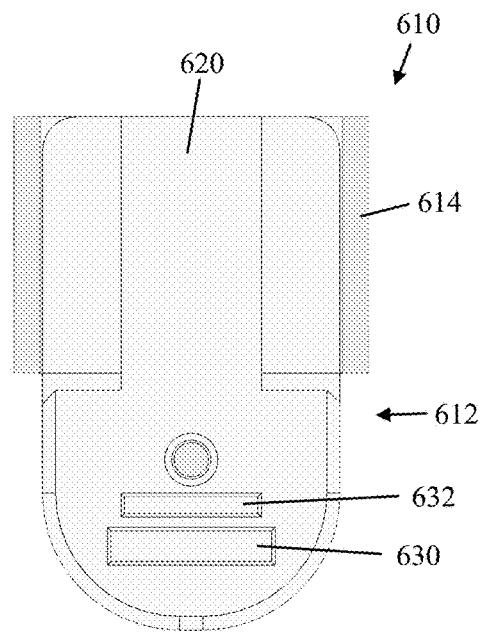
FIG. 69 is a side sectional view of the assembly device of FIG. 68, according to some embodiments.
Figure 70:
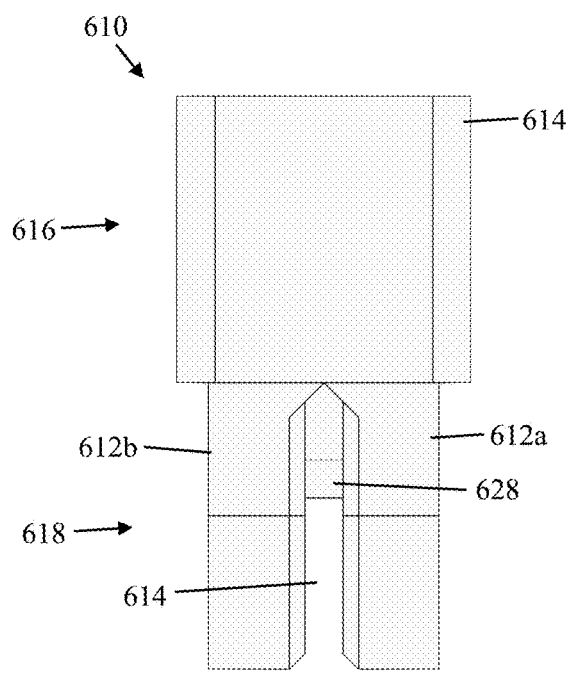
FIG. 70 is an end plan view of the assembly device of FIG. 68, according to some embodiments.
Figure 71:
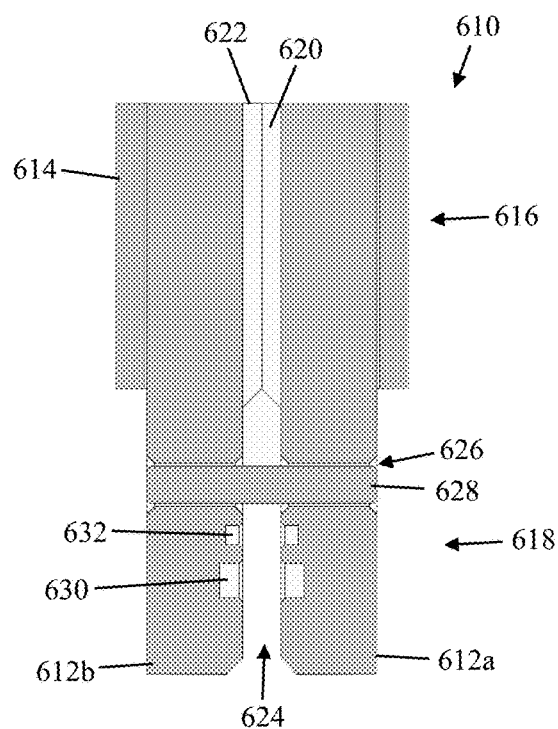
FIG. 71 is an end sectional view of the assembly device of FIG. 68, according to some embodiments.
Figure 72:
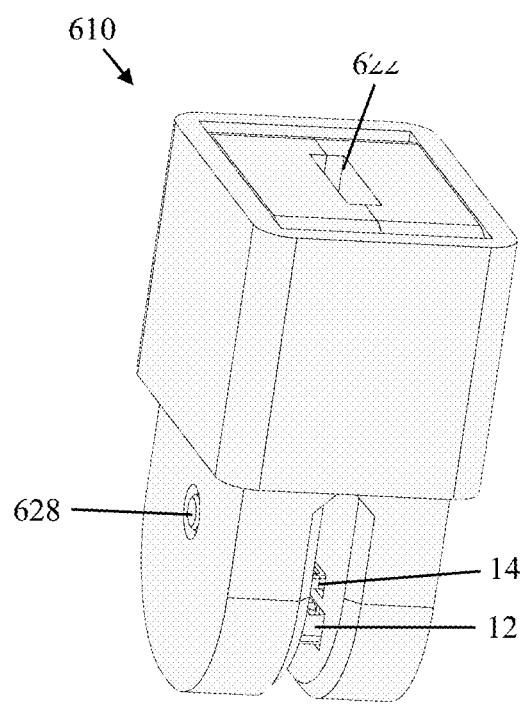
FIG. 72 is a perspective view of the assembly device of FIG. 68 coupled with a locking assembly of FIG. 2, according to some embodiments.
Figure 73:
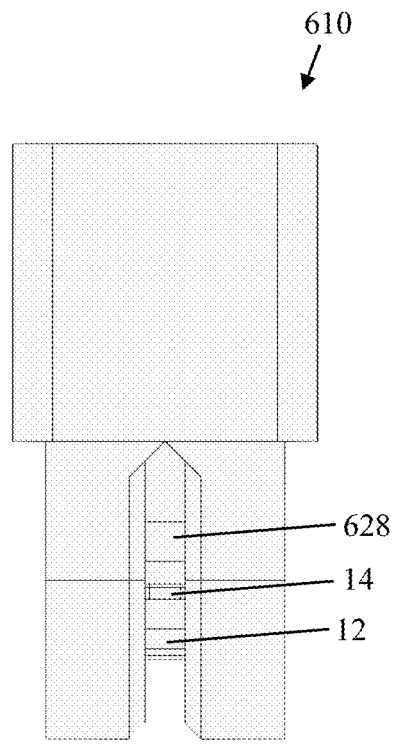
FIG. 73 is an end plan view of the assembly device of FIG. 68 coupled with a locking assembly of FIG. 2, according to some embodiments.
Figure 74:
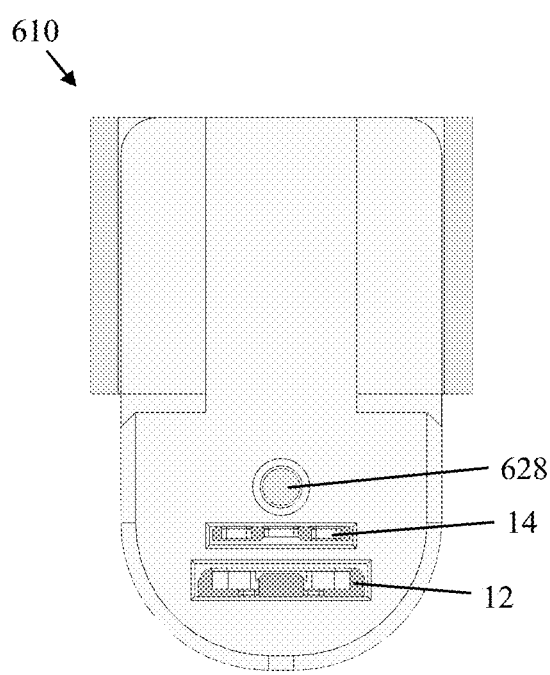
FIG. 74 is a side sectional view of the assembly device of FIG. 68 coupled with a locking assembly of FIG. 2, according to some embodiments.
Figure 75:
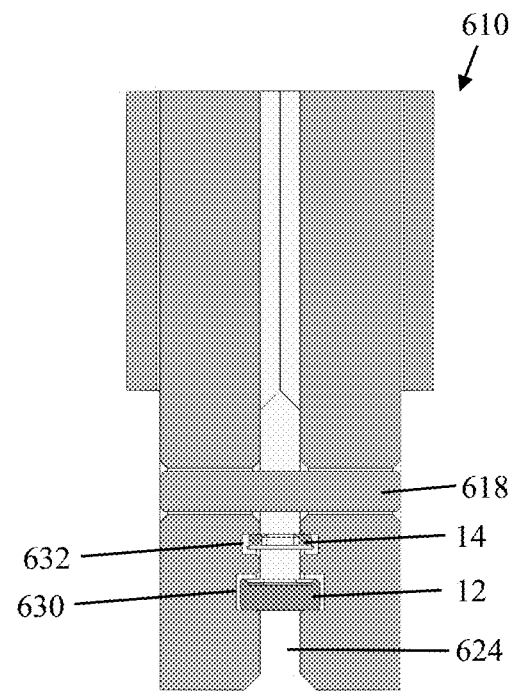
FIG. 75 is an end sectional view of the assembly device of FIG. 68 coupled with a locking assembly of FIG. 2, according to some embodiments.

In some embodiments, the unlocking feature may comprise a deflectable member that is moveable from a first position in which the locking assembly 11 is in a locked configuration to a second position in which the locking assembly 11 is in an unlocked configuration, thereby enabling re-tensioning of the tensionable fixation member 16. By way of example only, FIGS. 55-67 illustrate an example of a locking assembly 510 having a deflectable member 528 that enables unlocking of the locking assembly 510 to re-tension the tensionable fixation member 16, according to some embodiments. By way of example only, the locking assembly 510 may have a base member 512 and locking element 514. In some embodiments, the locking assembly 510 may couple with a tensionable fixation member 16 (e.g., a surgical suture, tape, fiber, etc.) that is attached to a tissue, bone, or other member to lock the tensionable fixation member 16 under tension during a surgical procedure. In some embodiments, the locking element 514 is moveable relative to the base member 512 between a locked state (e.g., FIGS. 55-57) and an unlocked state (e.g., FIG. 58). By way of example, the tensioning of the tensionable fixation member 16 may occur while the locking assembly 510 is in an unlocked state, and then the locking assembly 510 may be converted to a locked state to secure the tensionable fixation member 16 in the desired position under the desired tension. In some embodiments, the locking assembly 510 includes an unlocking feature to enable re-tensioning of the tensionable fixation member 16 after initial tensioning and locking has been completed. In some embodiments, the unlocking feature comprises a deflectable member that biases the locking element 514 in the locked state but is deflectable to enable the locking element 512 to translate into an unlocked state. In some embodiments, the deflectable member is part of, provided on, or attached to the button 512. In some embodiments, the deflectable member is part of, provided on, or attached to the locking element 514 (See, e.g., FIGS. 65-67).

By way of example, in some embodiments, the base member 512 may have a first or bottom surface 518 configured to interface with tissue, bone, or other member and a second or top surface 520 opposite the bottom surface 518. In some embodiments, the top surface 520 includes an elongated central recess 522 having a generally planar translating or bottom surface 524 and a size and shape that enables the locking element 514 to translate linearly within the recess 522 upon assembly.

In some embodiments, the base member 512 may further include a central opening 526 formed through the bottom surface 524 and a deflectable member 528 positioned at one end of the elongated recess 522. In some embodiments, the intersection between the central opening 526 and the bottom surface 524 of the elongated recess 522 comprises a smooth and/or rounded rim surface 530. In some embodiments, the rim surface 530 is a compression surface configured to act in concert with rim surface 540 of the locking element 514 to capture or pinch the tensionable fixation member 16 therebetween (e.g., forming a "pinch point") upon tensioning of the locking assembly 510 during use.

In some embodiments, the base member 512 may have a generally rectangular shape. In some embodiments, the base member 512 may have any shape suitable, including but not limited to rectangular, circular, oblong, oval, elliptical, or polygonal. In some embodiments, the base member 512 may be sized and configured to be inserted through a corridor formed in bone and thereafter be pivoted, rotated, or otherwise maneuvered to extend over the corridor without being pulled back through the corridor. In some embodiments, the top surface 520 may further include a rounded and/or smooth outer perimeter surface 532 to minimize the profile of the base member 512 and potentially reduce trauma to surrounding tissue during and after implantation.

By way of example, the locking element 514 has a width dimension and shape that is complimentary to the width and shape of the elongated recess 522 of the base member 512 so that the locking element 514 is translatable within the recess 522 upon assembly. By way of example, in some embodiments, the locking element 514 may have a first or bottom surface 534 configured to interface with the bottom surface 524 of the elongated recess 522 of the base member 512 and a second or top surface 536 opposite the bottom surface 534. In some embodiments, the locking element 514 further includes a central opening 538 extending through the locking element 514 between the bottom and top surfaces 534, 536. In some embodiments, the intersection between the central opening 538 and the bottom surface 534 of the locking element 514 comprises a smooth and/or rounded rim surface 540. In some embodiments, the rim surface 540 is a compression surface configured to act in concert with rim surface 530 of the base member 512 to capture or pinch the tensionable fixation member 16 therebetween (e.g., forming a "pinch point") upon tensioning of the locking assembly 510 during use.

In some embodiments, the locking assembly 510 may include a retaining feature to prevent the locking element 514 from disassociating from the base member 512 while allowing the locking element 514 to translate within the elongated recess 522. In some embodiments, the retaining feature may comprise one or more overhang portions of the top surface 520 of the button extending over the elongated recess 522. In some embodiments, the retaining feature may comprise one or more rails 533 extending from either or both sides and/or bottom surface 534 of the locking element 514 and into complimentary elongated slots 535 formed in the sidewalls and/or bottom surface 524 of the elongated recess 522, as shown by way of example only in FIG. 67. In some embodiments, the retaining feature may comprise one or more rails extending from either or both sidewalls and/or bottom surface 524 of the elongated recess 522 into complementary elongated slots formed in the sides and/or bottom surface 534 of the locking element 514.

In some embodiments, the base member 512 further includes a deflectable member 528 positioned at one end of the elongated recess 522 and having a deflectable, flexible, and/or spring-like feature. The deflectable member 528 interacts with the locking element 514 to create a locked and unlocked position. By way of example, the deflectable member 528 is spring-loaded and biases the locking element 514 in the locked position by exerting a directional force on the locking element 514. To achieve the unlocked position, this directional force must be overcome, for example using a pinching component 542 (e.g., FIG. 57) that will apply a counter-directional force on the locking element 514 and cause temporary deflection of the flexible member 528. In some embodiments, in the unlocked position, the central opening 538 of the locking element 514 is positioned such that, upon assembly with the base member 512, the central opening 538 of the locking element 514 is at least partially positioned over or aligned with the central opening 526 of the base member 512, as shown by way of example only in FIG. 58. This positioning enables movement of the tensionable fixation member 16 to increase and/or relax the tension in the tensionable fixation member 16. For example, when the tension is inadequate, an operator may change the state of the locking assembly 510 from locked position to an unlocked position by using the pinching component 542 to increase the overlap between the central opening 538 of the locking element 514 with the central opening 526 of the button 512. Similarly, when there is over-tensioning of the tensionable fixation members 16, pinching components 542 can be used to create an unlocked state to loosen the tension in the tensionable fixation member 16 and then lock the tensionable fixation member 16 by releasing the pinching component 542 when the desired tension has been achieved. In some embodiments, the pinching component 542 can be modified to a pulling component to achieve at least partial alignment or overlap of the central opening 538 of the locking element 514 with the central opening 526 of the button 512.

Referring to FIGS. 59-62, the unlocked state or "position X" is when the central opening 538 of the locking element 514 and central opening 526 of the base member 512 are in at least partial alignment or otherwise overlap. The locked state or "position Y" is when the central opening 538 of the locking element 514 and central opening 526 of the base member 512 are not in alignment (very slight overlap to accommodate the width/diameter of a tensionable fixation member 16 without allowing the tensionable fixation member to move. In some embodiments, position X is achieved by using a pinching component 542 to exert a counter-directional force on the locking element 514 which in turn causes temporary deflection of the flexible member 528 (as shown by way of example only in FIG. 57). In some embodiments, position Y is achieved by releasing the pinching component 542 to enable the deflectable member 528 to succumb to its directional bias and move back in the direction of its original position, creating a locked position in which the tensionable fixation member 16 is locked between the rim surface 530 of the base member 512 and the rim surface 540 of the locking element 514 (e.g., at the "pinch points").

In some embodiments, position X (or unlocked state) of the locking assembly 510 will also allow for tensioning or movement of the tensionable fixation member 16 in both directions (e.g., further tensioning or relaxing), which is a key element to adjust tension in an over-tensioned or under-tensioned state. Position Y of the locking assembly 510 will lock the tensionable fixation member(s) 16 as described herein and secure the desired tension therein. In some embodiments, the deflectable member is part of, provided on, or attached to the base member 512, as shown by way of example in FIGS. 55-64. In some embodiments, the deflectable member is part of, provided on, or attached to the locking element 514, as shown by way of example in FIG. 65-67. In either case, the deflectable member 528 allows for temporary change in position of the locking element 514 to create an unlocked state (e.g., Position X), which allows for tensioning or loosening of the repair. In some embodiments, a similar state may be created by a spring-like feature 528 provided on the base member 512 and/or the locking element 514 (as shown by way of example only in FIG. 64), or by way of additional components that allow for the creation of unlocked Position X for tensioning or loosening of the repair construct.

By way of example, the base member 512 and/or locking element 514 may be made of polymer, PEEK, resorbable or un-resorbable component, metal (e.g., titanium, stainless steel, cobalt-chrome etc.) or similar materials used in the industry. The tensionable fixation members 16 may be used in either a looped orientation or un-looped orientation. The tensionable fixation members 16 can be made of polymer, tape-suture or any other material member that is used to increase or decrease tension in the repair construct. The looped or un-looped portion of the tensionable fixation member 16 can be attached to tissue, bone, graft, or other member (e.g., metal plate, anchor, etc.) it is anchored onto or wishes to repair.

The uniqueness of this novel design to create an unlocked state by using the pinching member or similar mechanism to allow the surgeon to increase or reduce the tension will minimize the incidence of failure due to sub-optimal tensioning, surgical time is reduced as the surgeon does not have to tie the knot and retie it again to achieve the desired tension. The uniqueness refers to creating the locked and unlocked position with the assistance of member that creates an unlocked state by pinching or pulling or any mechanism that may create an unlocked state. The deflectable member 528 described by way example herein will temporarily change position due to the pinching component 542 as described herein and then try to move back into its original position creating a locked state.

Example: Carpometacarpal (CMC) Arthroplasty

Figure 63:
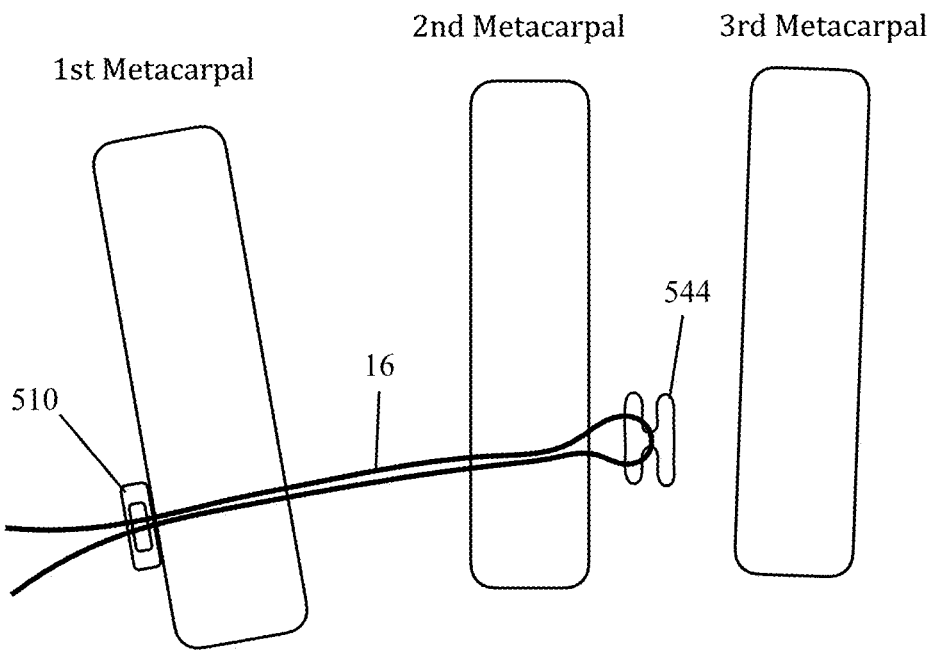
FIG. 63 is a block diagram of an example of a locking assembly of FIG. 55 in use in a Carpometacarpal (CMC) Arthroplasty procedure, according to some embodiments.
Figure 64:
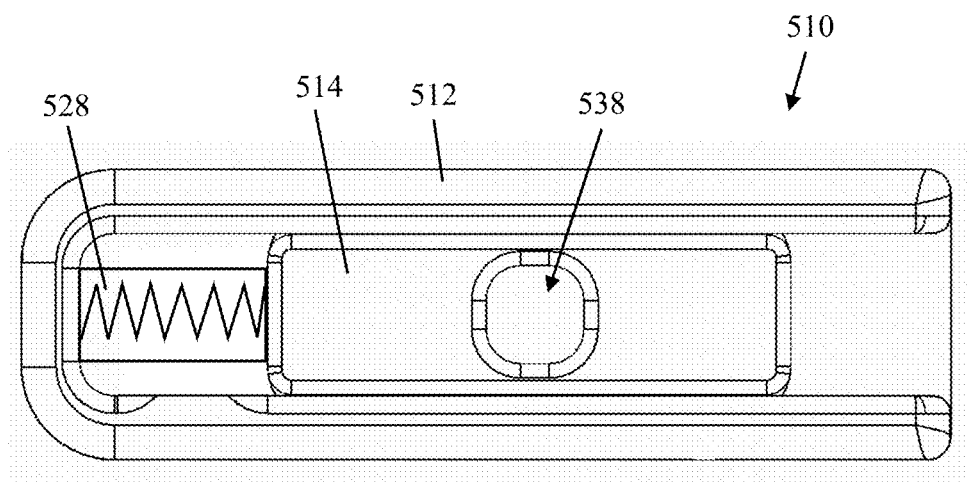
FIG. 64 is a top plan view of another example of a locking assembly with a deflectable unlocking element forming part of the knotless orthopedic stabilization system of FIG. 1, shown in a locked state, according to some embodiments.

With additional reference to FIG. 63, one example method of using the locking assembly 510 of the present disclosure will now be described in the context of a carpometacarpal (CMC) arthroplasty procedure. However, this is strictly an example method of repair and use of the device is not limited to the specific example described. After the trapezium is excised, a surgical corridor is created by drilling generally aligned holes through the first and second metacarpals. A tensionable fixation member provided in a looped orientation is shuttled through the holes formed in the first and second metacarpals. Once the looped end of the tensionable fixation member is retrieved out of the far cortex of the second metacarpal, an open button or anchor device 544 (for example) can be used as a bridge and the tensionable fixation member can be passed around it, as shown in FIG. 63. Once the open button with the looped tensionable fixation member around it is secured on the far cortex of the second metacarpal, the locking assembly 510 is then pinched into an unlocked state (e.g., Position X) by using a pinching component 542 or any other component that manipulates the locking assembly 510 into position X. The pinching component 542 creates a temporary deflection of the flexible member 528 and will allow for the tensionable fixation members to slide to increase the tension in the fibers and pulling the tensionable fixation members will reduce the distance between both base members or the locking assembly 510 and the member which is attached to the looped end. If at this point of time the surgeon feels that the repair is in an over-tensioned state which may limit the patient's functional ability to use the hand, the surgeon can bring the locking assembly 510 back to Position X (unlocked state) from Position Y (locked state). This will allow the surgeon to increase the distance between the member attached to the looped end and the locking assembly 510. Once the new position is confirmed and the tension is desirable, then release the pinching component will bring the button assembly back to Position Y which is locked state. The Position Y will now secure the repair in this new optimally tensioned state.

Assembly Holder Device

Figure 88:
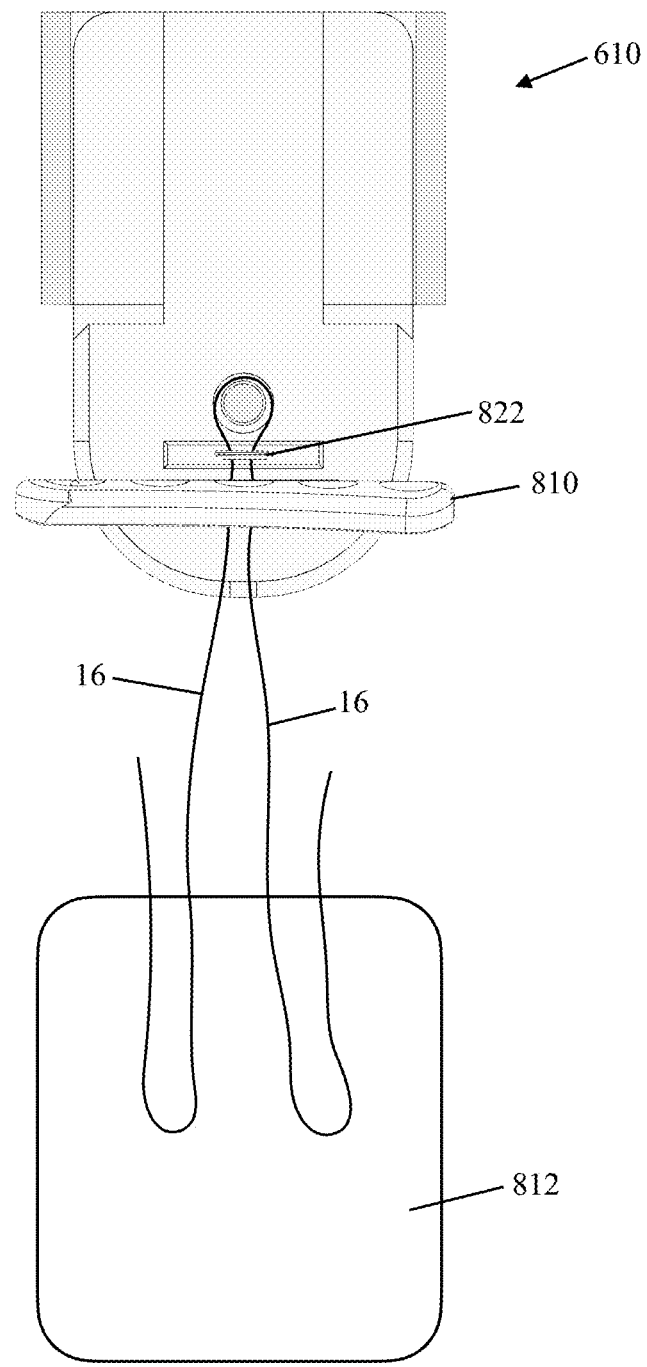
FIG. 88 is a plan view of an assembly device of FIG. 68 in use with a fracture repair plate of FIG. 84, according to some embodiments.
Figure 89:
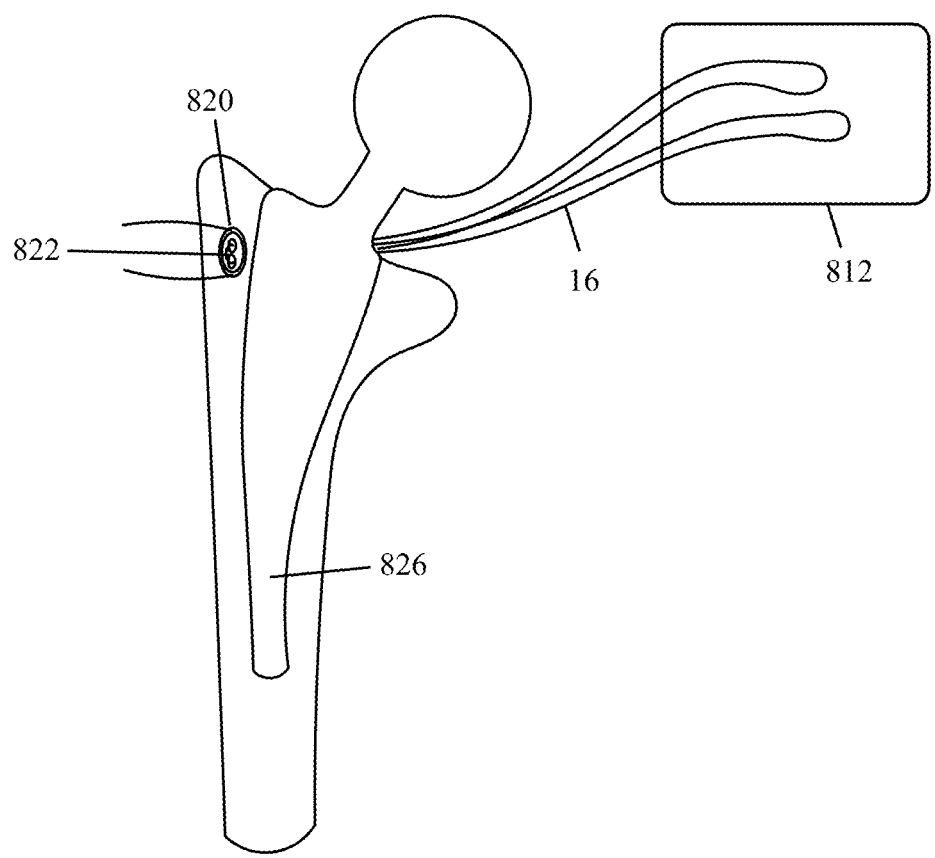
FIG. 89 is a block diagram illustrating an example of a joint prosthesis coupled with a knotless fixation assembly to secure soft tissue, according to some embodiments.

FIGS. 68-77 illustrate an example of an assembly device 610 and technique configured for use with a multi-component fixation device, for example the locking assembly 11 described above, according to some embodiments. Although shown and described herein by way of example in relation to the locking assembly 11 described above, it should be understood that the assembly device 610 may be modified for use with other multi-component fixation devices, including but not limited to (and by way of example only) locking assembly 110, locking assembly 210, locking assembly 310, locking assembly 410, locking assembly 910 (described above) or a fracture/soft tissue repair plate 810 described below (see, e.g., FIG. 88)

By way of example, this disclosure describes a unique technique to ease passage of a tensionable fixation member through a multi-component fixation assembly (e.g., locking assembly 11) used to connect soft tissue or any other tissue to an anchoring device. In some embodiments, the assembly device 610 of the present disclosure includes the ability to shuttle the tensionable fixation member 16 through a multi-component assembly. In some embodiments, the assembly device 610 of the present disclosure includes the ability to pass a tensionable fixation member or tensionable fixation member in between multiple base members or fixation components so that the tensionable fixation members are positioned at a locking interface of the multiple fixation components. This assembly holder technique describes a unique mechanism of securing tensionable fixation members that are used to fix a tissue without the need to perform knot tying. It also prevents the tensionable fixation member from damage and/or breakage as the tensionable fixation member passes through the locking interface of the multi-component fixation assembly. In some embodiments, the assembly device 610 allows for pressure on the tensionable fixation member during assembly with the multi-component fixation assembly to be relieved by reducing the friction at the locking interface of the multi-component assembly. This allows the user to pass the tensionable fixation member(s) through the assembly device 610 in a seamless manner and then disengage the assembly device 610 to couple the tensionable fixation member(s) with the multi-component fixation assembly to finish the repair.

By way of example only, the assembly holder may be made from metal, PEEK, polymer, or other materials typically used in the industry for the manufacturing of this component. The tensionable fixation members or sutures may be made from PEEK, stainless steel, wire nitinol, tapes, polyester, or other similar materials used to capture the soft tissue or other tissues to be fixed at the time of repair.

By way of example only, the multi-component fixation assembly or similar anchoring system may be made of PEEK, metal, polymer, plastic, or other materials that can be used to manufacture this product. The number of multi-component assemblies and multiple anchor systems used may be variable. The passage of the tensionable fixation members through the assembly device 610 may be made either directly or with the help of a suture lasso or other shuttle member. The unloader or the shuttling assistor can be made from metal, peek, polymer, or other similar material. It basically describes a method of creating engagement between tensionable fixation members and a self-locking button or a similar anchoring device. The mechanism involves creating a feature which will eliminate the pressure that is created at the locking interface at the time of shuttling the sutures which allows for ease of suture passage and later on the tensioning of the repair. Once the locking surfaces are engaged it will allow for tensioning of the repair in one direction and prevent slippage of the suture or loosening of the repair when fibers are pulled in opposite direction.

The preferred embodiment described here is a mere example of one of the ways this repair can be achieved using a multi-component fixation assembly and an assembly holder device. Similar embodiments may be created using the principle described here to unload the pressure on the locking interface at the time of shuttling the sutures or tensionable fixation members.

Referring to FIGS. 68-75, in some embodiments the assembly device 610 includes a main body 612 which may comprise separable first and second main body portions 612a, 612b that are held together by an outer sleeve 614 (for example). The main body 612 further comprises a proximal portion 616 and a distal portion 618. In some embodiments the proximal portion 616 is a solid portion or alternatively the proximal portions of the first and second main body portions 612a, 612b are flushly mated with one another. The proximal portion 616 may further comprise a central lumen 620 extending longitudinally (e.g., along a central longitudinal axis extending through the assembly device 610) through the main body 612 between the proximal and distal portions. In some embodiments, the central lumen 620 has a proximal opening 622, and is distally open to the working gap 624, described below.

In some embodiments, the distal portion 618 includes a working gap or recess 624 formed along the central longitudinal axis and extending along a plane parallel to the central longitudinal axis. In some embodiments, the working gap 624 is formed by a space separating the distal portions 618 of the first and second main body portions 612a, 612b. In some embodiments, the working gap 624 provides space for maneuvering of one or more tensionable fixation members, shuttling devices, and/or other instruments that may be used during the assembly process. In some embodiments, the distal portion 618 includes a transverse channel 626 extending through the first and second main body portions 612a, 612b and configured to receive a shuttling assistor (e.g., cross-pin) 628 therethrough, that in turn extends across the working gap 624.

In some embodiments the distal portion 618 further comprises a first component recess 630 configured hold a first component of a multi-component fixation assembly (e.g., a base member 12 of the locking assembly 11 described above) within the working gap 624, and a second component recess 632 configured to hold a second component of a multi-component fixation assembly (e.g., a locking element 14 of the locking assembly 11 described above) within the working gap 624. In some embodiments, the first and second component recesses 630, 632 are spaced vertically apart (e.g., having longitudinal separation in the proximal-distal direction) to ensure that the locking interfaces of the first and second components (e.g., the lateral surfaces 36 of the base member 12 and the medial surfaces 70 of the locking element 14 described above) are held apart from one another in a first position during shuttling of the tensionable fixation member 16 to reduce or eliminate damage to the tensionable fixation member 16 during coupling with the multi-component fixation assembly (e.g. locking assembly 11). In some embodiments, the first and second component recesses 630, 632 are not completely separated but are still able to hold the components with some vertical separation between them, for with a protrusion that forces the components into an unlocked position.

Figure 76:
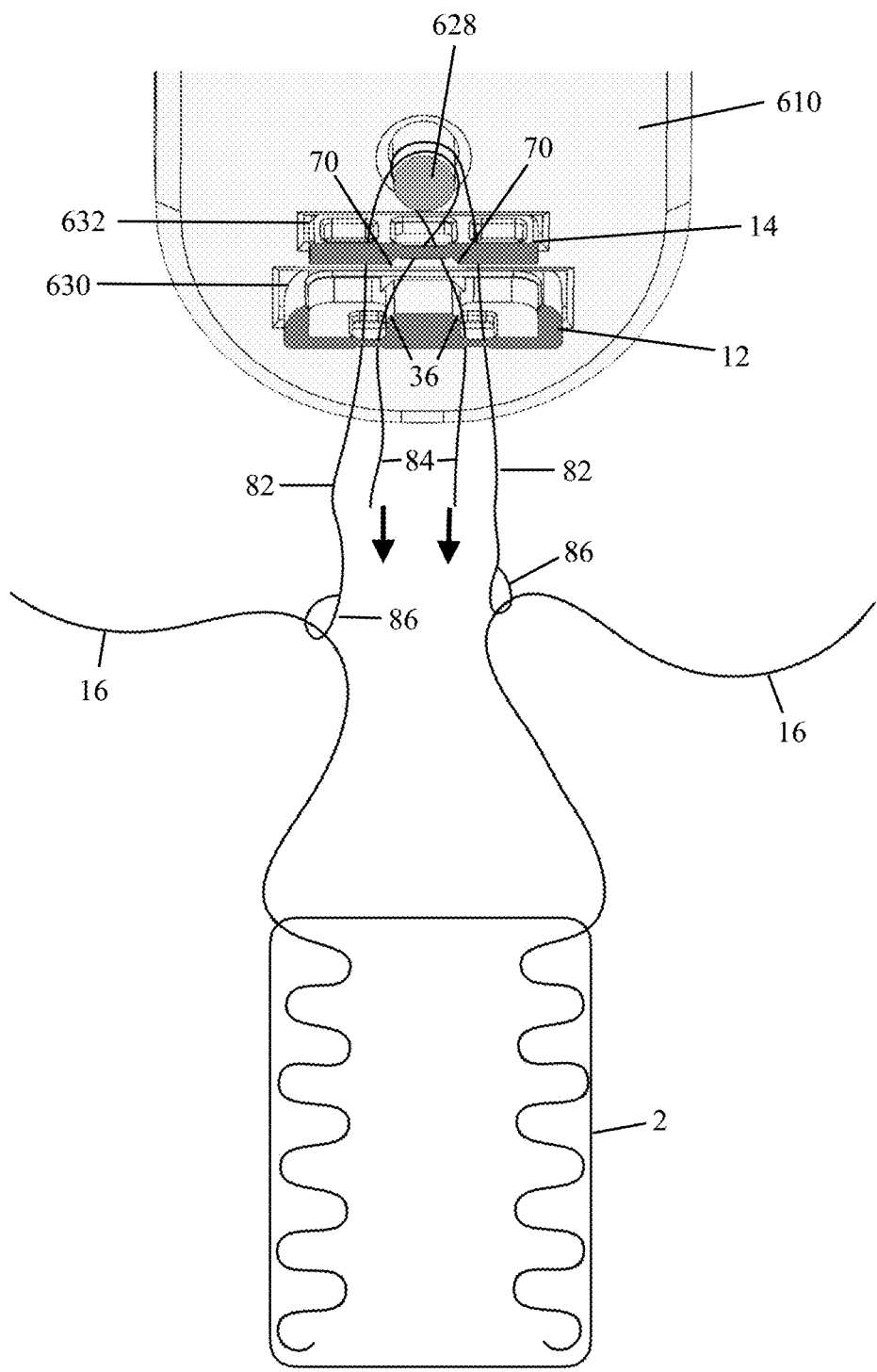
FIGS. 76-77 are front perspective sectional views of the assembly device of FIG. 68 coupled with a locking assembly of FIG. 2, illustrating an exemplary technique of chaperoning a tensionable fixation member through the locking assembly using the assembly device, according to some embodiments.
Figure 77:
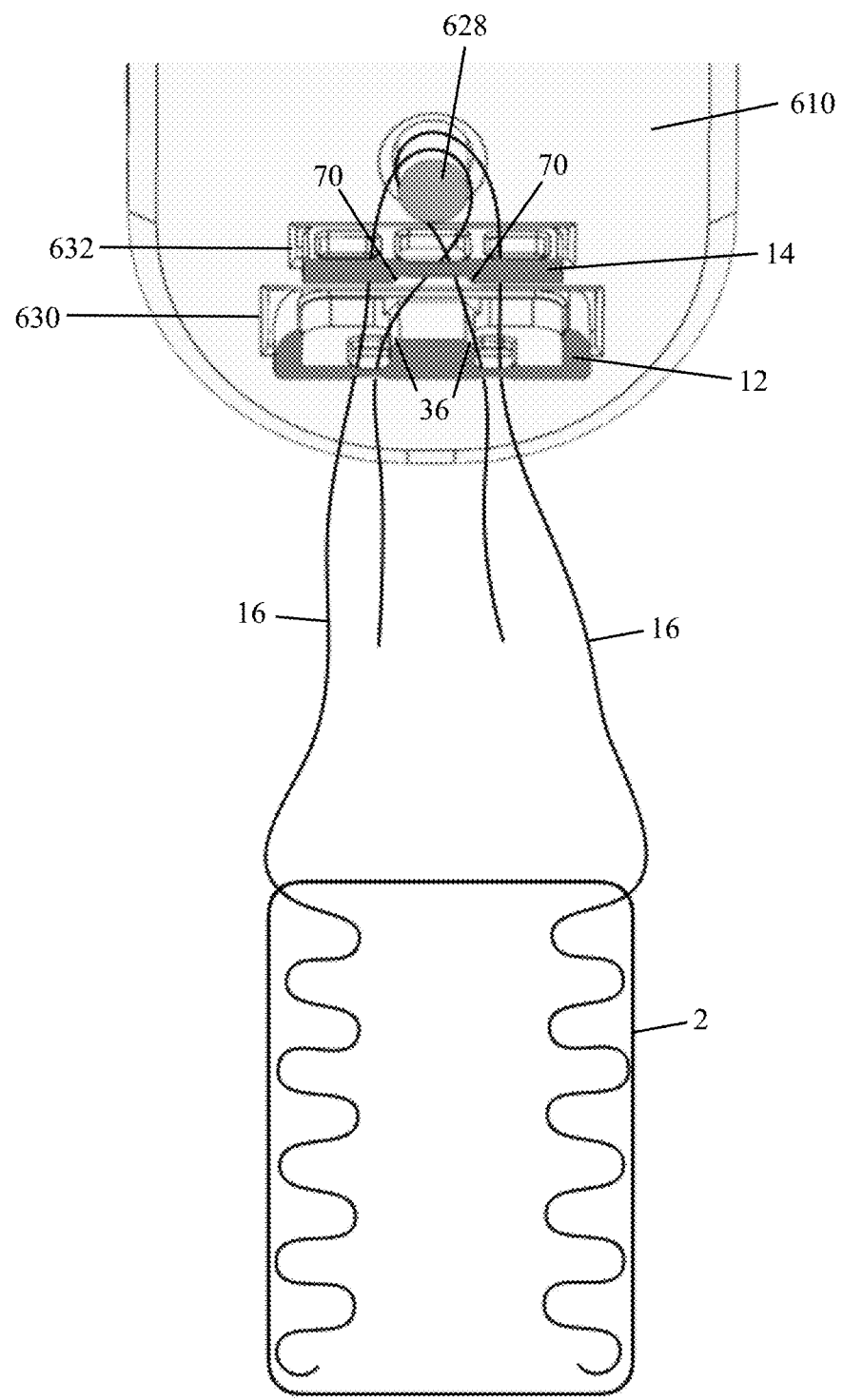

Referring to FIGS. 76-77, a method of repair whereby tensionable fixation members 16 are used to connect to the tissue that is being repaired is described by way of example only. In some embodiments, a first end of each of two (or more) tensionable fixation members 16 are secured to a tissue to be repaired, while a second end (e.g., free end) of the tensionable fixation members 16 are each coupled with capture ends 86 of two different shuttle members 82 (e.g., shuttle wires, etc.). By way of example, the shuttle members 82 are coupled with the assembly device 610 in the same manner as described above with respect to the shuttle members 82 coupled with the locking assembly 11, with the exception being that the components of the locking assembly 11 are held by the assembly device 610 (e.g., the base member 12 held in first component recess 630 and the locking element 14 held in the second component recess 632) and the shuttle members 82 are also looped around the shuttling assistor or cross-pin 628 at the apex of the assembly so that the shuttle members 82 (and later the tensionable fixation members 16) are not frictionally compromised by the locking interface components (e.g., the lateral surfaces 36 of the base member 12 and the medial surfaces 70 of the locking element 14 described above) during maneuvering through the assembly.

By way of example only, the free ends 84 of the shuttle members 82 may be pulled in the distal direction, which shuttles the tensionable fixation members 16 through the assembly device 610 whereby the tensionable fixation members 16 traverse first through the base member 12, then the locking element 14, followed by a U-turn around the shuttling assistor 628 followed by passage between the locking element 14 and base member 12 as its passes through the locking interface between the base member 12 and locking element 14. As previously mentioned, the longitudinal separation between the first and second components (e.g., base member 12 and locking element 14) ensures that there is little to no resistance or friction that will prevent the easy passage of the tensionable fixation member 16 through the locking assembly 11. By way of example only, the shuttling assistor 628 may comprise a simple rod, pin, or any other mechanism that enables unloading to happen at the locking interface at the time of shuttling. In some embodiments, once the tensionable fixation members 16 are passed through or coupled with the multi-component fixation assembly (e.g., locking assembly 11), the assembly device 610 is disassembled allowing for the first and second components to transition between the first position in which the first and second components are longitudinally separated to a second position in which the first and second components engage one another, thereby restoring the locking interfaces which allow one way tensioning and locking (e.g., by way of compression and friction) once the tensioning is completed (e.g., as described above). When the tissue or the tensionable fixation member 16 is pulled in the opposite direction, the locking interface will prevent or resist loosening which in turn will prevent failure of the repair. By way of example only, this mechanism can allow the repair to happen in a knotless manner.

Flipper/Inserter

FIGS. 78-83 illustrate an example of an insertion instrument or flipper device 710 that can be used for implantation of an anchoring device for a soft tissue bone or any other tissue repair, according to some embodiments. By way of example, the insertion instrument 710 is designed in a way where it can perform multiple functions to aid in the process of this repair. By way of example, the flipper device 710 may be configure for use any number of fixation assemblies, including but not limited to the locking assemblies 10, 110, 210, 310, 410, 910 described above and/or the locking assembly described in commonly owned U.S. Pat. No. 11,109,855, issued Sep. 7, 2021, and entitled "Knotless Orthopedic Stabilization System" ("the '855 patent"), the entire contents of which is incorporated by reference as if set forth fully herein.

Current devices that are used to aid such repair perform only one function which is transport of the anchor device through bony tunnels. The uniqueness of the flipper device 710 of the present disclosure is that it allows the user to load an anchoring device on the flipper device, which will maintain the anchoring device in tension to assist with easy passage through the bony tunnel. When adequate position has been achieved, the surgeon or user will use a release feature to reduce the tension in the construct and flip the anchoring device to the correct position.

By way of example the tension may be maintained using a spring-like mechanism which has the ability to keep the construct under tension until the surgeon or user is ready to flip the device. This device will assist with ease of surgical repair by transporting the anchoring device across the bony tunnels and preventing the bunching up of the tensionable fixation members used or connected to the anchoring device. Once the slider or loading feature is engaged, it will trigger a reduction in the tension of the construct, and a push feature within the flipper may be actuated to advance and unload the anchoring device which later may be tensioned to accomplish the repair after the flipper device 710 has been disengaged.

By way of example, any or all components of the flipper device 710 can be made from metal, plastic, polymer using different manufacturing process e.g., machining, molding, 3D printing or other materials and manufacturing processes that are currently being used in the industry.

In some embodiments, an anchoring device 712 (e.g., base member 12, anchor plate, or similar) is loaded on the flipper device 710 which has a capture end 714 to hold the anchoring device 712. In some embodiments, the capture end 714 may also have additional features or cuts 716 to permit the positioning of the tensionable fixation member 16. By way of example only, the flipper device 710 has a shaft 718 that assists in transporting of the anchoring device 712 through a bone tunnel to the desired location. This anchoring device 712 is coupled with the capture end 714 with the tensionable fixation members connected to the device 712. The tensionable fixation members 16 are on the opposite end connected to another component 720 (e.g., locking element 14 described above). This second component 720 may be positioned in the device pocket 722 prior to insertion. This position is maintained by a feature on the flipper or slider 724 which maintains the second component 720 under tension. Once a bone tunnel is created, the anchoring device 712 may be transported through the tunnel to its desired location so that the repair can be completed. Once the anchoring device 712 is transported, the slider 724 is pushed distally in this embodiment to release the tension in the flexible fixation members 16. This will also allow the rod pusher 726 to push on the anchoring device 712 to flip the anchoring device 712. When the operator is pushing the slider to release the tension in the suture construct it will increase the tension in this spring-loaded construct 728. The self-tensioning mechanism of this flipper 710 by way of being spring loaded has a tendency of being in non-stretched position in its resting state (e.g., FIG. 79) and the slider is pushed downwards to feed the second button device 720 in the device pocket 722 (e.g., FIG. 78) to maintain the tension in the sutures as this spring-loaded feature will have a tendency to go back to the resting position which in turn will take any slack out of the tensionable fixation members 16. The push rod 726 passes through a cannulation in the flipper device 710. The slider 724 when pushed distally will cause the push rod 726 to flip the anchoring device 712 to engage the anchoring feature. This device can be modified in different embodiments whereby the flipping occurs with moving the components in the opposite direction or loading the spring or spring like tensionable feature in different positions. The spring-loaded mechanism can be an actual spring or a material that can change elastic properties e.g., nitinol and perform same function.

Fracture Plate with Self-Locking Design

FIGS. 84-89 illustrate an example of a fracture repair plate 810 with a self-locking design, according to some embodiments.

In some embodiments, the present disclosure is directed towards a knotless fixation assembly that may be used for surgical repair of bone or soft tissue. In some embodiments, the knotless fixation assembly disclosed herein includes a base member, a locking element, and one or more tensionable fixation members such as surgical sutures, tapes, and/or wires that may be used to stabilize, fix, and/or repair bone or soft tissue. In some embodiments, the fixation assembly may have a built-in locking mechanism or require a secondary locking element, and the tensionable fixation members may be used to secure, fix, and/or tension the bone, soft tissue or another member to achieve the same desired outcome. In some embodiments, the locking mechanism may secure the tensionable fixation member in a knotless manner. In some embodiments, the user may use a knot to provide secondary locking in addition to (or independent of) the knotless locking mechanism described herein.

Typically, fracture repairs involve the use of plates and screws to establish the repair. While these techniques can be effective for fracture repair there is also a subset of population where they fail due to reasons including (but not limited to) subsidence of the fracture, inadequate capture of the fracture fragment resulting in loss of reduction, and implant protrusions into the joint space requiring repeat surgery. By way of example only, typical fracture plates have holes for screw passage and fracture fixation. The challenge with the existing systems that the screws are not able to capture the small bony fragments that are attached to the tendons as there is not enough screw threads that can penetrate a small fragment of bone and even when used may damage the bone by breaking it into multiple small pieces. Also, other methods are used to repair soft tissue and bone to the plate by using sutures that pass through the soft tissue or bone which are then connected to the bone by passing through the holes in the plate and secured by tying a knot. There are also problems where surgeons have to use a complex knot tying technique or drill additional holes in the remaining part of the good bone to pass sutures through the tunnels. There may be failures due to the knot loosening, fractures through additional holes, soft tissue failure or a screw not capturing the bony fragments.

The above problems may lead to malunion, non-union, numerous follow-up visits for additional fixation, and/or hardware removal or surgeries to address the complications of hardware. The present disclosure addresses the problems with the prior art methods by describing a method of repair and usage of a knotless fixation assembly including a tensionable fixation member that can be used for repair of soft tissue and bone, and specifically span across the fracture site to achieve compression, reduction, and fracture healing.

The presently disclosed knotless fixation assembly may provide the ability to perform a soft tissue repair, bone repair, or a fixation method for securing sutures or other tensionable fixation members in a knotless manner. In some embodiments, the fixation assembly of the present disclosure is designed in a manner to as to not rely on a second component to perform the locking. In some embodiments, the fixation assembly includes a locking feature that provides security of repair by preserving the ability to optimally tension the repair by pulling the tensionable fixation member (s) in the tensioning direction and preventing slippage of the tensionable fixation members in the opposite direction.

In some embodiments, the fixation assembly of the present disclosure is designed to be used with a fracture plate application and is especially useful where fractures are fixed close to the articulate surface. In some embodiments, the angle of the articular surface e.g., inclination angle or curvatures may vary depending on the anatomical location. By way of example, precise reduction of the articular surface without any further damage to the articular surface from hardware placement is critical to patient outcome. The presently described knotless fixation assembly may have the ability to work with fracture plating systems, including but not limited to (and by way of example only) fracture plates that are used close to the articular surface e.g. distal and radius, fractures around the ankle joint, or shoulder, for example, or non-articular locations as well. In some embodiments, the knotless fixation assembly may be introduced through a hole in the fracture plate using a pilot hole, and the fixation assembly may be shuttled across the fracture site using a shuttling device. Upon reaching the outside of the cortex of at the far end of the fracture site, the fixation assembly may be tensioned to achieve reduction by changing the shape across the far end, changing the orientation (e.g., longitudinal to horizontal), and/or expanding in size. Tensioning of the tensionable fixation members (e.g., sutures, tape, wires, or other) will create compression across the fracture site. The small pilot hole created for the device shuttling will allow for the device to be positioned close to the articular surface. Tensioning will reduce the fracture pending compression at the fracture site and allow the locking member to lock within the fixation plate. This will reduce the risk of non-union, malunion hardware complications and repeat surgeries. It will also prevent the surgeon from making multiple incisions to place additional hardware to achieve repair.

Reestablishing the soft tissue 812 and bony envelope is critical to a well-functioning repair especially when it is around a joint where the muscles and tendons assist with range of motion activities. By way of example, the fracture plate 810 of the present disclosure connects the soft tissue 812 and bone 4 through the fracture plate 810 using one or more tensionable fixation members 16 (e.g., surgical suture, tape, wire, or other) in a knotless manner. By way of example only, the fracture plate 810 is analogous to the base members 12, 112, 212, 312, 412, 912 described above in that the fracture plate 810 supplies one of the compression surfaces in the locking interface, which a locking element secured to the plate by a tensionable fixation member 16 supplies the other compression surface in the locking interface.

In some embodiments, the fracture plate 810 includes one or more holes 814 that are configured for screw passage and/or repairing the soft tissue 812 with the plate 810 in a knotless manner (e.g., similar to soft tissue fixation techniques described above) using a locking element 816, 818, 822, 823 that creates a locking interface 820 with the plate 810. By way of example only, the plate 810 shown and described herein illustrates a plurality of interactions with different embodiments of locking elements, including but not limited to locking element 816 (e.g., similar to the locking element shown and described in the '855 patent, which optionally may be used with an anchoring device 832), locking element 818 (e.g., which optionally may be used with an anchoring device 832), locking element 822 (e.g., configured for use with one tensionable fixation member 16), and locking element 823 (e.g., similar to locking element 822 but configured for use with two tensionable fixation members 16). The fracture plate 810 shown by way of example only in the attached Drawings is an example only and would not necessarily need to include each type of locking element shown.

In some embodiments, the plate 810 along with a locking element 816, 818, 822, or 823 can assist with soft tissue 812 tensioning.

By way of example only, the locking interface 820 created by interaction between the plate 810 and various locking elements 816, 818. 822, 823 comprise the interaction between one or more compression surfaces on the plate 810 interacting with one or more complementary compression surfaces on the locking elements to create "pinch points" that capture the tensionable fixation member 16 when the tensionable fixation member 16 is pulled taut in the direction of pull.

In some embodiments, a similar mechanism can be used in a total joint prosthesis 826 or partial joint prosthesis (see, e.g., FIG. 89) wherein the soft tissue (e.g., tendons) 812 can be directly connected through the prosthesis 826 or connected to the prostheses using a allograft or connected to bone using a mechanism where the prosthesis will have a locking interface 820 which can assist with soft tissue tensioning and locking once connected to a locking element 822 (or locking elements 816, 818, or 823).

Figure 87:
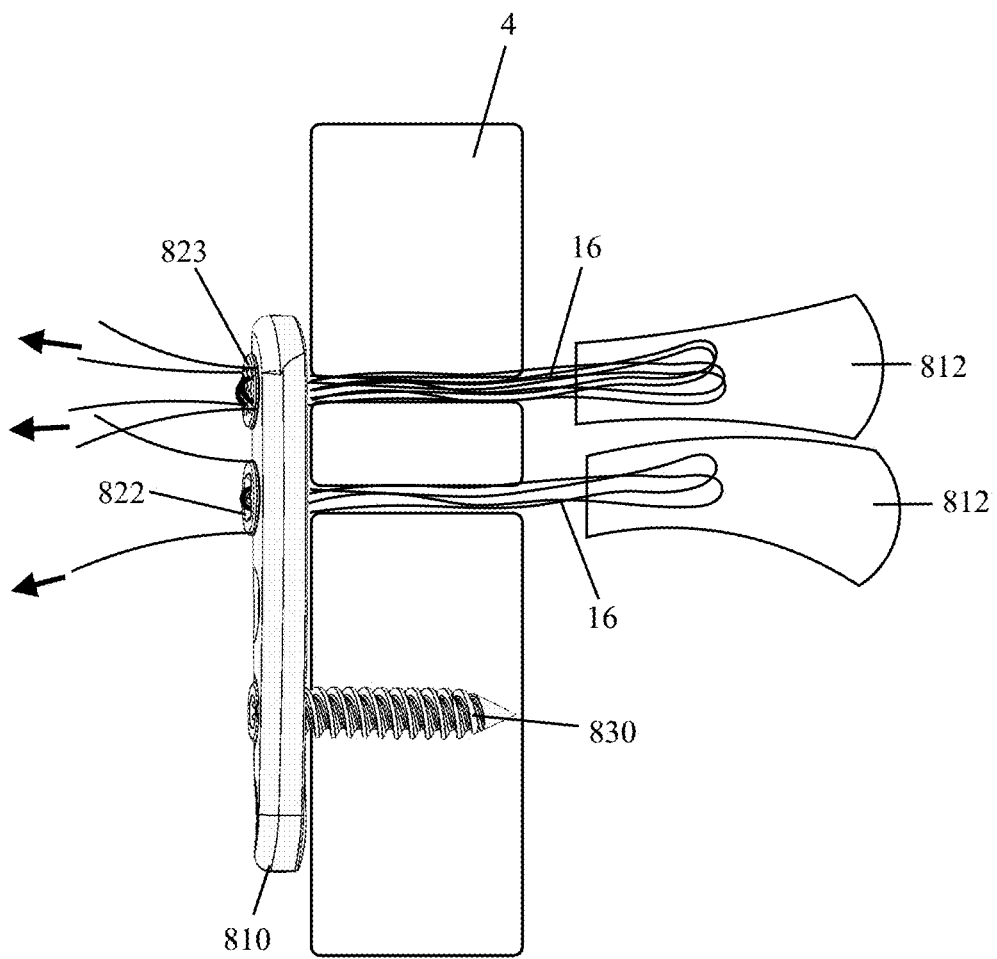
FIG. 87 is a side plan view of the fracture repair plate of FIG. 84 in use, according to some embodiments.

In some embodiments, the present disclosure describes a fracture plate 810 or prosthesis 826 that can be used for repair of bone 4 and/or tissue 812, as shown by way of example only in FIG. 87. In some embodiments, the plate includes one or more holes 814 configured for passage of screws configured to gain purchase within bone as part of a fracture repair. In some embodiments, the plate 810 includes openings towards the center and/or periphery of the plate which have or can function as compression surfaces forming part of a locking interface 820 when engaged with a locking element 816, 818, 822, 823 or mating device, for example any of the fixation assemblies 11, 110, 210, 310, 410, 510, 910 . . . disclosed herein and/or the fixation assembly described in the '855 patent. This will allow the tensionable fixation member 16 attached to the soft tissue 812 to be passed through the hole 814 which is used for soft tissue or bone repair and then the tensionable fixation members 16 are shuttled through a locking element 816, 818, 822, 823, which has mating or compression surfaces that create a locking interface 820 with the plate, allow for tensioning in one direction, and locking which prevents loosening or failure of the repair when pulled in the opposite direction. In some embodiments, the tensionable fixation member(s) 16 is/are passed through a hole 814 and loop around a locking element 816, 818, 822, 823 in a U-shaped manner, then are attached to soft tissue 812 and pass again proximally through the plate 810 through an exit passage 834 which may be separate exit holes 834 (as shown by way of example only in FIGS. 85-86) adjacent the hole 814 or alternatively may comprise slots, grooves, channels, or other pathway near the hole 814. Importantly, exit passage 834 shepherds the tensionable fixation member 16 to the locking interface 820 to ensure a knotless locking of the tensionable fixation member 16 once the desired tension has been applied.

In some embodiments, there may be multiple holes 814 and/or locking interface surfaces 820 that can be used to repair multiple soft tissue or bone or small pieces of bone to the fracture plate or to the bone directly. In some embodiments, the fracture plate 810 has surfaces that can create a friction or compression lock of the tensionable fixation member 16 to secure the soft tissue or bone repair.

In some embodiments, the same hole 814 that includes a locking interface surface 820 which was used for soft tissue repair and mating with a locking element (816 or 818 or 822 or 823) can also be used to receive screws 830.

In some embodiments, the fracture plate 810 may have a screw which locks the tensionable fixation member that is used to secure the soft tissue by creating a compression of friction mechanism with the tensionable fixation member 16.

In some embodiments, the shape of the plates may be variable. In some embodiments, the number of tensionable fixation members 16 maybe based on the design configuration, and the tensionable fixation members can be tensioned in the proximal or distal direction, but there may be one direction that will allow for tensioning and pulling in the opposite direction will be prevented by the locking interface. Moreover, the while the number of tensionable fixation members 16 may be variable, the plate 810 should be provided with exit passages 834 for each end of each tensionable fixation member 16 used.

The above embodiments assist with providing a knotless repair, providing an ability to tension to the operators liking. The fracture plate 810 of the present disclosure will provide more modular system which gives a superior repair.

In some embodiments, the fracture plate 810 includes the use of anchoring device 832 on a far cortex of the bone that the plate 810 is attached to, with tensioning performed by pulling the sutures in the proximal direction with the locking created by interaction of the plate and locking interface 820 against the first half (proximal half) of the locking element (816, 818, 822, 823).

By way of example, the fracture plate 810 system and method of repair disclosed herein boasts many features that are advantageous over the prior art systems, including but not limited to (and by way of example only):
  a. The fracture plate 810 itself provides the locking interface 820 for the locking element and/or anchor device.
  b. The fracture plate 810 is capable of creating a locking interface 820 with the locking element and/or anchor device.
  c. The fracture plate 810 can perform a repair in a knotless manner by means of having a surface that has a locking interface 820 and will lock the tensionable fixation members 16.
  d. The fracture plate 810 can have a dual functioning role and can be used with a locking element to lock the tensionable fixation members 16 or can also be used to pass a screw 830.
  e. The fracture plate 810 can allow for dual direction of tensioning with one direction being proximal or one direction being distal.
  f. The fracture plate 810 can have a soft tissue repair version secured with the assistance of locking element or device that has a locking interface 820 with the plate 810.
  g. The fracture plate 810 can perform a repair in a knotless manner by means of having a surface that has a locking interface 820 which will then lock with other fixation members. This allows for securing the tensionable fixation members 16 by using compression and friction.

The preceding detailed description is presented to enable any person skilled in the art to make and use the button-suture assembly described herein. For purposes of explanation, specific details are set forth to provide a thorough understanding of the present disclosure. However, it will be apparent to one skilled in the art that these specific details are not required to practice the methods described herein. Descriptions of specific applications are provided only as representative examples. Various modifications to the preferred embodiments will be readily apparent to one skilled in the art, and the general principles defined herein may be applied to other embodiments and applications without departing from the scope of the disclosure. The present disclosure is not intended to be limited to the embodiments shown, but is to be accorded the widest possible scope consistent with the principles and features disclosed herein. All such modifications and variations are within the scope of the present invention as determined by any and all claims deriving from this disclosure when interpreted in accordance with the benefit to which they are fairly, legally, and equitably entitled.

The invention claimed is:

1. A knotless fixation assembly operable to fix tissue to tissue, bone, or other member, comprising:
  a base member having a proximal facing engagement surface configured to mate or fix to tissue, bone or other member, a distal facing surface opposite the proximal facing surface, first and second through-holes extending between the proximal facing surface and the distal facing surface, a first compression surface adjacent the first through-hole, and a second compression surface adjacent the second through-hole, the first and second compression surfaces facing away from one another;
  a locking element configured to mate with the base member, the locking element having a proximal side, a distal side opposite the proximal side, a central opening extending between the proximal and distal sides, a first lateral opening extending between the proximal and distal sides and positioned adjacent a first side of the central opening, a second lateral opening extending between the proximal and distal sides and positioned adjacent a second side of the central opening opposite from the first side, the first lateral opening separated from the central opening by a first bridge member, the second lateral opening separated from the central opening by a second bridge member, the locking element having a third compression surface positioned adjacent the central opening on the first side and a fourth compression surface positioned adjacent the central opening on the second side, the third and fourth compression surfaces facing toward one another; and
  first and second tensionable fixation members configured to interact with the base member and the locking element, the first and second tensionable fixation members each having an attachment end configured for attachment to tissue, bone, or other member and a free end configured for manipulation by a user, the first tensionable fixation member passing through the base member and the locking element between the first and third compression surfaces, and the second tensionable fixation member passing through the base member and locking element between the second and fourth compression surfaces;
  wherein said knotless fixation assembly comprises a first state defining a first distance between the base member and the locking element and a second state defining a second distance between the base member and the locking element, the second distance being less than the first distance; and
  wherein the free ends of the first and second tensionable fixation members are configured to be pulled taut in the proximal direction when the attachment ends are mated with a first tissue and the base member is mated with a second tissue, bone, or other member, thereby creating tension in the first and second tensionable fixation members which causes the knotless fixation assembly to transition from the first state to the second state, where the second state is maintained via compression and friction applied to the first tensionable fixation member between the first and third compression surfaces and the second tensionable fixation member between the second and fourth compression surfaces.

2. The knotless fixation assembly of claim 1, wherein the attachment ends of the first and second tensionable fixation members are movable in the distal direction but prevented from moving in the proximal direction when the knotless fixation assembly is in the second state.

3. The knotless fixation assembly of claim 1, wherein the base member further comprises a recess positioned within the distal facing surface, the recess configured to receive the locking element therein.

4. The knotless fixation assembly of claim 3, wherein the first through-hole is positioned within the recess.

5. The knotless fixation assembly of claim 1, wherein the first through-hole has an inner perimeter wall having a first surface area.

6. The knotless fixation assembly of claim 1, wherein the first tensionable fixation member passes through the base member and the locking element such that, from the attachment end, the first tensionable fixation member passes distally through the first through-hole and the first lateral opening, loops around the first bridge member and thereafter passes proximally through the central opening and the first through-hole between the first and third compression surfaces, and the second tensionable fixation member passes through the base member and the locking element such that, from the attachment end, the second tensionable fixation member passes distally through the second through-hole and the second lateral opening loops around the second bridge member and thereafter passes proximally through the central opening and the second through-hole between the second and fourth compression surfaces.

7. The knotless fixation assembly of claim 1, further comprising an unlock element configured to facilitate transition of the assembly from the second state to the first state upon engagement by a user.

8. The knotless fixation assembly of claim 7, wherein the unlock element comprises a tool engagement feature configured to interface with an unlocking tool.

9. The knotless fixation assembly of claim 8, wherein the unlock element comprises at least one cutout region positioned on at least one end of the locking element, the at least one cutout region having a bearing surface.

10. The knotless fixation assembly of claim 9, wherein the unlocking tool comprises an engagement member configured to interface with the bearing surface of the locking element and is operable to separate the locking element from the base member, thereby transitioning the assembly from the second state to the first state.

11. A knotless fixation assembly operable to fix tissue to tissue, bone, or other member, comprising:
a base member having a proximal facing engagement surface configured to mate or fix to tissue, bone or other member, a distal facing surface opposite the proximal facing surface, first and second through-holes extending between the proximal facing surface and the distal facing surface, a first compression surface adjacent the first through-hole, and a second compression surface adjacent the second through-hole, the first and second compression surfaces facing away from one another;
a locking element configured to mate with the base member, the locking element having a proximal side, a distal side opposite the proximal side, a central opening extending between the proximal and distal sides, a first lateral opening extending between the proximal and distal sides and positioned adjacent the central opening, the first lateral opening separated from the central opening by a bridge member, the locking element having a third compression surface adjacent the central opening; and
a tensionable fixation member configured to interact with the base member and the locking element, the tensionable fixation member having an attachment end configured for attachment to tissue, bone, or other member and a free end configured for manipulation by a user, the tensionable fixation member passing through the base member and the locking element between the first and third compression surfaces such that both the attachment end and the free end emerge to extend proximally from the proximal facing engagement surface;
wherein said knotless fixation assembly comprises a first state defining a first distance between the base member and the locking element and a second state defining a second distance between the base member and the locking element, the second distance being less than the first distance;
wherein the free end of the tensionable fixation member is configured to be pulled taut in the proximal direction toward the attachment end when the attachment end is mated with a first tissue and the base member is mated with a second tissue, bone, or other member, thereby creating tension in the tensionable fixation member which causes the knotless fixation assembly to transition from the first state to the second state, where the second state is maintained via compression and friction applied to the tensionable fixation member between the first and third compression surfaces.

12. The knotless fixation assembly of claim 11, wherein the attachment end is movable in the distal direction but prevented from moving in the proximal direction when the knotless fixation assembly is in the second state.

13. The knotless fixation assembly of claim 12, wherein the first through-hole is positioned within the recess.

14. The knotless fixation assembly of claim 11, wherein the base member further comprises a recess positioned within the distal facing surface, the recess configured to receive the locking element therein.

15. The knotless fixation assembly of claim 11, wherein the locking element includes a proximal extension extending proximally from the first lateral opening, the proximal extension configured to nest within the first through-hole when the knotless fixation assembly is in the second state.

16. A knotless fixation assembly operable to fix tissue to tissue, bone, or other member, comprising:
a base member having a proximal facing engagement surface configured to mate or fix to tissue, bone or other member, a distal facing surface opposite the proximal facing surface, first and second through-holes extending between the proximal facing surface and the distal facing surface, a first compression surface adjacent the first through-hole, and a second compression surface adjacent the second through-hole, the first and second compression surfaces facing away from one another;
a locking element configured to mate with the base member, the locking element having a proximal side, a distal side opposite the proximal side, a first opening extending between the proximal and distal sides, a second opening extending between the proximal and distal sides and positioned adjacent the first opening, the second opening separated from the first opening by a bridge member, the locking element having a third compression surface adjacent the first opening; and a tensionable fixation member configured to interact with the base member and the locking element, the tensionable fixation member having an attachment end configured for attachment to tissue, bone, or other member and a free end configured for manipulation by a user, the tensionable fixation member passing through the base member and the locking element such that, from the attachment end, the tensionable fixation member is positioned such that it passes distally through the base member and the second opening, loops around the bridge member and immediately thereafter passes between the first and third compression surfaces;

wherein said knotless fixation assembly comprises a first state defining a first distance between the base member and the locking element and a second state defining a second distance between the base member and the locking element, the second distance being less than the first distance;

wherein the free end of the tensionable fixation member is configured to be pulled taut in the proximal direction when the attachment end is mated with a first tissue and the base member is mated with a second tissue, bone, or other member, thereby creating tension in the tensionable fixation member which causes the knotless fixation assembly to transition from the first state to the second state, where the second state is maintained via compression and friction applied to the tensionable fixation member between the first and third compression surfaces.

17. The knotless fixation assembly of claim 16, wherein the base member further includes a second through-hole extending between the proximal facing surface and the distal facing surface and positioned adjacent the first through-hole, and the tensionable fixation member passes distally through the base member by way of the second through-hole.

18. The knotless fixation assembly of claim 16, wherein the attachment end of the tensionable fixation member is movable in the distal direction but prevented from moving in the proximal direction when the knotless fixation assembly is in the second state.

19. The knotless fixation assembly of claim 16, wherein the base member further comprises a recess positioned within the distal facing surface, the recess configured to receive the locking element therein.

20. The knotless fixation assembly of claim 19, wherein the first through-hole is positioned within the recess.

* * * * *